US011082165B2

United States Patent
Kim et al.

(10) Patent No.: US 11,082,165 B2
(45) Date of Patent: *Aug. 3, 2021

(54) METHOD AND APPARATUS FOR TRANSMITTING OR RECEIVING SUB-FRAME LENGTH INFORMATION IN WIRELESS ACCESS SYSTEM SUPPORTING NON-LICENSED BAND

(71) Applicant: LG ELECTRONICS INC., Seoul (KR)

(72) Inventors: Seonwook Kim, Seoul (KR); Joonkui Ahn, Seoul (KR); Hanjun Park, Seoul (KR); Yunjung Yi, Seoul (KR); Suckchel Yang, Seoul (KR); Byounghoon Kim, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/822,549

(22) Filed: Mar. 18, 2020

(65) Prior Publication Data

US 2020/0220671 A1 Jul. 9, 2020

Related U.S. Application Data

(63) Continuation of application No. 15/767,805, filed as application No. PCT/KR2016/011496 on Oct. 13, 2016, now Pat. No. 10,630,432.

(Continued)

(51) Int. Cl.
*H04W 16/14* (2009.01)
*H04W 28/06* (2009.01)
(Continued)

(52) U.S. Cl.
CPC .......... *H04L 1/1861* (2013.01); *H04L 1/0083* (2013.01); *H04L 1/18* (2013.01);
(Continued)

(58) Field of Classification Search
None
See application file for complete search history.

(56) References Cited

U.S. PATENT DOCUMENTS

| 10,630,432 B2 * | 4/2020 | Kim ................. H04W 74/0808 |
| 2005/0152359 A1 * | 7/2005 | Giesberts .............. H04L 69/324 370/389 |

(Continued)

FOREIGN PATENT DOCUMENTS

KR 1020150085455 A 7/2015

OTHER PUBLICATIONS

Broadcom Corporation, CableLabs, "Robust Coexistence LAA-LTE", 3GPP TSG RAN WG1 Meeting #79, Nov. 17-21, 2014, R1-145167, XP050876190.

(Continued)

*Primary Examiner* — Anh Vu H Ly
(74) *Attorney, Agent, or Firm* — Dentons US LLP

(57) ABSTRACT

Embodiments of the present invention relate to a wireless access system supporting a non-licensed band and, more particularly, to methods for transmitting or receiving sub-frame length information indicating the lengths of current and next sub-frames, and apparatuses for supporting the same. As an embodiment of the present invention, a method for receiving sub-frame (SF) length information in a wireless access system supporting a non-licensed band may comprise the steps of: receiving a signal including first SF length information indicating the lengths of one or more of a current SF and a next SF in sub-frame number n−1 (SF # n−1); and receiving one or more of a downlink physical (Continued)

channel and a downlink signal in the SF # n−1 on the basis of the first SF length information. Here, the first SF length information may indicate that the current SF or the next SF is the end SF of a downlink transmission burst in the non-licensed band.

14 Claims, 29 Drawing Sheets

Related U.S. Application Data

(60) Provisional application No. 62/291,464, filed on Feb. 4, 2016, provisional application No. 62/258,426, filed on Nov. 21, 2015, provisional application No. 62/257,749, filed on Nov. 20, 2015, provisional application No. 62/257,658, filed on Nov. 19, 2015, provisional application No. 62/257,240, filed on Nov. 19, 2015, provisional application No. 62/256,728, filed on Nov. 18, 2015, provisional application No. 62/257,187, filed on Nov. 18, 2015, provisional application No. 62/249,921, filed on Nov. 2, 2015, provisional application No. 62/241,114, filed on Oct. 13, 2015.

(51) Int. Cl.
  *H04L 1/18*    (2006.01)
  *H04L 5/00*    (2006.01)
  *H04L 1/00*    (2006.01)
  *H04W 72/04*   (2009.01)
  *H04W 74/08*   (2009.01)

(52) U.S. Cl.
  CPC .............. *H04L 1/1812* (2013.01); *H04L 5/00* (2013.01); *H04L 5/0048* (2013.01); *H04L 5/0055* (2013.01); *H04W 16/14* (2013.01); *H04W 28/065* (2013.01); *H04W 72/0406* (2013.01); *H04W 72/0446* (2013.01); *H04W 72/0473* (2013.01); *H04W 74/0808* (2013.01)

(56) References Cited

U.S. PATENT DOCUMENTS

| | | | |
|---|---|---|---|
| 2008/0130538 A1* | 6/2008 | Raissinia | H04W 12/0013 370/310 |
| 2012/0127867 A1* | 5/2012 | He | H04L 1/1607 370/242 |
| 2014/0112289 A1 | 4/2014 | Kim et al. | |
| 2015/0023289 A1* | 1/2015 | Tian | H04L 1/08 370/329 |
| 2015/0098437 A1 | 4/2015 | Chen et al. | |
| 2016/0242151 A1* | 8/2016 | Seo | H04W 76/10 |
| 2017/0048828 A1 | 2/2017 | Um | H04L 1/0061 370/328 |
| 2017/0117997 A1* | 4/2017 | Park | H04L 1/0026 |
| 2017/0127414 A1 | 5/2017 | Yi | H04L 27/2611 370/329 |
| 2017/0142743 A1* | 5/2017 | Yoon | H04W 56/00 |
| 2017/0164384 A1* | 6/2017 | Wang | H04L 5/001 |
| 2018/0007688 A1 | 1/2018 | Fu | H04L 5/0048 370/329 |
| 2018/0103458 A1 | 4/2018 | Tooher | H04W 16/14 370/328 |
| 2018/0115904 A1 | 4/2018 | Harada | H04W 16/14 370/329 |
| 2018/0124749 A1 | 5/2018 | Park | H04W 16/14 370/329 |
| 2018/0175975 A1 | 6/2018 | Um | H04L 1/1816 370/328 |
| 2018/0176066 A1 | 6/2018 | Lim | H04L 1/00 370/329 |
| 2018/0205584 A1 | 7/2018 | Lim | H04L 27/2608 370/329 |
| 2018/0206129 A1 | 7/2018 | Choi | H04L 1/00 370/328 |
| 2018/0220434 A1 | 8/2018 | Takeda | H04W 16/14 370/329 |
| 2018/0235008 A1 | 8/2018 | Park | H04W 16/14 370/329 |
| 2018/0241499 A1 | 8/2018 | Einhaus | H04L 1/00 370/329 |
| 2018/0249497 A1 | 8/2018 | Noh | H04L 5/0053 370/328 |
| 2018/0302926 A1 | 10/2018 | Bhorkar | H04W 28/065 370/329 |
| 2018/0317256 A1 | 11/2018 | Um | H04W 74/0808 370/328 |
| 2018/0338319 A1* | 11/2018 | Kim | H04W 76/14 |
| 2019/0014591 A1* | 1/2019 | Lei | H04W 72/14 |

OTHER PUBLICATIONS

Nokia Networks, "On DL transmission detection and UL subframe indication for LAA", 3GPP TSG RAN WG1 Meeting #82bis, Oct. 5-9, 2015, R1-155602, XP051002466.
Kyocera, "DL Transmission Design for partial subframe", 3GPP TSG RAN WG1 Meeting #82bis, Oct. 5-9, 2015, R1-155531, XP051039680.
Alcatel-Lucent, Alcatel-Lucent Shanghai Bell, "PDSCH and DCI Transmissions in LAA", 3GPP TSG RAN WG1 Meeting #82bis, Oct. 5-9, 2015, R1-155629, XP051039702.
Huawei, HiSilicon: "Indication of DL transmission burst for LAA," 3GPP TSG RAN WG1 Meeting #82bis, Oct. 5-9, 2015, R1-155657.
Qualcomm, Ericsson, Huawei, HiSilicon, CATT, NTT, Docomo, Nokia Networks: "WF on signaling in LAA DL subframes," 3GPP TSG RAN WG1 #82bis, Oct. 5-9, 2015, R1-156371.
Panasonic: "Indication methods for partial subframe," 3GPP TSG RAN WG1 Meeting #82bis, Oct. 5-9, 2015, R1-155351.

* cited by examiner

PUCCH format 1a and 1b structure (normal CP case)

PUCCH format 1a and 1b structure (extended CP case)

PUCCH format 2, 2a, and 2b structure (normal CP case)

PUCCH format 2, 2a, and 2b structure (extended CP case)

FIG. 10 resource allocation: 18 ACK/NACK channels in normal CP

| cell-specific cyclic shift offset | | RS orthogonal cover | | | ACK/NACK orthogonal cover | | |
|---|---|---|---|---|---|---|---|
| $\delta_{offset}^{PUCCH}=1$ | $\delta_{offset}^{PUCCH}=0$ | $\bar{n}_{OC}=0$ | $\bar{n}_{OC}=1$ | $\bar{n}_{OC}=2$ | $n_{OC}=0$ | $n_{OC}=1$ | $n_{OC}=2$ |
| $n_{CS}=1$ | $n_{CS}=0$ | $n'=0$ | | | $n'=0$ | | |
| 2 | 1 | | 6 | 12 | | 6 | 12 |
| 3 | 2 | 1 | 7 | 13 | 1 | 7 | 13 |
| 4 | 3 | 2 | 8 | 14 | 2 | 8 | 14 |
| 5 | 4 | 3 | 9 | 15 | 3 | 9 | 15 |
| 6 | 5 | 4 | 10 | 16 | 4 | 10 | 16 |
| 7 | 6 | 5 | 11 | 17 | 5 | 11 | 17 |
| 8 | 7 | | | | | | |
| 9 | 8 | | | | | | |
| 10 | 9 | | | | | | |
| 11 | 10 | | | | | | |
| 0 | 11 | | | | | | |

$\Delta_{shift}^{PUCCH} \in \{1,2,3\}$ normal CP case
$\Delta_{shift}^{PUCCH} \in \{1,2,3\}$ extended CP case
$\delta_{offset}^{PUCCH} \in \{0,1,...,\Delta_{shift}^{PUCCH}-1\}$ cell-specific cyclic shift value of CAZAC sequence specific cyclic shift offset $n_{OC}$ orthogonal sequence index for ACK/NACK
$\bar{n}_{OC}$ orthogonal sequence index for RS
$n_{CS}$ cyclic shift value of CAZAC sequence
$n'$ ACK/NACK resource index used for channelizing in RB

FIG. 12

☐ PRBs used for transmitting PUCCH in slot $n_s$ $$n_{PRB} = \begin{cases} \left\lfloor \dfrac{m}{2} \right\rfloor & \text{if } (m+n_s \bmod 2) \bmod 2 = 0 \\ N_{RB}^{UL} - 1 - \left\lfloor \dfrac{m}{2} \right\rfloor & \text{if } (m+n_s \bmod 2) \bmod 2 = 1 \end{cases}$$

· mapping order:
  from RBs located at external boundary to RBs located at internal boundary
· PUCCH format 2/2a/2b first
· mixed ACK/NACK and CQI format
· PUCCH format 1/1a/1b

|  | m = 1 |  | m = 0 |
|---|---|---|---|
|  | m = 3 |  | m = 2 |
|  |  |  |  |
|  | m = 2 |  | m = 3 |
|  | m = 0 |  | m = 1 |

← 1 subframe →

$n_{PRB} \neq N_{RB}^{UL} - 1$

⋮

$n_{PRB} = 0$

PUCCH format 2/2a/2b

$$m = \left\lfloor n_{PUCCH}^{(2)} / N_{sc}^{RB} \right\rfloor$$

PUCCH format 1/1a/1b

$$m = \begin{cases} \left\lfloor \dfrac{n_{PUCCH}^{(1)} - c \cdot N_{cs}^{(1)}/\Delta_{shift}^{PUCCH}}{c \cdot N_{sc}^{RB}/\Delta_{shift}^{PUCCH}} \right\rfloor & \text{if } n_{PUCCH}^{(1)} < c \cdot N_{cs}^{(1)}/\Delta_{shift}^{PUCCH} \\ \dfrac{N_{RB}^{(2)}}{N_{PUCCH}^{(1)} - c \cdot N_{cs}^{(1)}/\Delta_{shift}^{PUCCH}} + N_{RB}^{(2)} + \left\lfloor \dfrac{N_{cs}^{(2)}}{8} \right\rfloor & \text{otherwise} \end{cases}$$

$c = \begin{cases} 3 & \text{normal CP} \\ 2 & \text{extended CP} \end{cases}$

FIG. 19
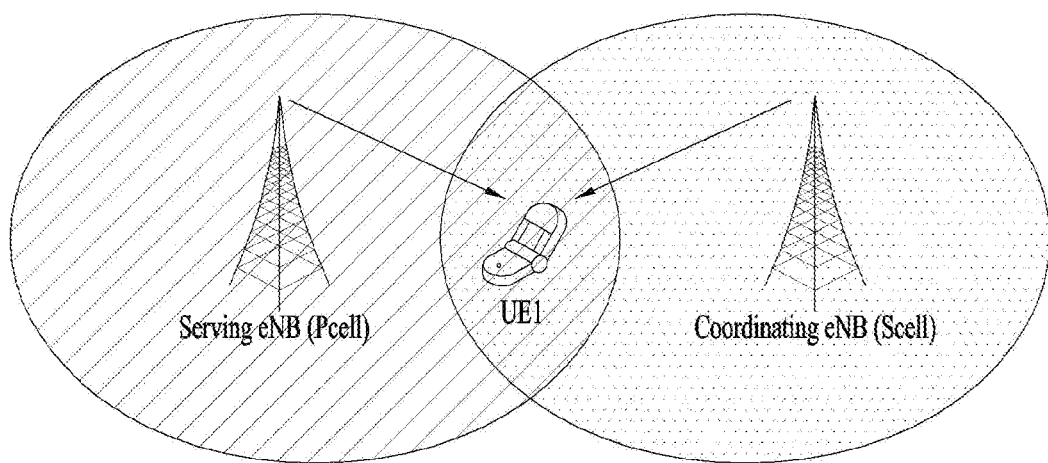
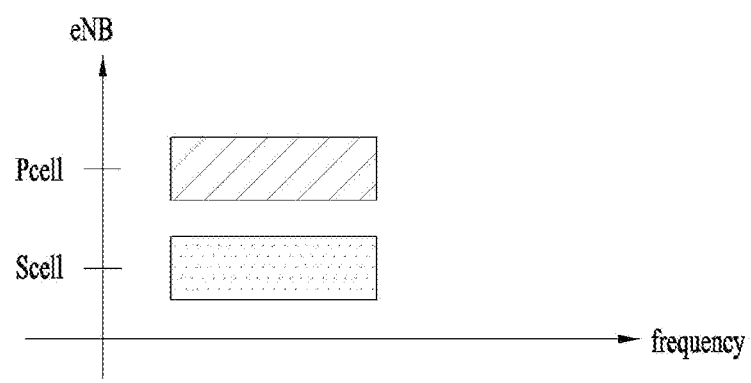

FIG. 25
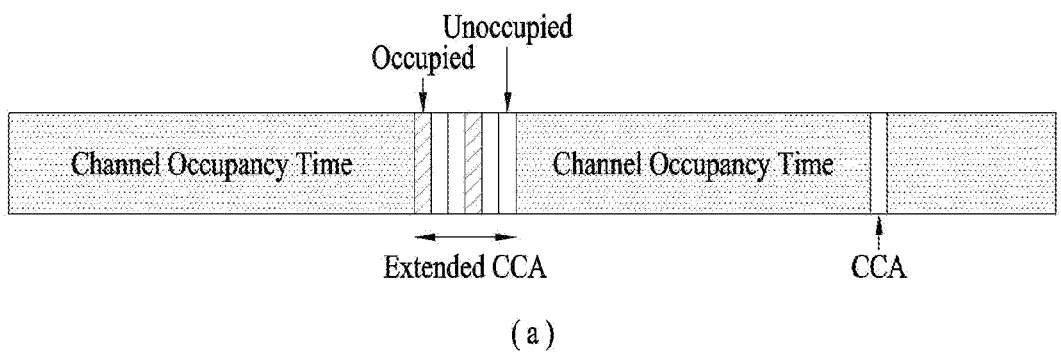
(a)
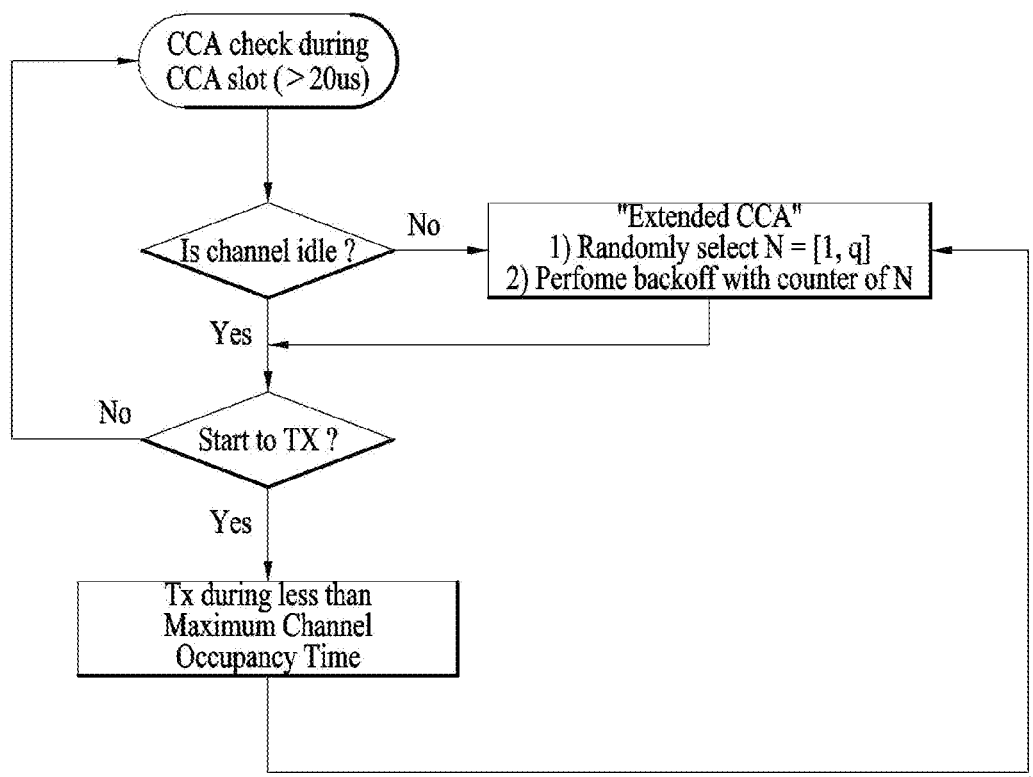
(b)

FIG. 28

| Subframe index | SF #N | SF #N+1 | SF #N+2 | SF #N+3 | SF #N+4 | SF #N+5 |
|---|---|---|---|---|---|---|
| eNB | 1 | 1 | 0 | 1 | 1 | 0 |

(a)

| Subframe index | SF #N | SF #N+1 | SF #N+2 | SF #N+3 | SF #N+4 | SF #N+5 | SF #N+6 |
|---|---|---|---|---|---|---|---|
| eNB | 0 | 1 | 1 | 0 | 1 | 1 | 1 |

(b)

METHOD AND APPARATUS FOR TRANSMITTING OR RECEIVING SUB-FRAME LENGTH INFORMATION IN WIRELESS ACCESS SYSTEM SUPPORTING NON-LICENSED BAND

This application is a continuation application of U.S. patent application Ser. No. 15/767,805 filed Apr. 12, 2018, which is a national stage entry of international application no. PCT/KR2016/011496 filed Oct. 13, 2016, and claims priority to U.S. provisional application nos. 62/241,114 filed Oct. 13, 2015; 62/249,921 filed Nov. 2, 2015; 62/256,728 filed Nov. 18, 2015; 62/257,187 filed Nov. 18, 2015; 62/257,240 filed Nov. 19, 2015; 62/257,658 filed Nov. 19, 2015; 62/257,749 filed Nov. 20, 2015; 62/258,426 filed Nov. 21, 2015 and 62/291,464 filed Feb. 4, 2016, all of which are hereby incorporated by reference in their entireties as if fully set forth herein.

TECHNICAL FIELD

The present invention relates to a wireless access system (LAA: Licensed-Assisted Access system) supporting an unlicensed band, and, more particularly, to methods of defining information on transmit power of a reference signal and the structure of a downlink transmission burst and transmitting and receiving subframe length information indicating the lengths of current and next subframes, particularly, in association with the structure of the downlink transmission burst, and apparatuses supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of present disclosure is to provide a method of efficiently transmitting and receiving data in a wireless access system supporting an unlicensed band.

Another object of present disclosure is to provide methods of transmitting information on a downlink transmission burst structure in a licensed-assisted access (LAA) system.

Another object of present disclosure is to provide methods of transmitting information on an MBSFN subframe configured in an LAA SCell.

Another object of present disclosure is to provide methods of transmitting DL transmission burst information configured in an LAA SCell.

Another object of present disclosure is to provide methods of transmitting SF length information related to an end pSF, a start pSF and/or a DRS pSF in an LSS SCell.

Another object of present disclosure is to provide methods of combining and transmitting information on a DL transmission burst along with SF length information.

Another object of present disclosure is to provide apparatuses supporting such methods.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention relates to a wireless access system supporting an unlicensed band, and, more particularly, to methods of defining information on transmit power of a reference signal and the structure of a downlink transmission burst and transmitting and receiving subframe length information indicating the lengths of current and next subframes, particularly, in association with the structure of the downlink transmission burst, and apparatuses supporting the same.

As an aspect of present disclosure, a method of receiving subframe (SF) length information in a wireless access system supporting an unlicensed includes receiving a signal including first SF length information indicating a length of one or more of a current SF and a next SF in a subframe number n−1 (SF # n−1) and receiving one or more of a downlink physical channel and a downlink signal in SF # n−1 based on the first SF length information. At this time, the first SF length information may indicate that the current SF or the next SF is an end SF of a downlink transmission burst of the unlicensed band.

The method may further include receiving a signal including second SF length information indicating a length of one or more of a current SF and a next SF in a subframe number n (SF # n) and receiving one or more of a downlink physical channel and a downlink signal in SF # n based on the second SF length information.

As another aspect of present disclosure, a method of transmitting subframe (SF) length information in a wireless access system supporting an unlicensed band includes transmitting a signal including first SF length information indicating a length of one or more of a current SF and a next SF in a subframe number n−1 (SF # n−1) and transmitting one or more of a downlink physical channel and a downlink signal in SF # n−1 based on the first SF length information. At this time, the first SF length information may indicate that the current SF or the next SF is an end SF of a downlink transmission burst of the unlicensed band.

The method may include transmitting a signal including second SF length information indicating a length of one or more of a current SF and a next SF in a subframe number n (SF # n) and transmitting one or more of a downlink physical channel and a downlink signal in SF # n based on the second SF length information.

As another aspect of present disclosure, a user equipment (UE) for receiving subframe (SF) length information in a wireless access system supporting an unlicensed band includes a receiver and a processor. At this time, the processor may control the receiver to receive a signal including first SF length information indicating a length of one or more of a current SF and a next SF in a subframe number n−1 (SF # n−1) and control the receiver to receive one or more of a downlink physical channel and a downlink signal in SF # n−1 based on the first SF length information. At this time, the first SF length information may indicate that the current SF or the next SF is an end SF of a downlink transmission burst of the unlicensed band.

The processor may control the receiver to receive a signal including second SF length information indicating a length of one or more of a current SF and a next SF in a subframe number n (SF # n) and to receive one or more of a downlink physical channel and a downlink signal in SF # n based on the second SF length information.

As another aspect of present disclosure, a base station for transmitting subframe (SF) length information in a wireless access system supporting an unlicensed band includes a transmitter and a processor. At this time, the processor may control the transmitter to transmit a signal including first SF length information indicating a length of one or more of a current SF and a next SF in a subframe number n−1 (SF # n−1) and to transmit one or more of a downlink physical channel and a downlink signal in SF # n−1 based on the first SF length information. At this time, the first SF length information may indicate that the current SF or the next SF is an end SF of a downlink transmission burst of the unlicensed band.

At this time, the processor may control the transmitter to transmit a signal including second SF length information indicating a length of one or more of a current SF and a next SF in a subframe number n (SF # n) and to transmit one or more of a downlink physical channel and a downlink signal in SF # n based on the second SF length information.

In the aspects of present disclosure, the first SF length information may indicate that the current SF or the next SF is an end SF and is a partial SF.

In addition, the first SF length information may indicate that the current SF is a full SF and is an end SF.

In addition, the first SF length information may include the lengths of the current SF and the end SF represented by the number of OFDM symbols.

In addition, SF # n−1 may be a full SF and a partial SF.

It is to be understood that both the foregoing general description and the following detailed description of the present disclosure are exemplary and explanatory and are intended to provide further explanation of the disclosure as claimed.

Advantageous Effects

The embodiments of the present disclosure have the following effects.

First, data may be transmitted and received efficiently in a wireless access system supporting an unlicensed band.

Second, methods of transmitting information on a downlink transmission burst structure in an LAA system are provided, such that a user equipment (UE) accurately decodes the downlink transmission burst.

Third, methods of transmitting information on an MBSFN subframe and SF length information related to an end pSF, a start pSF and/or a DRS pSF in an LSS SCell, such that a UE reliably receives and decodes the pSF without ambiguity of the length of the pSF even when a subframe is partially configured.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 10 is a view illustrating acknowledgment/negative acknowledgment (ACK/NACK) channelization for PUCCH formats 1a an 1b;

FIG. 12 is a view illustrating a PRB allocation method;

FIG. 19 is a conceptual view illustrating a coordinated multi-point (CoMP) system operating in a CA environment;

FIG. 25 is a view illustrating an exemplary load Based equipment (LBE) operation as one of the LBT operations;

FIG. 28 is a view illustrating methods of transmitting DL Tx burst information;

BEST MODE

Figure 1:
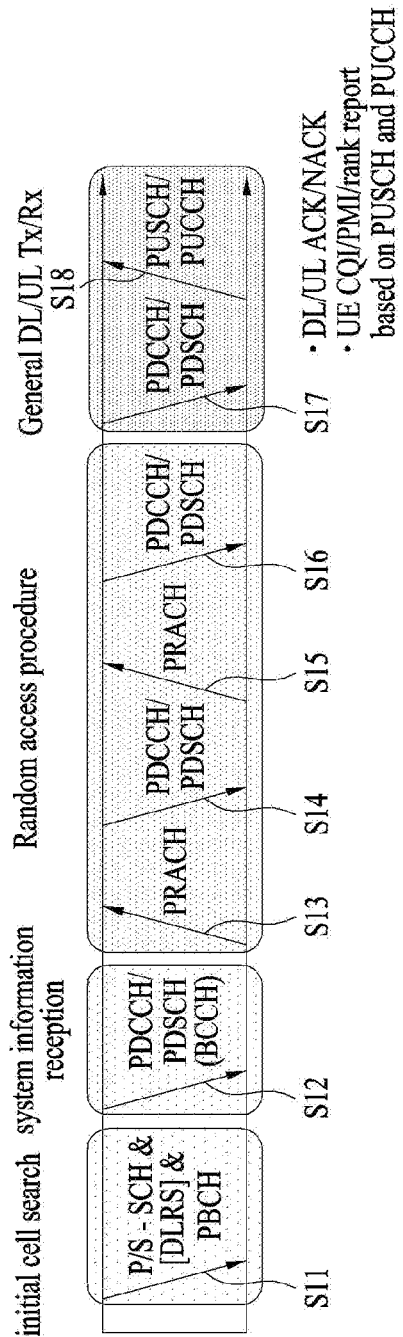
FIG. 1 is a view illustrating physical channels and a signal transmission method using the physical channels.

The embodiments of the present disclosure described below in detail relate to wireless access system (LAA: Licensed-Assisted Access system) supporting an unlicensed band, and, more particularly, to methods of defining information on transmit power of a reference signal and the structure of a downlink transmission burst and transmitting and receiving subframe length information indicating the lengths of current and next subframes, particularly, in association with the structure of the downlink transmission burst, and apparatuses supporting the same.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a BS and a UE. A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a mobile station (MS), a subscriber station (SS), a mobile subscriber station (MSS), a mobile terminal, an advanced mobile station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an uplink (UL). Likewise, the UE may serve as a reception end and the BS may serve as a transmission end, on a downlink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical feature and scope of the present disclosure.

For example, the term transmission opportunity period (TxOP) is interchangeable with transmission period, Transmission (Tx) burst, or reserved resource period (RRP). Further, an LBT operation may be performed for the same purpose as that of carrier sensing for determining whether a channel is in an idle state, clear channel assessment (CCA), and a channel access procedure (CAP).

Hereinafter, 3GPP LTE/LTE-A systems are explained, which are examples of wireless access systems.

The embodiments of the present disclosure can be applied to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (WiFi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell identifier (ID) by receiving a Primary Synchronization Channel (P-SCH) and a Secondary Synchronization Channel (S-SCH) from the eNB.

Then the UE may acquire information broadcast in the cell by receiving a physical broadcast channel (PBCH) from the eNB.

During the initial cell search, the UE may monitor a DL channel state by receiving a downlink reference signal (DL RS).

After the initial cell search, the UE may acquire more detailed system information by receiving a physical downlink control channel (PDCCH) and receiving a physical downlink shared channel (PDSCH) based on information of the PDCCH (S12).

To complete connection to the eNB, the UE may perform a random access procedure with the eNB (S13 to S16). In the random access procedure, the UE may transmit a preamble on a physical random access channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a physical uplink shared channel (PUSCH) and/or a physical uplink control channel (PUCCH) to the eNB (S18), in a general UL/DL signal transmission procedure.

Control information that the UE transmits to the eNB is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
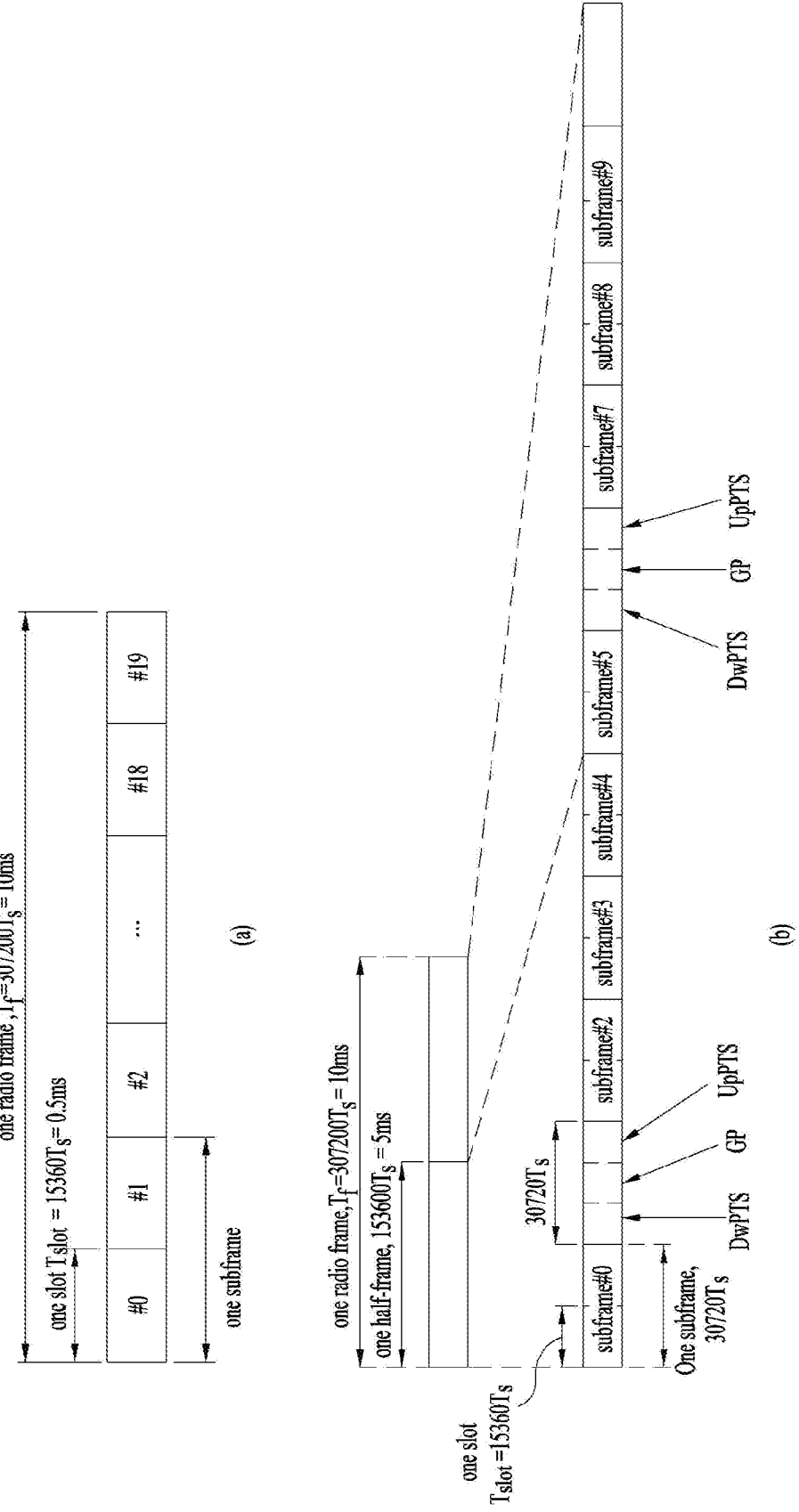
FIG. 2 is a view illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full frequency division duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a transmission time interval (TTI). Ts is a sampling time given as Ts=1/(15 kHz×2048)=3.2552×10−8 (about 33 ns). One slot includes a plurality of orthogonal frequency division multiplexing (OFDM) symbols or SC-FDMA symbols in the time domain by a plurality of resource blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a time division duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, downlink pilot time slot (DwPTS), guard period (GP), and uplink pilot time slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

PHICH is a response channel to a UL transmission, delivering an HARQ ACK/NACK signal. Control information carried on the PDCCH is called downlink control information (DCI). The DCI transports UL resource assignment information, DL resource assignment information, or UL transmission (Tx) power control commands for a UE group.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 3:
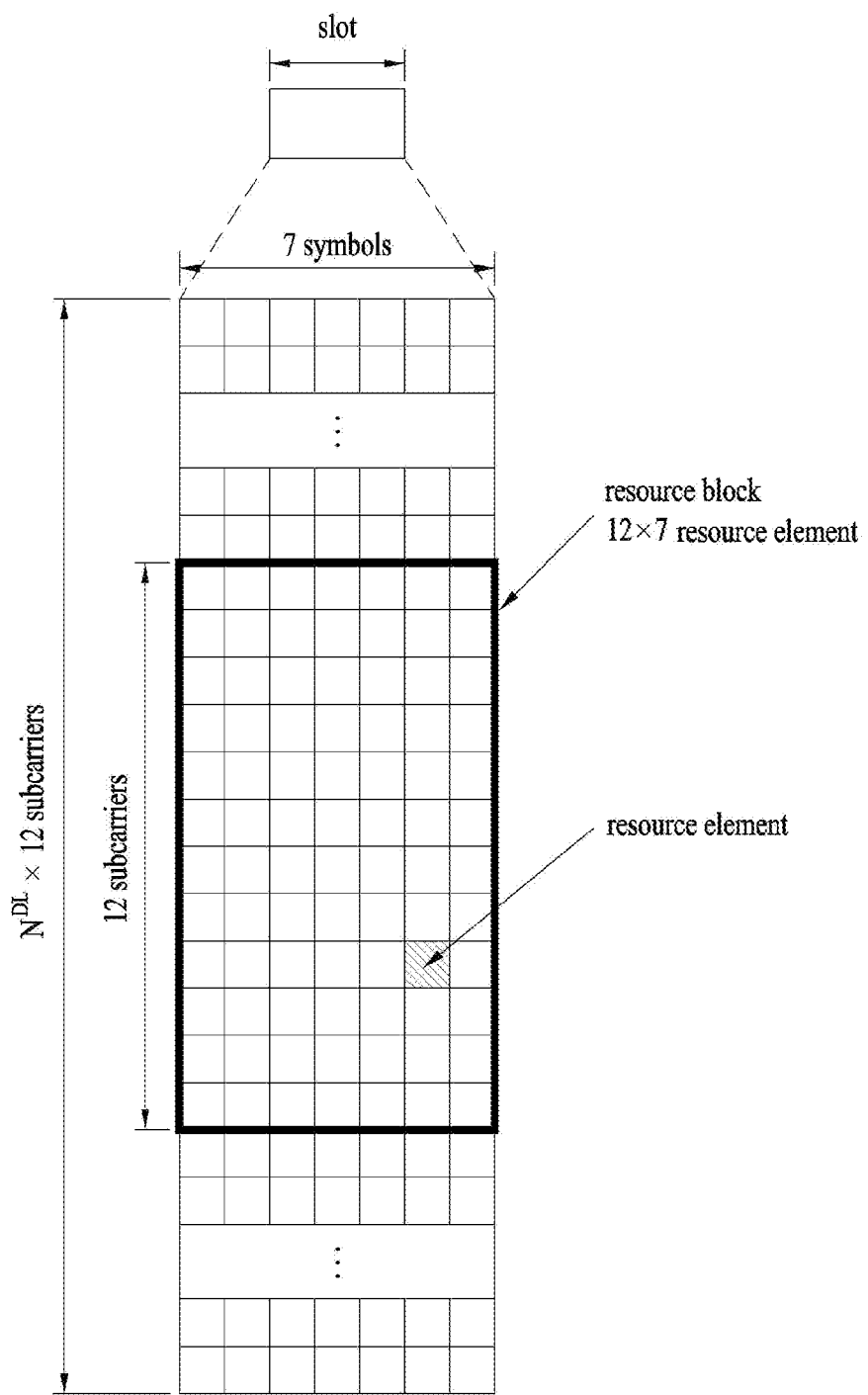
FIG. 3 is a view illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a resource element (RE). An RB includes 12×7 REs. The number of RBs in a DL slot, NDL depends on a DL transmission bandwidth. A UL slot may have the same structure as a DL slot.

Figure 4:
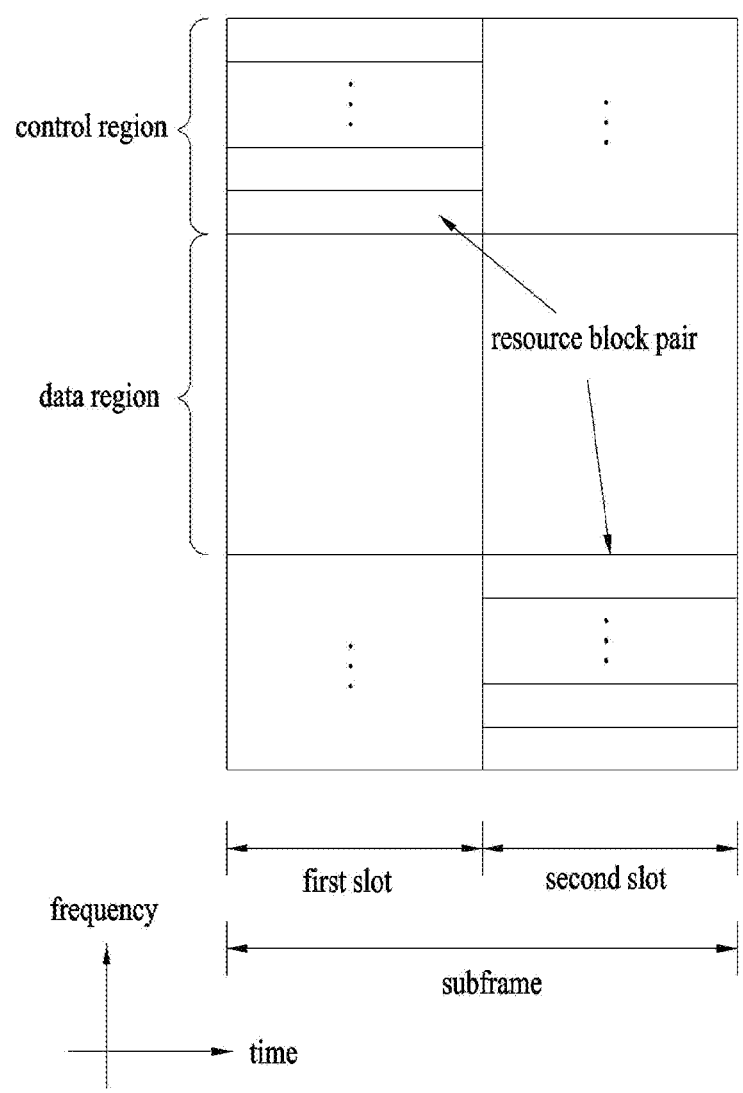
FIG. 4 is a view illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
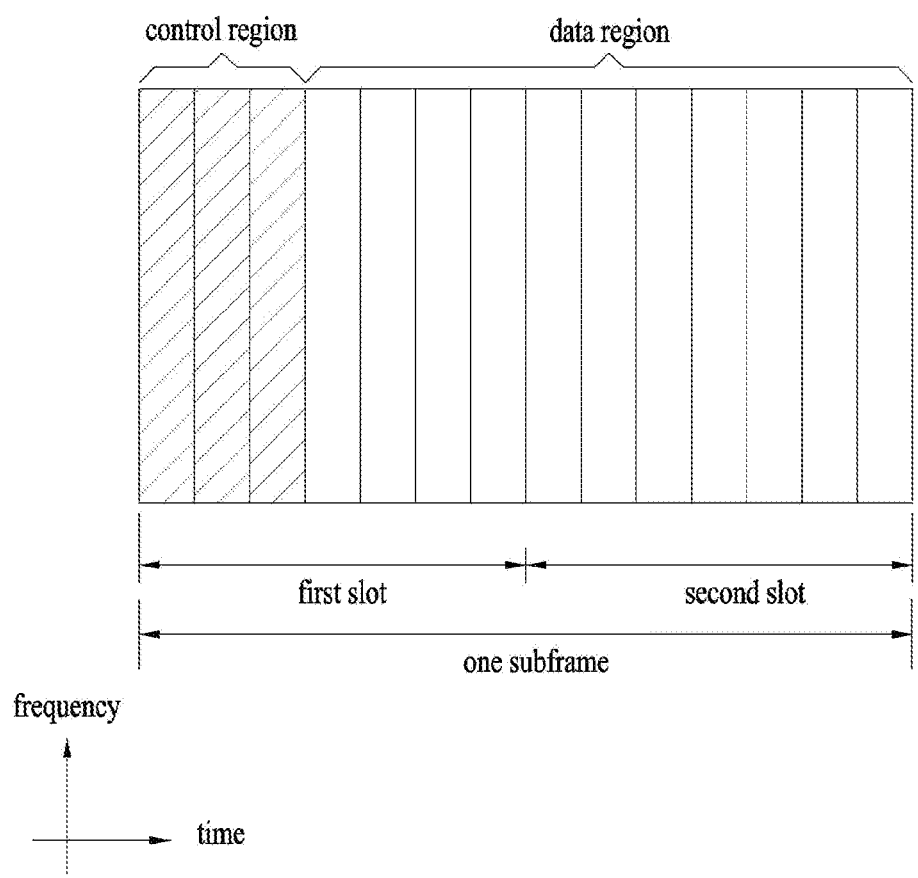
FIG. 5 is a view illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a physical control format indicator channel (PCFICH), a PDCCH, and a physical hybrid ARQ indicator channel (PHICH).

The PCFICH is transmitted in the first OFDM symbol of a subframe, carrying information about the number of OFDM symbols used for transmission of control channels (i.e. the size of the control region) in the subframe. The 1.2 Physical Downlink Control Channel (PDCCH)

1.2.1 PDCCH Overview

The PDCCH may deliver information about resource allocation and a transport format for a downlink shared channel (DL-SCH) (i.e. a DL grant), information about resource allocation and a transport format for an uplink shared channel (UL-SCH) (i.e. a UL grant), paging information of a paging channel (PCH), system information on the DL-SCH, information about resource allocation for a higher-layer control message such as a random access response transmitted on the PDSCH, a set of Tx power control commands for individual UEs of a UE group, voice over Internet protocol (VoIP) activation indication information, etc.

A plurality of PDCCHs may be transmitted in the control region. A UE may monitor a plurality of PDCCHs. A PDCCH is transmitted in an aggregate of one or more consecutive control channel elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four quadrature phase shift keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by NREG. Then the number of CCEs available to the system is NCCE ($=\lfloor N_{REG}/9 \rfloor$) and the CCEs are indexed from 0 to NCCE-1.

To simplify the decoding process of a UE, a PDCCH format including n CCEs may start with a CCE having an index equal to a multiple of n. That is, given CCE i, the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCE (n) | Number of REG | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or modulation and coding scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
| --- | --- |
| Format 0 | Resource grants for PUSCH transmissions (uplink) |
| Format 1 | Resource assignments for single codeword PDSCH transmission (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g., paging/broadcast system information) |
| Format 1D | Compact resource assignments for PDSCH using multi-user MIMO(mode 5) |
| Format 2 | Resource assignments for PDSCH for closed loop MIMO operation (mode 4) |
| Format 2A | resource assignments for PDSCH for open loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of transmission power control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. radio resource control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, multi-user multiple input multiple output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the signal to interference plus noise ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);
(2) Transmission mode 2: Transmit diversity;
(3) Transmission mode 3: Open-loop spatial multiplexing when the number of layer is larger than 1 or Transmit diversity when the rank is 1;
(4) Transmission mode 4: Closed-loop spatial multiplexing;
(5) Transmission mode 5: MU-MIMO;
(6) Transmission mode 6: Closed-loop rank-1 precoding;
(7) Transmission mode 7: Precoding supporting a single layer transmission, which is not based on a codebook (Rel-8);
(8) Transmission mode 8: Precoding supporting up to two layers, which are not based on a codebook (Rel-9);
(9) Transmission mode 9: Precoding supporting up to eight layers, which are not based on a codebook (Rel-10); and
(10) Transmission mode 10: Precoding supporting up to eight layers, which are not based on a codebook, used for CoMP (Rel-11).

1.2.3 PDCCH Transmission

The eNB determines a PDCCH format according to DCI that will be transmitted to the UE and adds a cyclic redundancy check (CRC) to the control information. The CRC is masked by a unique identifier (ID) (e.g. a radio network temporary identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a paging-RNTI (P-RNTI)). If the PDCCH carries system information, particularly, a system information block (SIB), its CRC may be masked by a system information ID (e.g. a system information RNTI (SI-RNTI)). To indicate that the PDCCH carries a random access response to a random access preamble transmitted by a UE, its CRC may be masked by a random access-RNTI (RA-RNTI).

Then, the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE NCCE,k−1. NCCE,k is the total number of CCEs in the control region of a kth subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a discontinuous reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of search space (SS) is defined for blind decoding of a UE. An SS is a set of PDCCH candidates that a UE will monitor. The SS may have a different size for each PDCCH format. There are two types of SSs, common search space (CSS) and UE-specific/dedicated search space (USS).

While all UEs may know the size of a CSS, a USS may be configured for each individual UE. Accordingly, a UE should monitor both a CSS and a USS to decode a PDCCH.

As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting position of a USS.

[Table 4] illustrates the sizes of CSSs and USSs.

TABLE 4

| PDCCH Format | Number of CCE (n) | Number of candidates in CSS | Number of candidates in USS |
|---|---|---|---|
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1,2,4,8\}$. The CCEs of PDCCH candidate set m in the SS may be determined by the following equation.

$$L \cdot \{(Y_k + m) \bmod \lfloor N_{CCE,k}/L \rfloor\} + i \qquad \text{[Equation 1]}$$

Herein, $M^{(L)}$ is the number of PDCCH candidates with CCE aggregation level L to be monitored in the SS, m=0,Λ, $M^{(L)}$−1, i is the index of a CCE in each PDCCH candidate, and i=0, Λ, L−1. k=$\lfloor n_s/2 \rfloor$ where n is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 5

| Type | Search space $S_k^{(L)}$ Aggregation level L | Search space $S_k^{(L)}$ Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |

TABLE 5-continued

| Type | Search space $S_k^{(L)}$ Aggregation level L | Size [in CCEs] | Number of PDCCH candidates $M^{(L)}$ |
|---|---|---|---|
| Common | 4 | 16 | 4 |
|  | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k = (A \cdot Y_{k-1}) \bmod D \quad \text{[Equation 2]}$$

Herein, $Y^{-1} = n_{RNTI} \neq 0$, $n_{RNTI}$ indicating an RNTI value. A=39827 and D=65537.

1.3. PUCCH (Physical Uplink Control Channel)

PUCCH may include the following formats to transmit control information.

(1) Format 1: On-off keying (OOK) modulation, used for SR (Scheduling Request)
(2) Format 1a & 1b: Used for ACK/NACK transmission
1) Format 1a: BPSK ACK/NACK for 1 codeword
2) Format 1b: QPSK ACK/NACK for 2 codewords
(3) Format 2: QPSK modulation, used for CQI transmission
(4) Format 2a & Format 2b: Used for simultaneous transmission of CQI and ACK/NACK
(5) Format 3: Used for multiple ACK/NACK transmission in a carrier aggregation environment

[Table 6] shows a modulation scheme according to PUCCH format and the number of bits per subframe. Table 7 shows the number of reference signals (RS) per slot according to PUCCH format. [Table 7] shows SC-FDMA symbol locations of RSs according to PUCCH formats. In [Table 6], PUCCH format 2a and PUCCH format 2b correspond to a normal cyclic prefix (CP) case.

TABLE 6

| PUCCH format | Modulation scheme | Number of bits per subframe, M bits |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |
| 3 | QPSK | 48 |

TABLE 7

| PUCCH format | Normal CP | Extended CP |
|---|---|---|
| 1, 1a, 1b | 3 | 2 |
| 2, 3 | 2 | 1 |
| 2a, 2b | 2 | N/A |

TABLE 8

| | SC-FDMA symbol location of RS | |
|---|---|---|
| PUCCH format | Normal CP | Extended CP |
| 1, 1a, 1b | 2, 3, 4 | 2, 3 |
| 2, 3 | 1, 5 | 3 |
| 2a, 2b | 1, 5 | N/A |

Figure 6:
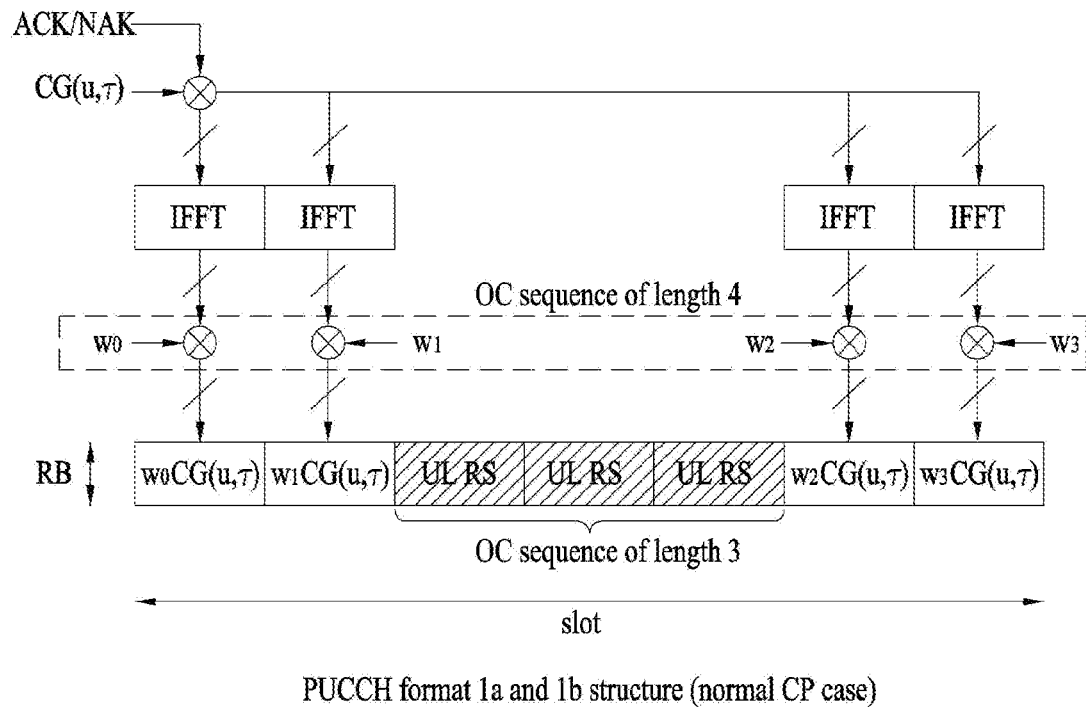
FIG. 6 is a view illustrating physical uplink control channel (PUCCH) formats 1a and 1b in a normal cyclic prefix (CP) case.
Figure 7:
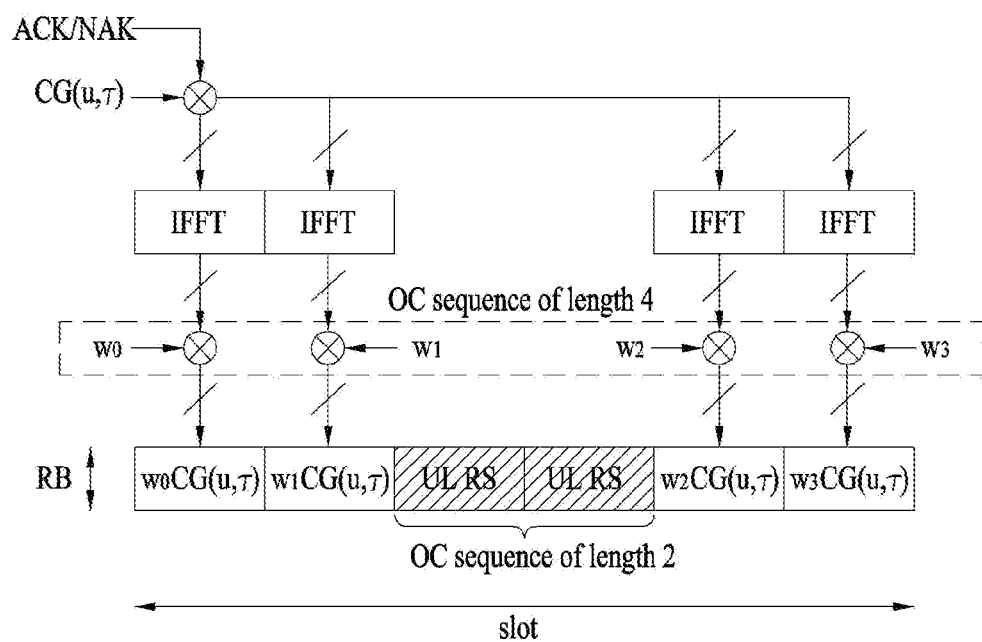
FIG. 7 is a view illustrating PUCCH formats 1a and 1b in an extended CP case.

FIG. 6 illustrates PUCCH formats 1a and 1b in a normal CP case, and FIG. 7 illustrates PUCCH formats 1a and 1b in an extended CP case.

According to the PUCCH formats 1a and 1b, control information of the same contents is repeated on a slot basis in a subframe. Each UE transmits an ACK/NACK signal in a different resource configured with a different cyclic shift (CS) (frequency domain code) and an orthogonal cover (OC) or orthogonal cover code (OCC) (time domain spreading code) of a computer-generated constant amplitude zero auto correlation (CG-CAZAC) sequence. For instance, the OC includes Walsh/DFT orthogonal code. If the number of CS and the number of OC are 6 and 3, respectively, total 18 UEs may be multiplexed within the same physical resource block (PRB) with reference to a single antenna. Orthogonal sequences w0, w1, w2 and w3 may be applicable to a random time domain (after FFT modulation) or a random frequency domain (before FFT modulation).

For persistent scheduling with SR, ACK/NACK resource constructed with CS, OC and PRB may be allocated to a UE through RRC (radio resource control. For non-persistent scheduling with dynamic ACK/NACK, the ACK/NACK resource may be implicitly allocated to a UE using a smallest CCE index of PDCCH corresponding to PDSCH.

Length-4 OC and length-3 OC for PUCCH format 1/1a/1b are shown in [Table 9] and [Table 10], respectively.

TABLE 9

| Sequence index $n_{oc}(n_s)$ | Orthogonal sequences $[w(0) \Lambda w(N_{SF}^{PUCCH} - 1)]$ |
|---|---|
| 0 | [+1 +1 +1 +1] |
| 1 | [+1 −1 +1 −1] |
| 2 | [+1 −1 −1 +1] |

TABLE 10

| Sequence index $n_{oc}(n_s)$ | Orthogonal sequences $[w(0) \Lambda w(N_{SF}^{PUCCH} - 1)]$ |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Orthogonal sequence (OC) $[\overline{w}(0) \Lambda \overline{w}(N_{RS}^{PUCCH}-1)]$ for a reference signal in PUCCH format 1/1a/1b is shown in [Table 11].

TABLE 11

| Sequence index $\overline{n}_{oc}(n_s)$ | Normal cyclic prefix | Extended cyclic prefix |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

Figure 8:
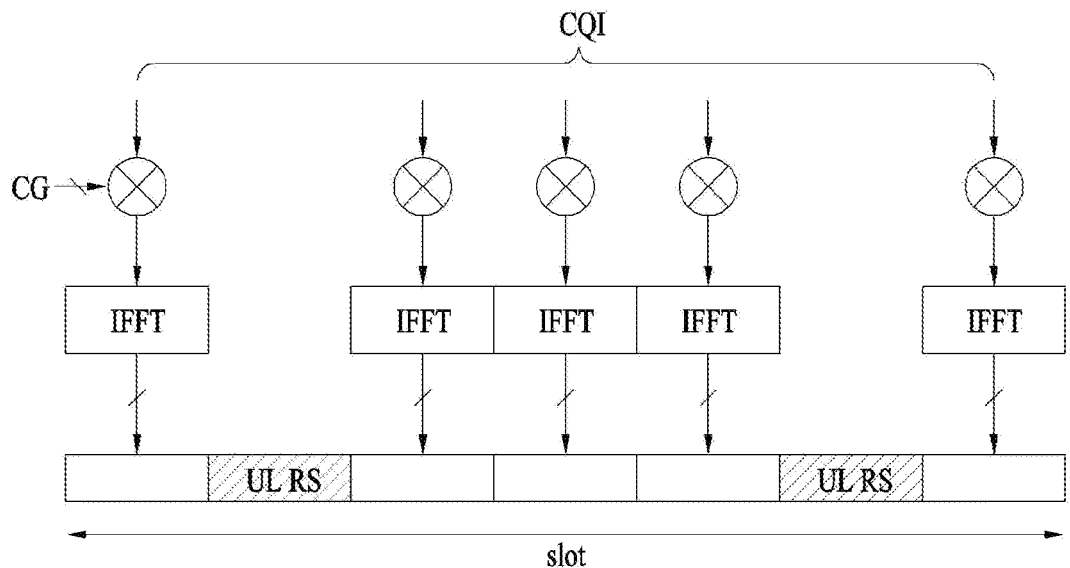
FIG. 8 is a view illustrating PUCCH format 2/2a/2b in the normal CP case.
Figure 9:
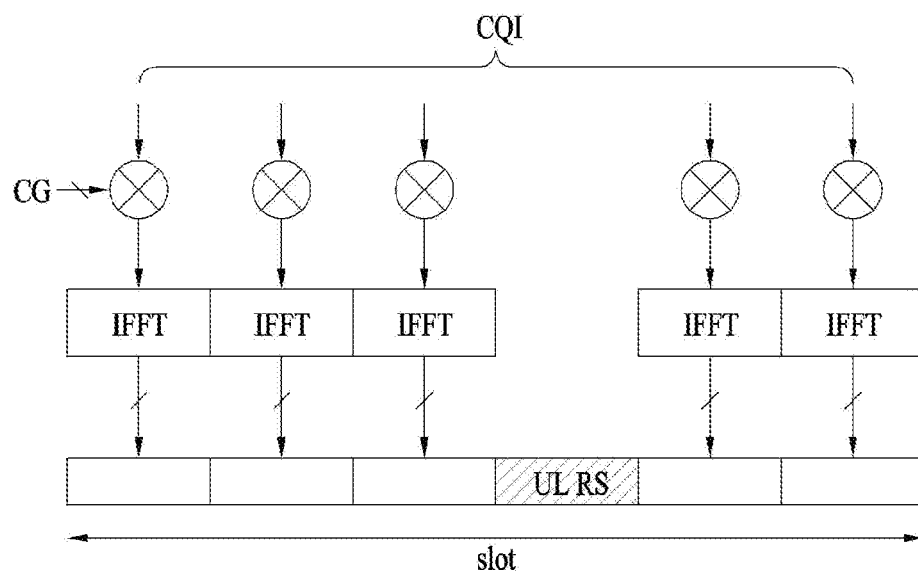
FIG. 9 is a view illustrating PUCCH format 2/2a/2b in the extended CP case.

FIG. 8 illustrates PUCCH format 2/2a/2b in a normal CP case, and FIG. 9 illustrates PUCCH format 2/2a/2b in an extended CP case.

Referring to FIG. 8 and FIG. 9, in the normal CP case, a subframe is constructed with 10 QPSK data symbols as well as RS symbol. Each QPSK symbol is spread in a frequency domain by CS and is then mapped to a corresponding SC-FDMA symbol. SC-FDMA symbol level CS hopping may be applied to randomize inter-cell interference. The RS may be multiplexed by CDM using a cyclic shift. For instance, assuming that the number of available CSs is 12, 12 UEs may be multiplexed in the same PRB. For instance, assuming that the number of available CSs is 6, 6 UEs may be multiplexed in the same PRB. In brief, a plurality of UEs in PUCCH format 1/1a/1b and PUCCH format 2/2a/2b may be multiplexed by 'CS+OC+PRB' and 'CS+PRB', respectively.

FIG. 10 is a diagram of ACK/NACK channelization for PUCCH formats 1a and 1b. In particular, FIG. 10 corresponds to a case of 'Δshift PUCCH=2'

Figure 11:
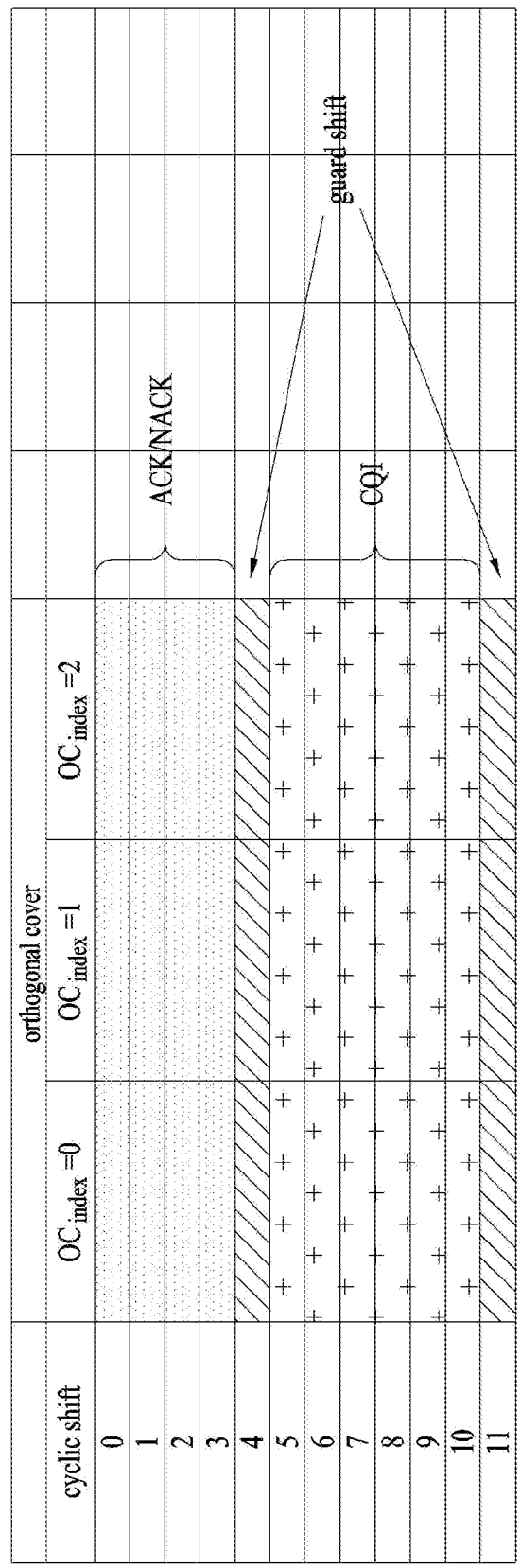
FIG. 11 is a view illustrating channelization for a hybrid structure of PUCCH format 1a/1b and PUCCH format 2/2a/2b in the same physical resource block (PRB)

FIG. 11 is a diagram of channelization for a hybrid structure of PUCCH format 1/1a/1b and PUCCH format 2/2a/2b.

CS hopping and OC remapping may be applicable in a following manner.

(1) Symbol-based cell-specific CS hopping for randomization of inter-cell interference (2) Slot level CS/OC remapping 1) For inter-cell interference randomization 2) Slot based access for mapping between ACK/NACK channel and resource (k)

Meanwhile, resource nr for PUCCH format 1/1a/1b may include the following combinations.

(1) CS(=equal to DFT orthogonal code at symbol level) (ncs)

(2) OC (OC at a slot level) (noc)

(3) Frequency RB (nrb)

If indexes indicating CS, OC and RB are set to ncs, noc, nrb, respectively, a representative index nr may include ncs, noc and nrb. In this case, the nr may meet the condition of 'nr=(ncs, noc, nrb)'.

The combination of CQI, PMI, RI, CQI and ACK/NACK may be delivered through the PUCCH format 2/2a/2b. And, Reed Muller (RM) channel coding may be applicable.

For instance, channel coding for UL CQI in LTE system may be described as follows. First of all, bitstreams $a_0$, $a_1$, $a_2$, $a_3$, . . . , $a_{A-1}$ may be coded using (20, A) RM code. In this case, $a_0$ and $a_{A-1}$ indicates most significant bit (MSB) and least significant bit (LSB), respectively. In case of an extended cyclic prefix, maximum information bits include 11 bits except a case that CQI and ACK/NACK are simultaneously transmitted. After coding has been performed with 20 bits using the RM code, QPSK modulation may be applied. Before the BPSK modulation, coded bits may be scrambled.

[Table 12] shows a basic sequence for (20, A) code.

Channel coding bits $b_0$, $b_1$, $b_2$, $b_3$, . . . , $b_{B-1}$ may be generated by [Equation 3].

$$b_i = \sum_{n=0}^{A-1} (a_n \cdot M_{i,n}) \mod 2 \quad \text{[Equation 3]}$$

In [Equation 3], 'i=0, 1, 2, . . . , B-1' is met.

In case of wideband repots, a bandwidth of UCI field for CQI/PMI can be represented as [Table 8] to [Table 10] in the following.

[Table 13] shows UCI field for broadband report (single antenna port, transmit diversity) or open loop spatial multiplexing PDSCH CQI feedback.

TABLE 13

| Field | Bandwidth |
| --- | --- |
| Wideband CQI | 4 |

[Table 14] shows UCI field for CQI and PMI feedback in case of wideband reports (closed loop spatial multiplexing PDSCH transmission).

TABLE 14

| | Bandwidth | | | |
| --- | --- | --- | --- | --- |
| | 2 antenna ports | | 4 antenna ports | |
| Field | rank = 1 | rank = 2 | rank = 1 | Rank > 1 |
| Wideband CQI | 4 | 4 | 4 | 4 |
| Spatial differential CQI | 0 | 3 | 0 | 3 |
| Precoding Matrix Indication | 2 | 1 | 4 | 4 |

TABLE 12

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
| --- | --- | --- | --- | --- | --- | --- | --- | --- | --- | --- | --- | --- | --- |
| 0  | 1 | 1 | 0 | 0 | 0 | 0 | 0 | 0 | 0 | 0 | 1 | 1 | 0 |
| 1  | 1 | 1 | 1 | 0 | 0 | 0 | 0 | 0 | 0 | 1 | 1 | 1 | 0 |
| 2  | 1 | 0 | 0 | 1 | 0 | 0 | 1 | 0 | 1 | 1 | 1 | 1 | 1 |
| 3  | 1 | 0 | 1 | 1 | 0 | 0 | 0 | 0 | 1 | 0 | 1 | 1 | 1 |
| 4  | 1 | 1 | 1 | 1 | 0 | 0 | 0 | 1 | 0 | 0 | 1 | 1 | 1 |
| 5  | 1 | 1 | 0 | 0 | 1 | 0 | 1 | 1 | 1 | 0 | 1 | 1 | 1 |
| 6  | 1 | 0 | 1 | 0 | 1 | 0 | 1 | 0 | 1 | 1 | 1 | 1 | 1 |
| 7  | 1 | 0 | 0 | 1 | 1 | 0 | 0 | 1 | 1 | 0 | 1 | 1 | 1 |
| 8  | 1 | 1 | 0 | 1 | 1 | 0 | 0 | 1 | 0 | 1 | 1 | 1 | 1 |
| 9  | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 0 | 0 | 1 | 0 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

[Table 15] shows UCI field for RI feedback in case of wideband reports.

TABLE 15

| Field | Bit widths | | |
|---|---|---|---|
| | 2 antenna ports | 4 antenna ports | |
| | | Max. 2 layers | Max. 4 layers |
| Rank Indication | 1 | 1 | 2 |

FIG. 12 is a diagram for PRB allocation. Referring to FIG. 12, PRB may be usable for PUCCH transmission in slot $n_s$.

2. Carrier Aggregation (CA) Environment 2.1 CA Overview

A 3GPP LTE system (conforming to Rel-8 or Rel-9) (hereinafter, referred to as an LTE system) uses multi-carrier modulation (MCM) in which a single component carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of radio frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a primacy cell (PCell) and a secondary cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a primary CC (PCC) and a PCell may be used in the same meaning and a secondary CC (SCC) and an SCell may be used in the same meaning in embodiments of the present disclosure.

Figure 13:
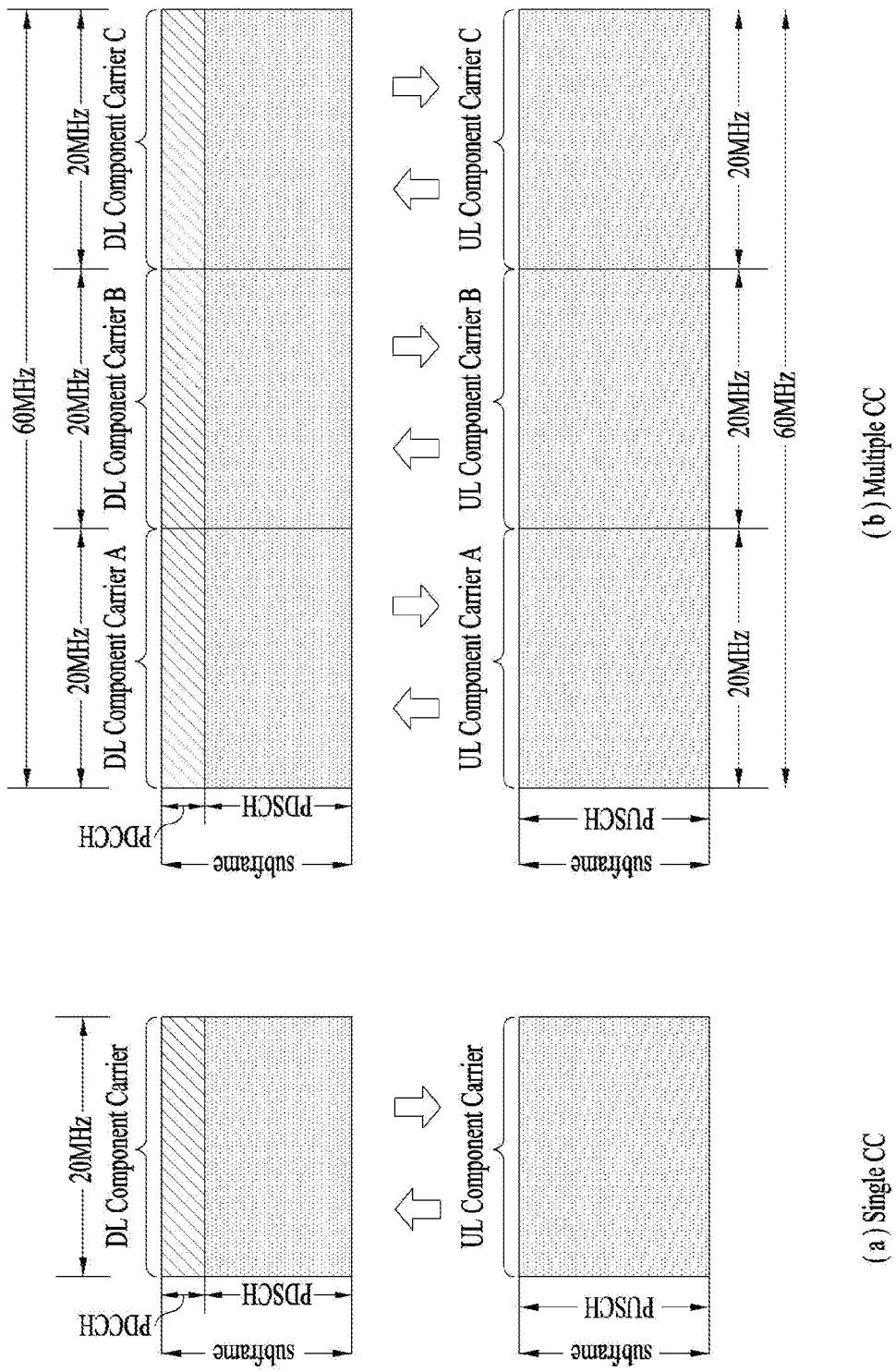
FIG. 13 is a view illustrating exemplary component carriers (CCs) and exemplary carrier aggregation (CA) in a Long Term Evolution-Advanced (LTE-A) system, which are used in embodiments of the present disclosure.

FIG. 13 illustrates an example of CCs and CA in the LTE-A system, which are used in embodiments of the present disclosure.

FIG. 13(a) illustrates a single carrier structure in the LTE system. There are a DL CC and a UL CC and one CC may have a frequency range of 20 MHz.

FIG. 13(b) illustrates a CA structure in the LTE-A system. In the illustrated case of FIG. 13(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher layer message such as an RRC message or by system information. For example, a set of DL resources and UL resources may be configured based on linkage indicated by system information block type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher layer signaling (e.g. RRC signaling).

If cross carrier scheduling is activated, a carrier indicator field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 14:
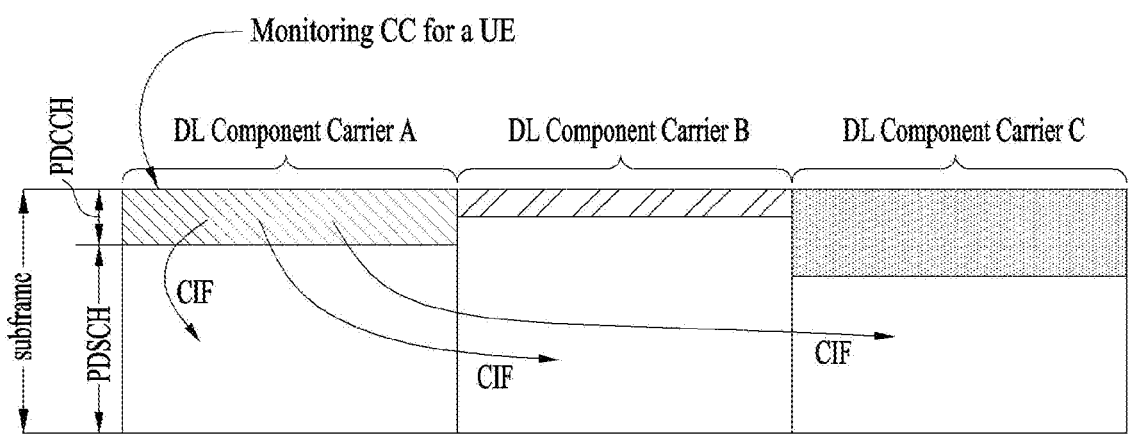
FIG. 14 is a view illustrating a subframe structure based on cross-carrier scheduling in the LTE-A system, which is used in embodiments of the present disclosure.

FIG. 14 illustrates a cross carrier-scheduled subframe structure in the LTE-A system, which is used in embodiments of the present disclosure.

Referring to FIG. 14, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

Figure 15:
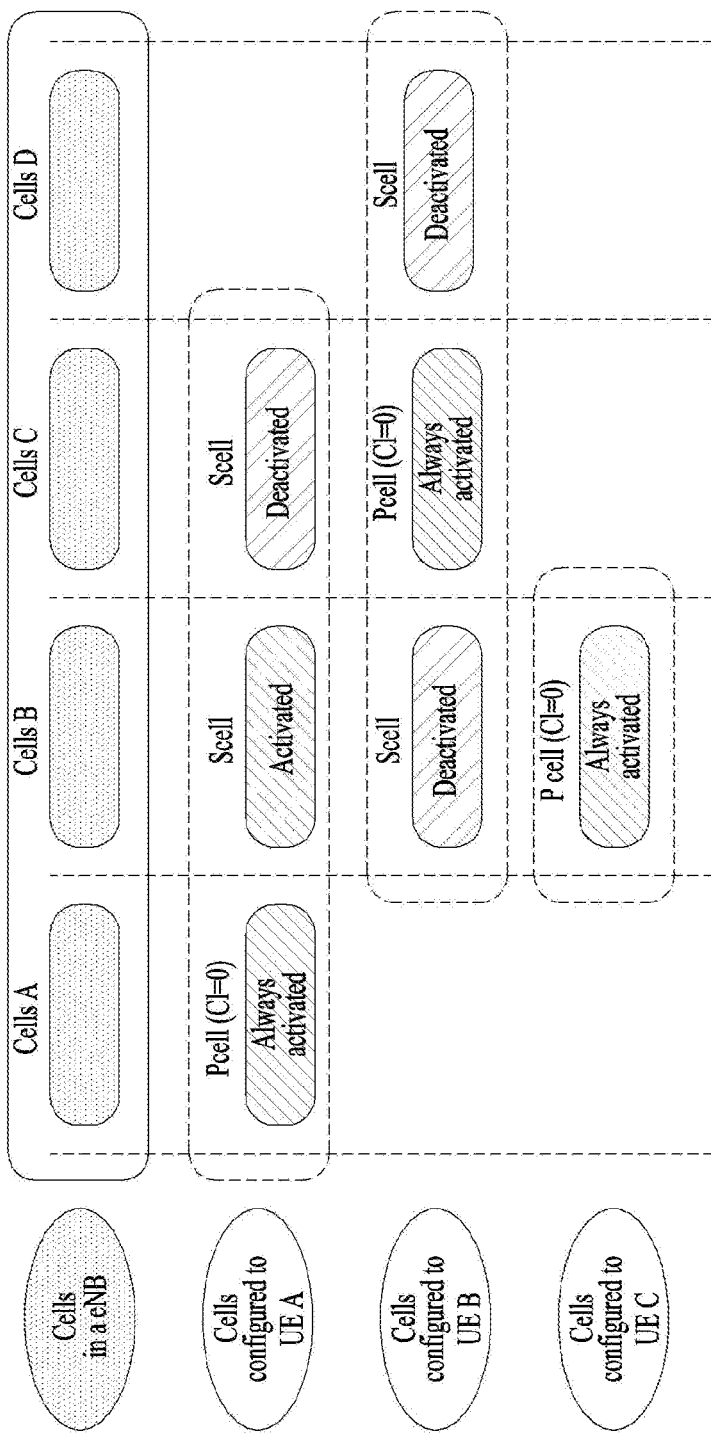
FIG. 15 is a view illustrating an exemplary configuration of serving cells according to cross-carrier scheduling used in embodiments of the present disclosure.

FIG. 15 is conceptual diagram illustrating a construction of serving cells according to cross-carrier scheduling.

Referring to FIG. 15, an eNB (or BS) and/or UEs for use in a radio access system supporting carrier aggregation (CA) may include one or more serving cells. In FIG. 8, the eNB can support a total of four serving cells (cells A, B, C and D). It is assumed that UE A may include Cells (A, B, C), UE B may include Cells (B, C, D), and UE C may include Cell B. In this case, at least one of cells of each UE may be composed of P Cell. In this case, P Cell is always activated, and SCell may be activated or deactivated by the eNB and/or UE.

The cells shown in FIG. 15 may be configured per UE. The above-mentioned cells selected from among cells of the eNB, cell addition may be applied to CA on the basis of a measurement report message received from the UE. The configured cell may reserve resources for ACK/NACK message transmission in association with PDSCH signal transmission. The activated cell is configured to actually transmit a PDSCH signal and/or a PUSCH signal from among the configured cells, and is configured to transmit CSI reporting and sounding reference signal (SRS) transmission. The deactivated cell is configured not to transmit/receive PDSCH/PUSCH signals by an eNB command or a timer operation, and CRS reporting and SRS transmission are interrupted.

2.3 Channel State Information (CSI) Feedback on PUCCH

First of all, in the 3GPP LTE system, when a DL reception entity (e.g., UE) is connected to a DL transmission entity (e.g., BS), the DL reception entity performs measurement on a reference signal received power (RSRP) of a reference signal transmitted in DL, a quality of a reference signal (reference signal received quality (RSRQ)) and the like at a random time and is then able to make a periodic or even-triggered report of a corresponding measurement result to the BS.

Each UE reports a DL channel information in accordance with a DL channel status via uplink. A base station is then able to determine time/frequency resources, MCS (modulation and coding scheme) and the like appropriate for a data transmission to each UE using the DL channel information received from the each UE.

Such channel state information (CSI) may include channel quality indicator (CQI), precoding matrix indicator (PMI), precoder type indication (PTI) and/or rank indication (RI). In particular, the CSI may be transmitted entirely or partially depending on a transmission mode of each UE. CQI is determined based on a received signal quality of a UE, which may be generally determined on the basis of a measurement of a DL reference signal. In doing so, a CQI value actually delivered to a base station may correspond to an MCS capable of providing maximum performance by maintaining a block error rate (BLER) under 10% in the received signal quality measured by a UE.

This channel information reporting may be classified into a periodic report transmitted periodically and an aperiodic report transmitted in response to a request made by a BS.

In case of the aperiodic report, it is set for each UE by a 1-bit request bit (CQI request bit) contained in UL scheduling information downloaded to a UE by a BS. Having received this information, each UE is then able to deliver channel information to the BS via a PUSCH in consideration of its transmission mode. And, it may set RI and CQI/PMI not to be transmitted on the same PUSCH.

In case of the periodic report, a period for transmitting channel information via an upper layer signal, an offset in the corresponding period and the like are signaled to each UE by subframe unit and channel information in consideration of a transmission mode of each UE may be delivered to a BS via a PUCCH in accordance with a determined period. In case that data transmitted in uplink simultaneously exists in a subframe in which channel information is transmitted by a determined period, the corresponding channel information may be transmitted together with the data not on the PUCCH but on a PUSCH. In case of the periodic report via PUCCH, bits (e.g., 11 bits) limited further than those of the PUSCH may be used. RI and CQI/PMI may be transmitted on the same PUSCH.

In case that contention occurs between the periodic report and the aperiodic report in the same subframe, only the aperiodic report can be performed.

In calculating Wideband CQI/PMI, a most recently transmitted RI may be usable. RI in a PUCCH CSI report mode is independent from RI in a PUSCH CSI report mode. The RI in the PUSCH CSI report mode is valid for CQI/PMI in the corresponding PUSCH CSI report mode only.

Table 16 is provided to describe CSI feedback type transmitted on PUCCH and PUCCH CSI report mode.

TABLE 16

| | | PMI Feedback Type | |
|---|---|---|---|
| | | No PMI (OL, TD, single-antenna) | Single PMI (CL) |
| CQI Feedback Type | Wideband | Mode 1-0<br>RI (only for Open-Loop SM)<br>One Wideband CQI (4 bit)<br>when RI > 1, CQI of first codeword | Mode 1-1<br>RI<br>Wideband CQI (4 bit)<br>Wideband spatial CQI (3 bit) for RI > 1<br>Wideband PMI (4 bit) |
| | UE Selected | Mode 2-0<br>RI (only for Open-Loop SM)<br>Wideband CQI (4 bit)<br>Best-1 CQI (4 bit) in each BP<br>Best-1 indicator(L-bit label)<br>when RI > 1, CQI of fust codeword | Mode 2-1<br>RI<br>Wideband CQI (4 bit)<br>Wideband spatial CQI (3 bit) for RI > 1<br>Wideband PMI (4 bit)<br>Best-1 CQI (4 bit) 1 in each BP<br>Best-1 spatial CQI (3 bit) for RI > 1<br>Best-1 indicator (L-bit label) |

Referring to [Table 16], in the periodic report of channel information, there are 4 kinds of reporting modes (mode 1-0, mode 1-2, mode 2-0 and mode 2-1) in accordance with CQI and PMI feedback types.

CQI can be classified into wideband (WB) CQI and subband (SB) CQI in accordance with CQI feedback type and PMI can be classified into No PMI or Single PMI in accordance with a presence or non-presence of PMI transmission. In [Table 11], No PMI corresponds to a case of open-loop (OL), transmit diversity (TD) and single-antenna, while Single PMI corresponds to a case of closed-loop (CL).

The mode 1-0 corresponds to a case that WB CQI is transmitted in the absence of PMI transmission. In this case, RI is transmitted only in case of OL spatial multiplexing (SM) and one WB CQI represented as 4 bits can be transmitted. If an RI is greater than 1, a CQI for a first codeword may be transmitted.

Mode 1-1 corresponds to a case that a single PMI and WB CQI are transmitted. In this case, 4-bit WB CQI and 4-bit WB PMI can be transmitted together with RI transmission. Additionally, if RI is greater than 1, 3-bit WB spatial differential CQI can be transmitted. In 2-codeword transmission, the WB spatial differential CQI may indicate a difference value between a WB CQI index for codeword 1 and a WB CQI index for codeword 2. The difference value in-between may have a value selected from a set {−4, −3, −2, −1, 0, 1, 2, 3} and can be represented as 3 bits.

The mode 2-0 corresponds to a case that CQI on a UE-selected band is transmitted in the absence of PMI transmission. In this case, RI is transmitted only in case of open-loop SM and a WB CQI represented as 4 bits may be transmitted. A best CQI (best-1) is transmitted on each bandwidth part (BP) and the best-1 CQI may be represented as 4 bits. And, an L-bit indicator indicating the best-1 may be transmitted together. If the RI is greater than 1, a CQI for a 1st codeword can be transmitted.

And, Mode 2-1 corresponds to a case that a single PMI and a CQI on a UE-selected band are transmitted. In this case, together with RI transmission, 4-bit WB CQI, 3-bit WB spiral differential CQI and 4-bit WB PMI can be transmitted. Additionally, 4-bit best-1 CQI is transmitted on each BP and L-bit best-1 indicator can be transmitted together. Additionally, if RI is greater than 1, 3-bit best-1 spatial differential CQI can be transmitted. In 2-codeword transmission, it may indicate a difference value between a best-1 CQI index of codeword 1 and a best-1 CQI index of codeword 2.

For the transmission modes, periodic PUCCH CSI report modes are supported as follows.

1) Transmission mode 1: Modes 1-0 and 2-0
2) Transmission mode 2: Modes 1-0 and 2-0
3) Transmission mode 3: Modes 1-0 and 2-0
4) Transmission mode 4: Modes 1-1 and 2-1
5) Transmission mode 5: Modes 1-1 and 2-1
6) Transmission mode 6: Modes 1-1 and 2-1
7) Transmission mode 7: Modes 1-0 and 2-0
8) Transmission mode 8: Modes 1-1 and 2-1 if a UE is set to make a PMI/RI reporting, or Modes 1-0 and 2-0 if a UE is set not to make a PMI/RI reporting
9) Transmission mode 9: Modes 1-1 and 2-1 if a UE is set to make a PMI/RI reporting and the number of CSI-RS ports is greater than 1, or Modes 1-0 and 2-0 if a UE is set not to make a PMI/RI reporting and the number of CSI-RS port(s) is equal to 1.

The periodic PUCCH CSIU reporting mode in each serving cell is set by upper layer signaling. And, Mode 1-1 is set to either submode 1 or submode 2 by an upper layer signaling using a parameter 'PUCCH_format1-_CSI_reporting_mode'.

A CQI reporting in a specific subframe of a specific serving cell in a UE-selected SB CQI means a measurement of at least one channel state of a BP corresponding to a portion of a bandwidth of a serving cell. An index is given to the bandwidth part in a frequency increasing order starting with a lowest frequency without an increment of a bandwidth.

2.4 Method for Transmitting ACK/NACK on PUCCH 2.4.1 ACK/NACK Transmission in LTE System Under the situation that a UE simultaneously transmits a plurality of ACKs/NACKs corresponding to multiple data units received from an eNB, in order to maintain the single-carrier property of ACK/NACK signals and reduce the total ACK/NACK transmission power, ACK/NACK multiplexing method based on PUCCH resource selection can be considered. With ACK/NACK multiplexing, contents of the ACK/NACK signals for multiple data units are identified by the combination of the PUCCH resource used in actual ACK/NACK transmission and the one of QPSK modulation symbols. For example, if it is assumed that one PUCCH resource carries 4 bits and 4 data units can be transmitted in maximum (at this time, assume that HARQ operation for each data unit can be managed by single ACK/NACK bit), the Tx node may identify the ACK/NACK result based on the transmission position of the PUCCH signal and the bits of the ACK/NACK signal as shown in [Table 17] below.

TABLE 17

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In [Table 17], HARQ-ACK(i) indicates the ACK/NACK result for the data unit i. For example, if a maximum of 4 data units is transmitted, i=0, 1, 2, 3. In [Table 17], DTX means that there is no data unit transmitted for corresponding HARQ-ACK(i) or the reception (Rx) node doesn't detect the existence of the data unit corresponding to HARQ-ACK (i).

In addition, $n_{PUCCH,x}^{(1)}$ indicates the PUCCH resource which should be used in actual ACK/NACK transmission, if there are 4 PUCCH resources, a maximum of four PUCCH resources $n_{PUCCH,0}^{(1)}$, $n_{PUCCH,1}^{(1)}$, $n_{PUCCH,2}^{(1)}$ and $n_{PUCCH,3}^{(1)}$ may be allocated to the UE.

In addition, b(0), b(1) indicates two bits carried by the selected PUCCH resource. Modulation symbols which are transmitted through PUCCH resource are decided according to the bits. For example, if the RX node receives and decodes 4 data units successfully, the RX node should transmit two bits, (1, 1), using PUCCH resource $n_{PUCCH,1}^{(1)}$. For another example, if the RX node receives 4 data units and fails in decoding the first and the third data units (corresponding to HARQ-ACK(0) and HARQ-ACK(2)), the RX node should transmit (1, 0) using $n_{PUCCH,3}^{(1)}$.

By linking the actual ACK/NACK contents with the combination of PUCCH resource selection and the actual bit contents in the transmitted PUCCH resource in this way, ACK/NACK transmission using a single PUCCH resource for multiple data units is possible.

In the ACK/NACK multiplexing method (see [Table 17]), basically, NACK and DTX are coupled as NACK/DTX if at least one ACK exists for all data units. This is because combinations of PUCCH resources and QPSK symbols are insufficient to cover all ACK, NACK and DTX hypotheses. On the other hand, for the case that no ACK exists for all data units (in other words, NACK or DTX only exists for all data units), single NACK decoupled with DTX is defined one as HARQ-ACK(i). In this case, PUCCH resource linked to the data unit corresponding to single NACK can be also reserved to transmit the signal of multiple ACKs/NACKs.

2.4.2 ACK/NACK Transmission in LTE-A System

In an LTE-A system (e.g., Rel-10, 11, 12, etc.), transmission of a plurality of ACK/NACK signals for a plurality of PDSCH signals, which is transmitted via a plurality of DL CCs, via a specific UL CC is considered. Unlike ACK/NACK transmission using PUCCH format 1a/1b of an LTE system, a plurality of ACK/NACK signals may be subjected to channel coding (e.g., Reed-Muller coding, Tail-biting convolutional coding, etc.) and then a plurality of ACK/NACK information/signals may be transmitted using PUCCH format 2 or a new PUCCH format (e.g., an E-PUCCH format) modified based on block spreading.

Figure 16:
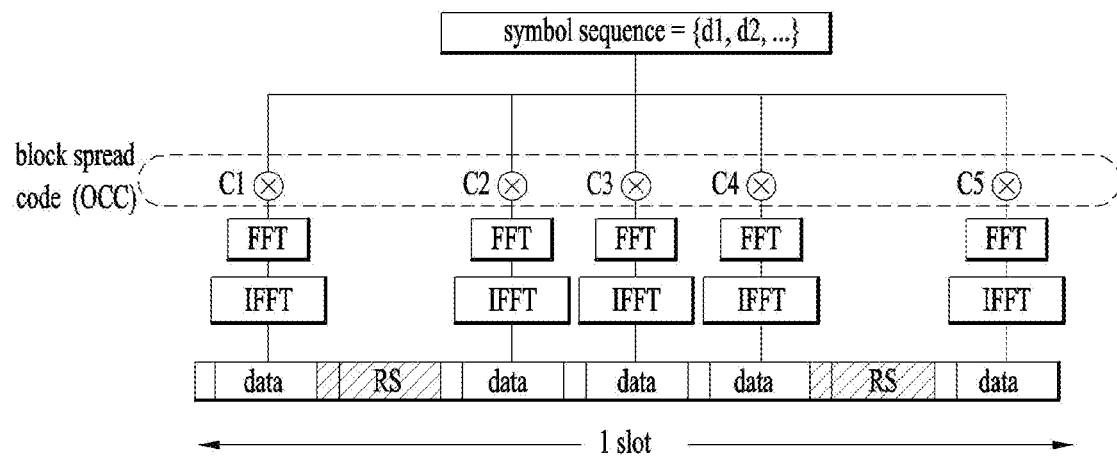
FIG. 16 is a view illustrating an exemplary new PUCCH format based on block spreading.

FIG. 16 shows an example of a new PUCCH format based on block spreading.

A block spreading scheme refers to a method for performing modulation using an SC-FDMA scheme unlike PUCCH format series 1 or 2 in an LTE system. The block spreading scheme refers to a scheme for time-domain spreading and transmitting a symbol sequence using an OCC as shown in FIG. 16. That is, the symbol sequence is spread using the OCC to multiplex control signals of several UEs in the same RB.

In the above-described PUCCH format 2, one symbol sequence is transmitted over the time domain and UE multiplexing is performed using CS of a CAZAC sequence. However, in the new PUCCH format based on block spreading, one symbol sequence is transmitted over the frequency domain and UE multiplexing is performed using time-domain spreading based on an OCC.

For example, as shown in FIG. 16, one symbol sequence may be generated as five SC-FDMA symbols by an OCC of length-5 (that is, SF=5). Although a total of 2 RS symbols is used during one slot in FIG. 16, various methods using three RS symbols and using an OCC of SF=4 may be used. At this time, the RS symbols may be generated from a CAZAC sequence having specific cyclic shift and may be transmitted in the form in which a specific OCC is applied (multiplied by) to a plurality of RS symbols of the time domain.

In the embodiments of the present disclosure, for convenience of description, a multi-ACK/NACK transmission scheme based on channel coding using PUCCH format 2 or a new PUCCH format (e.g., an E-PUCCH format) is defined as a "multi-bit ACK/NACK coding transmission method".

The multi-bit ACK/NACK coding method refers to a method for transmitting ACK/NACK code blocks generated by channel-coding ACK/NACK or DTX information (meaning that the PDCCH is not received/detected) for PDSCH signals transmitted on a plurality of DL CCs.

For example, when the UE operates on a certain DL CC in an SU-MIMO mode and receives two codewords (CWs), the UE may have a maximum of five feedback states including a total of four feedback states of each CW, such as ACK/ACK, ACK/NACK, NACK/ACK and NACK/NACK, and DTX. When the UE receives a single CW, the UE may have a maximum of three states including ACK, NACK and/or DTX. When NACK and DTX are equally processed, the UE may have a total of two states such as ACK and NACK/DTX.

Accordingly, when the UE aggregates a maximum of five DL CCs and the UE operates on all DL CCs in an SU-MIMO mode, the UE may have a maximum of 55 transmittable feedback states. At this time, the size of ACK/NACK payload representing the 55 feedback states may be a total of 12 bits. If DTX and NACK are equally processed, the number of feedback states becomes 45 and the size of the ACK/NACK payload representing the feedback states is a total of 10 bits.

In an ACK/NACK multiplexing (that is, ACK/NACK selection) method applied to an LTE TDD system, fundamentally, an implicit ACK/NACK selection method in which an implicit PUCCH resource corresponding to a PDCCH scheduling each PDSCH (that is, linked to a smallest CCE index) is used for ACK/NACK transmission in order to secure a PUCCH resource of each UE.

In an LTE-A FDD system, transmission of a plurality of ACK/NACK signals for a plurality of PDSCH signals transmitted via a plurality of DL CCs via one UE-specific UL CC is considered. "ACK/NACK selection" methods using an implicit PUCCH resource linked to a PDCCH scheduling some or all DL CCs (that is, linked to a smallest CCE index nCCE or linked to nCCE and nCCE+1) or a combination of an implicit PUCCH and an explicit PUCCH resource pre-allocated to each UE via RRC signaling are considered.

Even in an LTE-A TDD system, aggregation of a plurality of CCs is considered. For example, when a plurality of CCs is aggregated, UE transmitting a plurality of ACK/NACK information/signals for a plurality of PDSCH signals transmitted via a plurality of DL subframes and a plurality of CCs via a specific CC (that is, A/N CC) in UL subframes corresponding to the plurality of DL subframes in which the PDSCH signals are transmitted is considered.

At this time, unlike LTE-A FDD, a method (that is, full ACK/NACK) for transmitting a plurality of ACK/NACK signals corresponding to a maximum number of CWs, which may be transmitted via all CCs allocated to the UE, for a plurality of DL subframes may be considered or a method (that is, bundled ACK/NACK) for applying ACK/NACK bundling to a CW, CC and/or a subframe region, reducing the number of transmitted ACKs/NACKs and performing transmission may be considered.

At this time, CW bundling means that ACK/NACK bundling for CW per CC is applied to each DL subframe and CC bundling means that ACK/NACK bundling for all or some CCs is applied to each DL subframe. In addition, subframe bundling means that ACK/NACK bundling for all or some DL subframes is applied to each CC.

As the subframe bundling method, an ACK counter method indicating a total number of ACKs (or the number of some ACKs) per CC for all PDSCH signals or DL grant PDCCHs received on each DL CC may be considered. At this time, the multi-bit ACK/NACK coding scheme or the ACK/NACK transmission scheme based on the ACK/NACK selection method may be configurably applied according to the size of the ACK/NACK payload per UE, that is, the size of the ACK/NACK payload for transmission of full or bundled ACK/NACK configured per UE.

2.5 Procedure for Transmitting and Receiving PUCCH

In a mobile communication system, one eNB transmits and receives data to and from a plurality of UEs via a wireless channel environment in one cell/sector. In a system operating using multiple carriers or the like, the eNB receives packet traffic from a wired Internet network and transmits the received packet traffic to each UE using a predetermined communication scheme. At this time, downlink scheduling is how the eNB determines when data is transmitted to which UE using which frequency domain. In addition, the eNB receives and demodulates data from the UE using a predetermined communication scheme and transmits packet traffic over a wired Internet network. Uplink scheduling is how the eNB determines when to enable which UE to transmit uplink data using which frequency domain. In general, a UE having a good channel state may transmit and receive data using more time and frequency resources.

Figure 17:
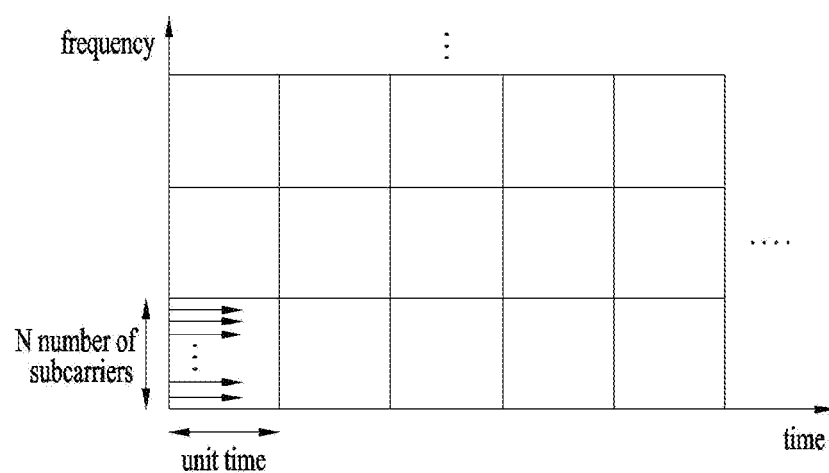
FIG. 17 is a view illustrating an exemplary configuration of a resource block (RB) with time-frequency units.

In a system operating using multiple carriers or the like, resources may be roughly divided into a time domain and a frequency domain. The resources may be defined as resource blocks, which includes N subcarriers and M subframes or predetermined time units. At this time, N and M may be 1. FIG. 17 is a diagram showing an example of configuring a resource block in time-frequency units.

In FIG. 17, one rectangle means one resource block and one resource block has several subcarriers on one axis and has a predetermined time unit (e.g., slots or subframes) on the other axis.

In downlink, an eNB schedules one or more resource blocks to a UE selected according to a determined scheduling rule and transmits data using resource bocks allocated to the UE. In uplink, the eNB schedules one or more resource blocks to a UE selected according to a predetermined scheduling rule and a UE transmits data in uplink using the allocated resources.

An error control method performed when a (sub)frame, in which data is transmitted and received, is lost or damaged after transmitting and receiving data after scheduling includes an automatic repeat request (ARQ) method and a hybrid ARQ (HARQ) method.

In the ARQ method, fundamentally, a transmitter waits for an acknowledgement (ACK) message after transmitting one (sub)frame and a receiver sends the ACK only upon receiving the sub(frame). When an error occurs in the (sub)frame, a negative ACK (NAK) message is sent and information on a reception frame, in which an error occurs, is removed from a receiver buffer. The transmitter transmits a subsequent (sub)frame upon receiving the ACK message but retransmits the (sub)frame upon receiving the NAK message. Unlike the ARQ method, in the HARQ method, when the received frame cannot be demodulated, the receiver transmits the NAK message to the transmitter, but the received frame is stored in a buffer during a predetermined time and is combined with a retransmitted frame, thereby increasing a reception success rate.

Recently, a HARQ method more efficient than the ARQ method is widely used. The HARQ method may be divided into various methods. For example, the HARQ method may be divided into a synchronous HARQ method and an asynchronous HARQ method according to retransmission timing and into a channel-adaptive HARQ method and a channel-non-adaptive HARQ method depending on whether the amount of resources used for retransmission is influenced by a channel state.

The synchronous HARQ method refers to a method of performing subsequent retransmission at timing determined by a system when initial transmission fails. For example, if it is assumed that retransmission is performed every four time units after initial transmission fails, retransmission timing is predetermined between the eNB and the UE and is not signaled. However, when the data transmission side receives a NAK message, the frame is retransmitted every four time units until an ACK message is received.

Meanwhile, the asynchronous HARQ method may be performed by newly scheduling retransmission timing or via additional signaling. The retransmission timing of the previously failed frame may be changed by several factors such as channel state.

The channel-non-adaptive HARQ method refers to a method of using scheduling information (e.g., the modulation method of the frame, the number of used resource blocks, adaptive modulation and coding (AMC), etc.), which is set upon initial transmission, upon retransmission. In contrast, the channel-adaptive HARQ method refers to a method of changing such scheduling information according to the channel state.

For example, in the channel-non-adaptive HARQ method, a transmission side transmits data using six resource blocks upon initial transmission and retransmits data using six resource blocks upon retransmission. In contrast, in the channel-adaptive HARQ method, initial transmission is performed using six resource blocks and retransmission is performed using greater or less than six resource blocks according to the channel state.

Although there are four HARQ methods, the asynchronous and channel-adaptive HARQ method and the synchronous and channel-non-adaptive HARQ method are mainly used. The asynchronous and channel-adaptive HARQ method may maximize retransmission efficiency by adaptively changing the retransmission timing and the amount of used resources according to the channel state but may increase overhead. Accordingly, the asynchronous and channel-adaptive HARQ method is not generally considered for uplink. In contrast, the synchronous and channel-non-adaptive HARQ method may not cause overhead because retransmission timing and resource allocation are predetermined in the system, but has very low retransmission efficiency in a considerably changed channel state.

To this end, in the current 3GPP LTE/LTE-A system, the asynchronous HARQ method is used in downlink and the synchronous HARQ method is used in uplink.

Figure 18:
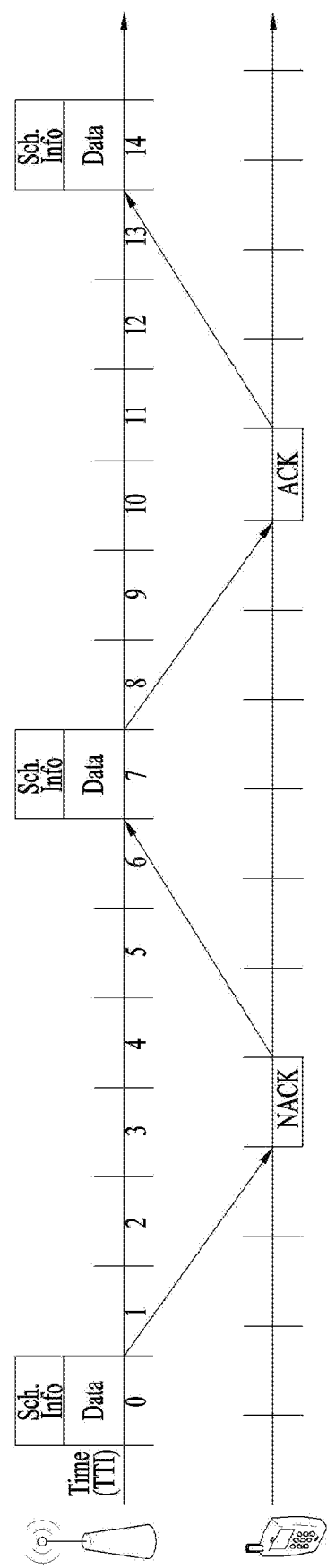
FIG. 18 is a view illustrating an exemplary method for resource allocation and retransmission in asynchronous hybrid automatic repeat request (HARQ)

FIG. 18 is a diagram showing an example of a resource allocation and retransmission method of an asynchronous HARQ method.

When an eNB transmits scheduling information in downlink, receives ACK/NAK information from a UE, and transmits next data, time delay occurs as shown in FIG. 19. This is channel propagation delay and delay occurring due to a time required for data decoding and data encoding.

A method of performing transmission using an independent HARQ process for data transmission without a gap during a delay period is being used. For example, if a shortest period from first data transmission to next data transmission is 7 subframes, data may be transmitted without a gap by setting 7 independent HARQ processes. In an LTE/LTE-A system, a maximum of eight HARQ processes may be allocated to one UE in non-MIMO.

2.6 CA Environment-Based CoMP Operation

Hereinafter, a cooperation multi-point (CoMP) transmission operation applicable to the embodiments of the present disclosure will be described.

In the LTE-A system, CoMP transmission may be implemented using a CA function in the LTE. FIG. 19 is a conceptual view illustrating a CoMP system operating based on a CA environment.

In FIG. 19, it is assumed that a carrier operated as a PCell and a carrier operated as an SCell may use the same frequency band on a frequency axis and are allocated to two eNBs geographically spaced apart from each other. At this time, a serving eNB of UE1 may be allocated to the PCell, and a neighboring cell causing much interference may be allocated to the SCell. That is, the eNB of the PCell and the eNB of the SCell may perform various DL/UL CoMP operations such as joint transmission (JT), CS/CB and dynamic cell selection for one UE.

FIG. 19 illustrates an example that cells managed by two eNBs are aggregated as PCell and SCell with respect to one UE (e.g., UE1). However, as another example, three or more cells may be aggregated. For example, some cells of three or more cells may be configured to perform CoMP operation for one UE in the same frequency band, and the other cells may be configured to perform simple CA operation in different frequency bands. At this time, the PCell does not always need to participate in CoMP operation.

2.7 Reference Signal (RS)

Now, a description will be given of RSs which may be used in embodiments of the present disclosure.

Figure 20:
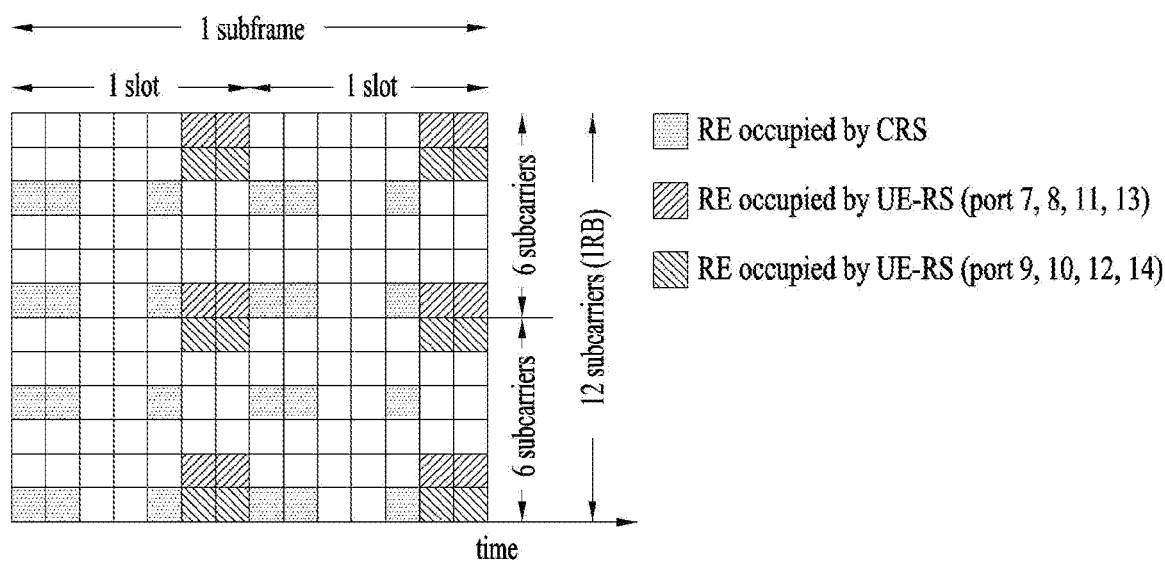
FIG. 20 is a view illustrating an exemplary subframe to which user equipment (UE)-specific reference signals (RSs) (UE-RSs) are allocated, which may be used in embodiments of the present disclosure.

FIG. 20 illustrates an example of a subframe to which UE-RSs are allocated, which may be used in embodiments of the present disclosure.

Referring to FIG. 20, the subframe illustrates REs occupied by UE-RSs among REs in one RB of a normal DL subframe having a normal CP.

UE-RSs are transmitted on antenna port(s) p=5, p=7, p=8 or p=7, 8, . . . v+6 for PDSCH transmission, where v is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped.

The UE-RSs are configured to be transmitted only on RB(s) to which a PDSCH is mapped in a subframe in which the PDSCH is scheduled unlike CRSs configured to be transmitted in every subframe irrespective of whether the PDSCH is present. Accordingly, overhead of the RS may decrease relative to overhead of the CRS.

In the 3GPP LTE-A system, the UE-RSs are defined in a PRB pair. Referring to FIG. 19, in a PRB having frequency-domain index nPRB assigned for PDSCH transmission with respect to p=7, p=8, or p=7,8, . . . , v+6, a part of UE-RS sequence r(m) is mapped to complex-valued modulation symbols.

UE-RSs are transmitted through antenna port(s) corresponding respectively to layer(s) of a PDSCH. That is, the number of UE-RS ports is proportional to a transmission rank of the PDSCH. Meanwhile, if the number of layers is 1 or 2, 12 REs per RB pair are used for UE-RS transmission and, if the number of layers is greater than 2, 24 REs per RB pair are used for UE-RS transmission. In addition, locations of REs occupied by UE-RSs (i.e. locations of UE-RS REs) in a RB pair are the same with respect to a UE-RS port regardless of a UE or a cell.

As a result, the number of DM-RS REs in an RB to which a PDSCH for a specific UE in a specific subframe is mapped is the same per UE-RS ports. Notably, in RBs to which the PDSCH for different UEs in the same subframe is allocated, the number of DM-RS REs included in the RBs may differ according to the number of transmitted layers.

The UE-RS can be used as the DM-RS in the embodiments of the present disclosure.

2.8 Enhanced PDCCH (EPDCCH)

In the 3GPP LTE/LTE-A system, cross-carrier scheduling (CCS) in an aggregation status for a plurality of component carriers (CC: component carrier=(serving) cell) will be defined. One scheduled CC may previously be configured to be DL/UL scheduled from another one scheduling CC (that is, to receive DL/UL grant PDCCH for a corresponding scheduled CC). At this time, the scheduling CC may basically perform DL/UL scheduling for itself. In other words, a Search Space (SS) for a PDCCH for scheduling scheduling/scheduled CCs which are in the CCS relation may exist in a control channel region of all the scheduling CCs.

Meanwhile, in the LTE system, FDD DL carrier or TDD DL subframes are configured to use first n (n<=4) OFDM symbols of each subframe for transmission of physical channels for transmission of various kinds of control information, wherein examples of the physical channels include a PDCCH, a PHICH, and a PCFICH. At this time, the number of OFDM symbols used for control channel transmission at each subframe may be delivered to the UE dynamically through a physical channel such as PCFICH or semi-statically through RRC signaling.

Figure 21:
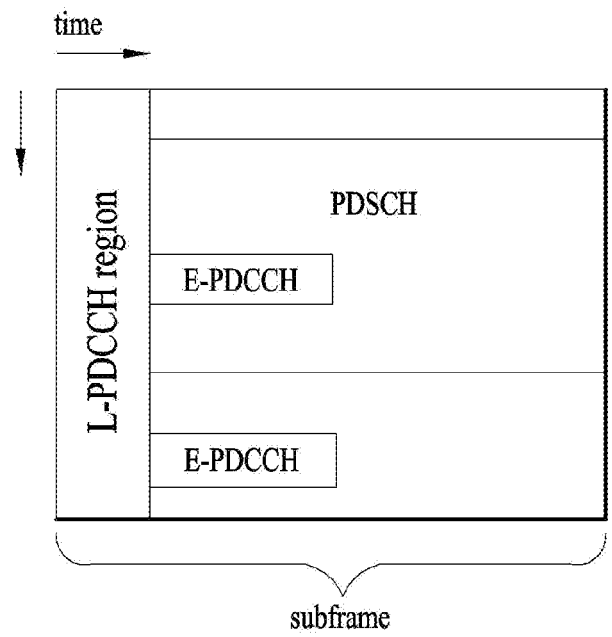
FIG. 21 is a view illustrating an exemplary multiplexing of a legacy physical downlink channel (PDCCH), a physical downlink shared channel (PDSCH), and an enhanced PDCCH (E-PDCCH) in the LTE/LTE-A system.

Meanwhile, in the LTE/LTE-A system, since a PDCCH which is a physical channel for DL/UL scheduling and transmitting various kinds of control information has a limitation that it is transmitted through limited OFDM symbols, enhanced PDCCH (i.e., E-PDCCH) multiplexed with a PDSCH more freely in a way of FDM/TDM may be introduced instead of a control channel such as PDCCH, which is transmitted through OFDM symbol and separated from PDSCH. FIG. 21 illustrates an example that legacy PDCCH, PDSCH and E-PDCCH, which are used in an LTE/LTE-A system, are multiplexed.

3. LTE-U system 3.1 LTE-U System Configuration

Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band.

Figure 22:
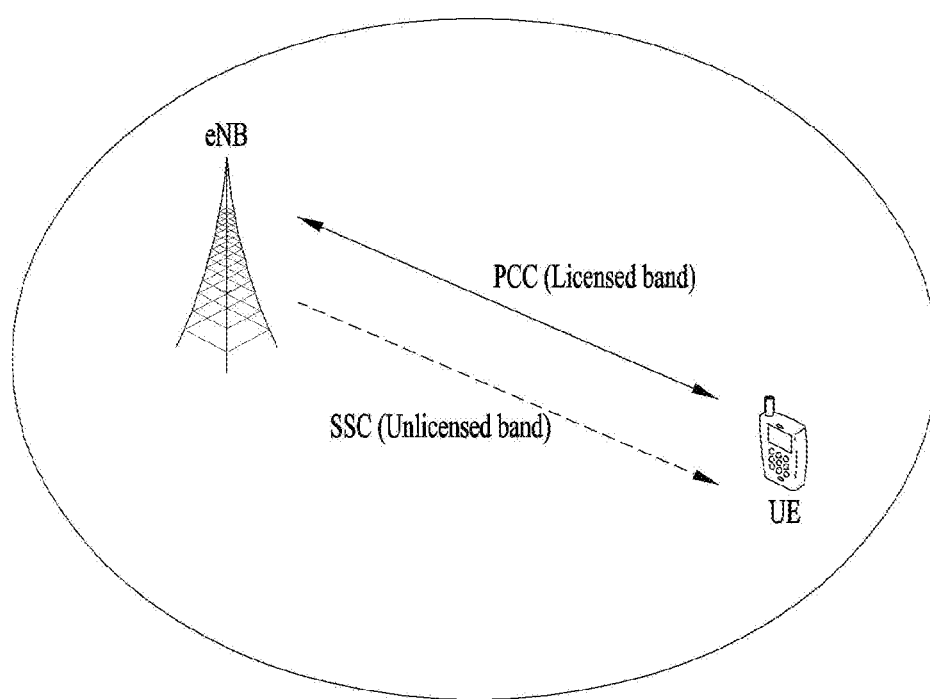
FIG. 22 is a view illustrating an exemplary CA environment supported in an LTE-Unlicensed (LTE-U) system.

FIG. 22 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 22, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 22 is only example, and the embodiments of the present disclosure may be applied to even a CA environment that one UE accesses a plurality of eNBs.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross carrier scheduling mode and through PDCCH of the SCell in case of a self-scheduling mode, and may try data transmission and reception.

At this time, the eNB may configure a TxOP including N consecutive subframes. In this case, a value of N and a use of the N subframes may previously be notified from the eNB to the UE through higher layer signaling through the PCell or through a physical control channel or physical data channel.

3.2 CCA procedure

In embodiments of the present disclosure, a CS procedure may be called a Clear Channel Assessment (CCA) procedure. In the CCA procedure, it may be determined whether a channel is busy or idle based on a predetermined CCA threshold or a CCA threshold configured by higher-layer signaling. For example, if energy higher than the CCA threshold is detected in an unlicensed band, SCell, it may be determined that the channel is busy or idle. If the channel is determined to be idle, an eNB may start signal transmission in the SCell. This procedure may be referred to as LBT.

Figure 23:
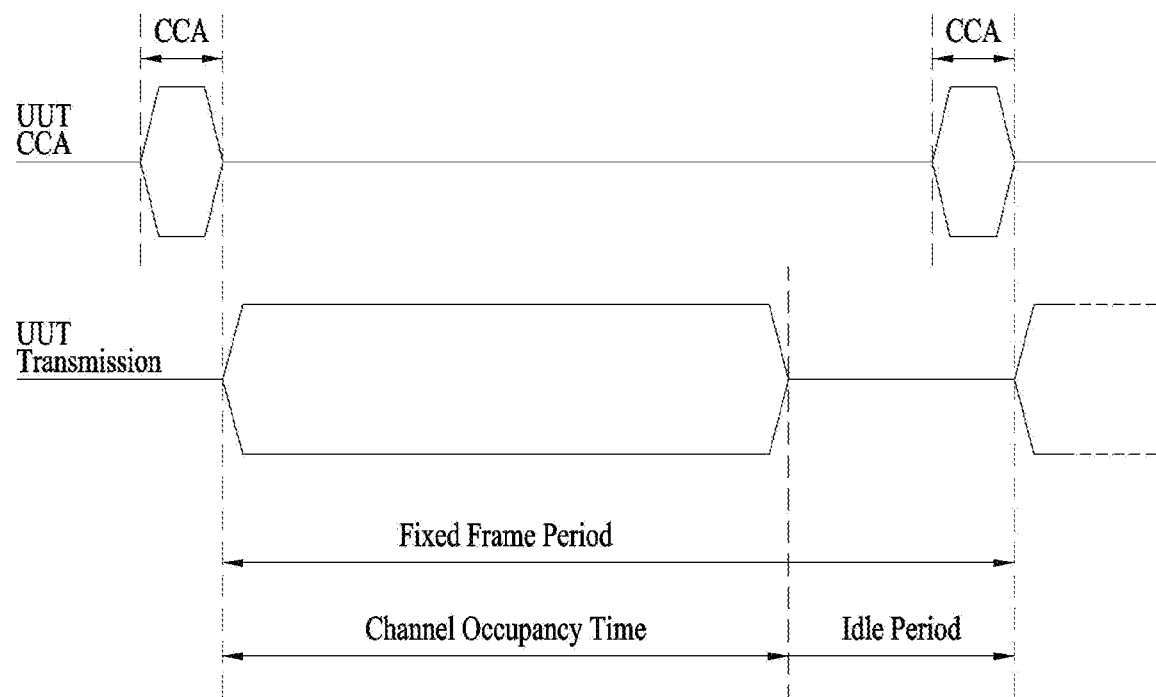
FIG. 23 is a view illustrating an exemplary frame based equipment (FBE) operation as one of listen before talk (LBT) operations.

FIG. 23 is a view illustrating an exemplary Frame Based Equipment (FBE) operation as one of LBT operations.

The European Telecommunication Standards Institute (ETSI) regulation (EN 301 893 V1.7.1) defines two LBT operations, frame based equipment (FBE) and load based equipment (LBE). In FBE, one fixed frame is comprised of a channel occupancy time (e.g., 1 to 10 ms) being a time period during which a communication node succeeding in channel access may continue transmission, and an idle period being at least 5% of the channel occupancy time, and CCA is defined as an operation for monitoring a channel during a CCA slot (at least 20 s) at the end of the idle period.

A communication node periodically performs CCA on a per-fixed frame basis. If the channel is unoccupied, the communication node transmits data during the channel occupancy time. On the contrary, if the channel is occupied, the communication node defers the transmission and waits until the CCA slot of the next period.

Figure 24:
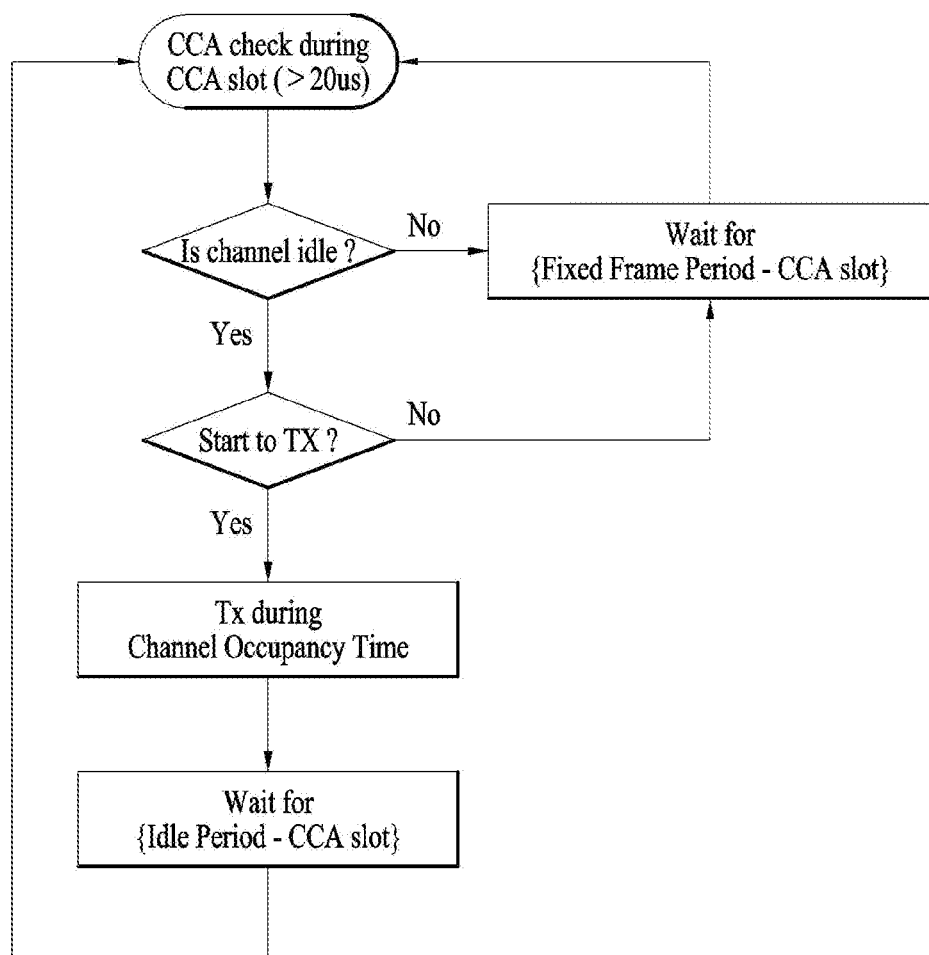
FIG. 24 is a block diagram illustrating the FBE operation.

FIG. 24 is a block diagram illustrating the FBE operation.

Referring to FIG. 24, a communication node (i.e., eNB) managing an SCell performs CCA during a CCA slot. If the channel is idle, the communication node performs data transmission. If the channel is busy, the communication node waits for a time period calculated by subtracting the CCA slot from a fixed frame period, and then resumes CCA.

The communication node transmits data during the channel occupancy time. Upon completion of the data transmission, the communication node waits for a time period calculated by subtracting the CCA slot from the idle period, and then resumes CCA. If the channel is idle but the communication node has no transmission data, the communication node waits for the time period calculated by subtracting the CCA slot from the fixed frame period, and then resumes CCA.

FIG. 25 is a view illustrating an exemplary LBE operation as one of the LBT operations.

Referring to FIG. 25($a$), in LBE, the communication node first sets q (q∈{4, 5, . . . , 32}) and then performs CCA during one CCA slot.

FIG. 25($b$) is a block diagram illustrating the LBE operation. The LBE operation will be described with reference to FIG. 15($b$).

The communication node may perform CCA during a CCA slot. If the channel is unoccupied in a first CCA slot, the communication node may transmit data by securing a time period of up to (13/32)q ms.

On the contrary, if the channel is occupied in the first CCA slot, the communication node selects N (N∈{1, 2, . . . , q}) arbitrarily (i.e., randomly) and stores the selected N value as an initial count. Then, the communication node senses a channel state on a CCA slot basis. Each time the channel is unoccupied in one specific CCA slot, the communication node decrements the count by 1. If the count is 0, the communication node may transmit data by securing a time period of up to (13/32)q ms.

3.3. Discontinuous Transmission (DTX) on DL

DTX in an unlicensed carrier having a limited maximum transmission period may affect some functions required for operations of the LTE system. These functions may be supported by one or more signals transmitted at the start of a discontinuous licensed assisted access (LAA) DL transmission. The functions supported by these signals include automatic gain control (AGC) setting, channel reservation, and so on.

In a signal transmission of an LAA node, channel reservation refers to transmission of signals on channels acquired for signal transmission to other nodes after channel access through a successful LBT operation.

Functions supported by one or more signals for LAA operations including DL DTX include detection of an LAA DL transmission at a UE, and time and frequency synchronization of UEs. Requirements for these functions do not mean exclusion of other available functions, and these functions may be supported by other methods.

3.3.1 Time and Frequency Synchronization

A design purpose recommended for the LAA system is to support acquisition of time and frequency synchronization at a UE by a discovery signal for radio resource management (RRM) measurement, each of RSs included in a DL transmission burst, or a combination of them. A discovery signal for RRM measurement, transmitted by a serving cell is used at least for coarse time or frequency synchronization.

3.3.2 DL Transmission Timing

In a DL LAA design, a subframe (SF) boundary may be adjusted based on a CA timing relationship between serving cells aggregated by CA defined in an LTE system (Rel-12 or below). However, this does not mean that an eNB starts a DL transmission only at an SF boundary. The LAA system may support a PDSCH transmission even though none of the OFDM symbols of one SF are available according to a result of an LBT operation. Herein, transmission of control information required for the PDSCH transmission should be supported.

3.4. RRM Measurement and Reporting

The LTE-A system may transmit a discovery signal at the start of supporting RRM functions including cell detection. The discovery signal may be referred to as a discovery reference signal (DRS). To support the RRM functions for LAA, the discovery signal, and the transmission and reception functions of the LTE-A system may be modified and then applied.

3.4.1 DRS

The DRS of the LTE-A system was designed to support a small cell on-off operation. Off-small cells refer to small cells in a state where most functions except for periodic DRS transmission are deactivated. DRSs are transmitted with a periodicity of 40, 80, or 160 ms in a DRS transmission occasion. A discovery measurement timing configuration (DMTC) is a time period during which a UE may expect to receive a DRS. A DRS transmission occasion may occur anywhere within a DMTC, and the UE may expect that the DRS will be transmitted with a corresponding periodicity in an allocated cell.

The use of the DRS of the LTE-A system in the LAA system may bring about new constraints. For example, although a DRS transmission may be allowed in some regions, like a very short control transmission without LBT, a short control transmission without LBT may not be allowed in other regions. Accordingly, a DRS transmission may be subjected to LBT in the LAA system.

If LBT is applied to a DRS transmission, the DRS may not be transmitted periodically, as is done in the LTE-A system. Therefore, the following two methods may be considered for DRS transmissions in the LAA system.

First, the DRS is transmitted only at fixed time positions within a configured DMTC under the condition of LBT.

Secondly, a DRS transmission is allowed at at least one different time position within a configured DMTC under the condition of LBT.

In another aspect of the second method, the number of time positions may be restricted to 1 within one SF. Aside from a DRS transmission within a configured DMTC, a DRS transmission outside the configured DMTC may be allowed, if it is more useful.

Figure 26:
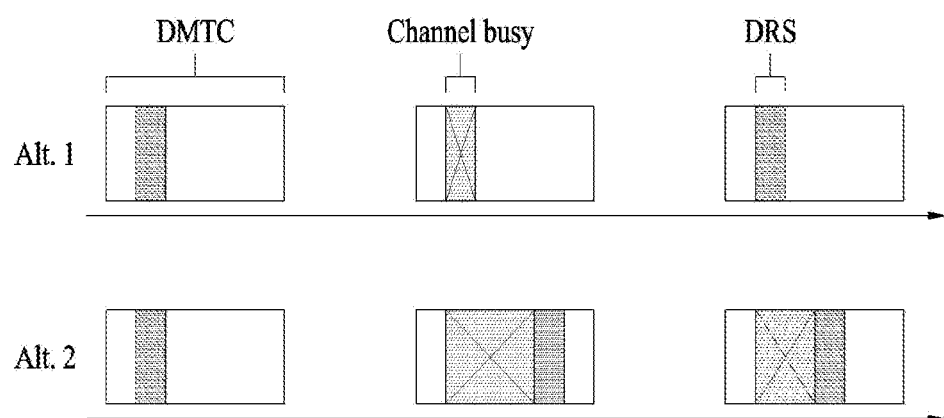
FIG. 26 is a view illustrating methods for transmitting a discovery reference signal (DRS) supported in a licensed assisted access (LAA) system.

FIG. 26 is a view illustrating DRS transmission methods supported in the LAA system.

Referring to FIG. 26, the upper part represents the above-described first DRS transmission method, and the lower part represents the second DRS transmission method. That is, a UE may receive the DRS only at a predetermined position within a DMTC period in the first DRS transmission method, whereas the UE may receive the DRS at any position within a DMTC period in the second DRS transmission method.

If a UE performs RRM measurement based on a DRS transmission in the LTE-A system, the UE may perform one RRM measurement based on a plurality of DRS occasions. If the DRS is used in the LAA system, transmission of the DRS at a specific position may not be ensured due to LBT-caused constraints. If the UE assumes the existence of the DRS in spite of non-transmission of the DRS from an eNB, the quality of an RRM measurement result reported by the UE may be degraded. Therefore, the LAA DRS should be designed such that the existence of the DRS in one DRS occasion has to be detected, which may ensure the UE to combine the successfully detected DRS occasions for the RRM measurement.

Signals including DRSs do not ensure adjacent DRS transmissions in time. That is, if no data is transmitted in SFs carrying DRSs, there may be OFDM symbols carrying no physical signal. During operation in an unlicensed band, other nodes may sense a corresponding channel as idle during this silent interval between DRS transmissions. To avert this problem, it is preferable to ensure configuration of transmission bursts including DRSs with adjacent OFDM symbols carrying a few signals.

3.5 Channel Access Procedure and Contention Window Adjustment Procedure

Hereinbelow, the afore-described channel access procedure (CAP) and contention window adjustment (CWA) will be described from the viewpoint of a transmission node.

Figure 27:
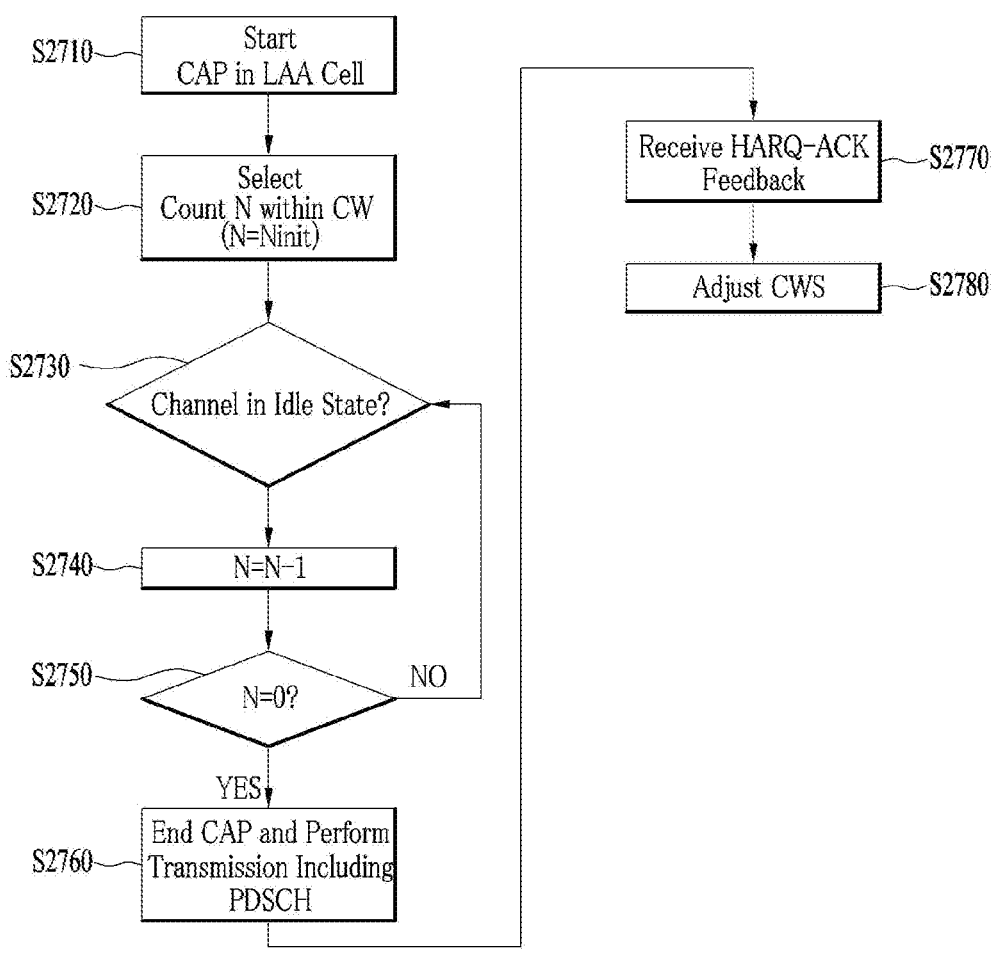
FIG. 27 is a view illustrating a channel access procedure (CAP) and contention window adjustment (CWA)

FIG. 27 is a view illustrating the CAP and CWA.

For a DL transmission, an LTE transmission node (e.g., an eNB) may initiate the CAP to operate in unlicensed cell(s), LAA SCell(s) (S2710).

The eNB may select a random backoff count N from a CW. Herein, N is set to an initial value Ninit (S2720).

The eNB determines whether a channel of LAA SCell(s) is idle, and if the channel is idle, decreases the backoff count by 1 (S2730 and S2740).

In FIG. 27, the order of steps S2730 and S2740 may be changed. For example, the eNB may first decrease the backoff count N and then determine whether the channel is idle.

If the channel is not idle, that is, the channel is busy in step S2730, the eNB may determine whether the channel is idle during a defer period (equal to or longer than 25 μsec) longer than a slot duration (e.g., 9 μsec). If the channel is idle during the defer period, the eNB may perform the CAP again. For example, if the backoff count Ninit is 10 and after the backoff count is decreased to 5, the eNB determines that the channel is busy, the eNB determines whether the channel is idle by sensing the channel during the defer period. If the channel is idle during the defer period, the eNB may perform the CAP again, starting the backoff count from 5 (or from 4 after the backoff count is decreased by 1), instead of setting the backoff count Ninit.

Referring to FIG. 27 again, the eNB may determine whether the backoff count N is 0 (S2750). If the backoff count N is 0, the eNB may end the CAP process and transmit a Tx burst including a PDSCH (S2760).

The eNB may receive HARQ-ACK information for the Tx burst from a UE (S2770).

The eNB may adjust a CWS based on the received HARQ-ACK information (S2780).

In step S2780, the eNB may adjust the CWS based on HARQ-ACK information for the first SF (i.e., the starting SF) of the latest transmitted Tx burst.

Herein, before performing CWP, the eNB may set an initial CW for each priority class. Subsequently, if the probability of determining HARQ-ACK values for a PDSCH transmitted in a reference SF to be NACK is at least 80%, the eNB increases the CW value set for each priority class to an allowed next level.

In step S2760, the PDSCH may be allocated by SCS or CCS. If the PDSCH is allocated by SCS, the eNB counts the DTX, NACK/DTX, or ANY state indicated by feedback HARQ-ACK information as NACK. If the PDSCH is allocated by CCS, the eNB counts the NACK/DTX and ANY states indicated by feedback HARQ-ACK information as NACK meanwhile the eNB does not count the DTX state indicated by feedback HARQ-ACK information as NACK.

If M (M>=2) SFs are bundled and bundled HARQ-ACK information is received, the eNB may regard the bundled HARQ-ACK information as M HARQ-ACK responses. Preferably, the bundled M SFs include a reference SF.

4. Method of Performing LBT in UL of LAA System

As more communication devices are requiring greater communication capacity, a next generation wireless communication system is trying to find ways to efficiently utilizing a limited frequency band. In particular, a cellular communication system such as LTE system considers utilizing such an unlicensed band as 2.4 GHz band mainly used by a legacy WiFi system and newly spotlighting 5 GHz band for traffic offloading.

Since an unlicensed band basically assumes that wireless transmission and reception are performed via contention between communication nodes, it is required for each communication node to perform channel sensing (CS) before a signal is transmitted to check whether or not a different communication node transmits a signal. For clarity, the above mentioned operation is referred to as LBT in the present specification. In particular, an operation of checking whether or not a different communication node transmits a signal is defined as carrier sensing (CS). If it is determined as a different communication node transmits no signal, it is defined as clear channel assessment (CCA) is checked. For contents of LBT, CS, CCA, CAP, and the like, it may refer to the aforementioned section 3.

In LTE system, an eNB and a UE should perform LBT to transmit a signal on an unlicensed band (hereinafter, LTE-U band or U-band). When the eNB or the UE transmits a signal, other communication nodes such as Wi-Fi and the like should perform LBT not to cause interference. For example, according to WiFi standard (802.11ac), a CCA threshold is regulated by −62 dBm for a non-WiFi signal and is regulated by −82 dBm for a WiFi signal. For example, when an STA or an AP performs CS in an unlicensed band, if a signal other than a WiFi signal is received with power equal to or greater than −62 dBm, the STA or the AP does not perform signal transmission on a corresponding channel in order not to cause any interference.

As mentioned in the foregoing description, it may be difficult to always guarantee DL transmission of an eNB or UL transmission of a UE in an unlicensed band (U-band). Hence, an LTE UE operating on the U-band may maintain access with a different cell operating on a licensed band (hereinafter, L-band) to stably control mobility, RRM function, and the like.

In embodiments of the present disclosure, a serving cell accessed by a UE on the U-band is referred to as an USCell (or U-SCell) and a serving cell accessed by the UE on the L-band is referred to as a PCell. In particular, a scheme of performing data transmission/reception on the U-band using a combination with the L-band is generally called LAA.

Hereinafter, a method of configuring a downlink transmission burst in an LAA system and methods of transmitting information on transmit power of a reference signal (e.g., CRS or CSI-RS, etc.) and a transmission structure will be described.

4.1 MBSFN Subframe Structure in LAA SCell

In a cellular LTE system, a subframe (SF) in which an MBMS (Multimedia Broadcast Multicast Service) signal is transmitted is defined as an MBSFN SF. In the MBSFN SF, an eNB transmits a CRS only in the first some OFDM symbols (e.g., one or two OFDM symbols). However, the MBSFN SF structure is borrowed for the purpose of receiving a downlink signal from an eNB at a relay or providing a service to only a UE in a DM-RS based transmission mode even if an MBMS signal is not actually transmitted.

Even in an LAA SCell, the MBSFN SF structure may be used regardless of whether the MBMS signal is actually transmitted or not. That is, the eNB may transmit a CRS only in the first some OFDM symbols (e.g., one or two OFDM symbols) in an SF configured by an MBSFN SF.

4.1.1 MBSFN Method #0

In a legacy Rel-12 LTE system, the configuration of the MBSFN SF is set through RRC signaling. However, in an LAA system, the configuration of the MBSFN SF may be set through L1 signaling through a common channel on a PCell or an LAA SCell or L1 signaling through a dedicated channel on a PCell or an LAA SCell.

A UE configured such that self-carrier scheduling is configured and scheduling is performed through an EPDCCH may not know the location of the CRS upon decoding the EPDCCH, if the MBSFN SF is configured through dedicated L1 signaling (that is, UE-specific search space). Accordingly, it is difficult for the UE to decode the EPDCCH. To this end, the configuration of the MBSFN SF is preferably set through common L1 signaling on the LAA SCell (or PCell).

4.1.2 MBSFN Method #1

In consideration of reliability due to common L1 signaling on an LAA SCell, an MBSFN structure SF may be configured without explicit signaling to a UE. For example, the MBSFN structure SF may be configured according to UE or according to TM configured in a UE. That is, on the assumption that a CRS-based TM (e.g., TM1, TM2, TM3 or TM4) UE transmits a CRS in all CRS ports on a normal SF and a DMRS-based TM (e.g., TM8, TM9 or TM10) UE transmits a CRS only in the first some OFDM symbols (e.g., one or two OFDM symbols) like the MBSFN SF, the corresponding SF may be decoded.

Characteristically, regardless of the above configuration, it may be assumed that a DL signal is transmitted through all CRS ports on the normal SF in SF index 0 or 5 (except for a start partial subframe or an end partial subframe less than 12 OFDM symbols). At this time, the start partial SF (S-pSF) means an SF in which some OFDM symbols of a first slot of the SF are empty) and the end partial SF (E-pSF) means an SF in which some OFDM symbols of a second slot of the SF are empty.

Characteristically, if UEs having different TMs or UEs having different configurations of MBSFN structure SF are multiplexed in one SF, a CRS configuration may be changed according to PRB. For example, if a CRS-based TM UE is scheduled in PRB #1 and a DMRS-based TM UE is scheduled in PRB #2, all CRS ports on the normal SF may be transmitted in PRB #1 and a CRS (one or two OFDM symbols) may be transmitted only in the first some OFDM symbols in PRB #2.

4.1.3 MBSFN Method #2

In the present embodiment, unlike the method of Chapter 4.1.1, when the MBSFN SF is configured through dedicated L1 signaling, if it is assumed that all configured CRS ports (like the normal SF) are transmitted in all SFs, a UE, which has received scheduling grant from the EPDCCH on the LAA SCell, may successfully receive the EPDCCH even when the UE does not know whether the CRS is transmitted or not upon decoding the EPDCCH.

For example, on the LAA SCell configured by only CRS port 0/1, the UE may be configured to perform rate matching and receive the EPDCCH on the assumption that CRS port 0/1 is transmitted in all SFs regardless of the MBSFN SF. However, in this case, the number of REs used as the EPDCCH may be reduced even when CRS port 0/1 is not actually transmitted in the MBSFN SF.

To this end, the UE may be configured to perform rate matching with respect to the CRS transmitted only in the first some OFDM symbols (e.g., one or two OFDM symbols) and to receive the EPDCCH like the MBSFN SF in all SFs except for SFs having constraint on MBSFN SF configuration, such as SF index #0/#5. At this time, for the RE in which the CRS is transmitted in the SF other than the MBSFN SF, the EPDCCH may be configured to be punctured.

As described above, when MBSFN SF is configured through dedicated L1 signaling, the EPDCCH rate matching method includes two methods including a method of always assuming an MBSFN SF and a method of always assuming a normal SF, and selection of any one of the two methods may be predetermined or may be set by an eNB through higher layer signaling.

In the configuration of the MBSFN SF through dedicated L1 signal, specifically, a scrambling sequence of DCI and/or a CRC mask and/or a search space may be identified or a new field (1-bit size) may be added to the DCI.

In the case of a TM10 UE, a PQI field (e.g., PDSCH RE mapping and PDSCH antenna port quasi co-location indication field) may be used. For example, the mbsfn-SubframeConfigList-r11 value of the PQI field '00' is set to "1111111111", the mbsfn-SubframeConfigList-r11 value of the PQI field '01' is set to "0000000000", thereby signaling information indicating that the corresponding SF is an MBSFN SF if the PQI field in a specific SF is "00" and is not an MBSFN SF if the PQI field in a specific SF is "01".

4.1.4 MBSFN method #3

In the methods described in Chapters 4.1.1 to 4.1.3, even for SF index #0/#5, the configuration of an MBSFN (or the configuration of a reduced CRS SF) may be allowed.

At this time, when an MBSFN SF is configured in SF index #0/#5, this may mean that the eNB and/or the UE may transmit only CRS port 0. In Chapter 4.1.3, when the MBSFN SF is configured through dedicated L1 signaling, for a method of always assuming an MBSFN SF between the EPDCCH rate matching methods, in the case of SF index #0/#5, on the assumption that CRS port 0 is transmitted through other OFDM symbols (e.g., on first, fifth, eighth and twelfth OFDM symbols) in addition to the first one OFDM symbol, EPDCCH rate matching may be configured to be performed. Similarly, even in Chapter 4.1.2, when a DM-RS-based TM UE is scheduled in SF index #0/#5, it may be assumed that CRS port 0 is transmitted in 4 OFDM symbols.

Meanwhile, an MBSFN SF may be configured such that a DM-RS is transmitted over entire system bandwidth. At this time, the DM-RS may be configured to use sequences cell-common predefined and to use sequences configured by higher layer signaling. The UE may detect a DM-RS over the entire system bandwidth transmitted in the MBSFN SF, thereby knowing the range of the number of OFDM symbols configuring an SF and/or a DM-RS pattern.

4.2 Transmission Method of Ongoing DL Transmission Burst Information

From the viewpoint of the eNB, the number of carriers simultaneously transmitted in each DL TX burst may be changed according to a multi-carrier LBT result. In addition, total TX power may be limited according to specific band by regulation. Accordingly, in consideration of such points, the eNB may differently allocate TX power transmitted in a specific carrier according to DL TX burst in order to efficiently use available TX power.

In a legacy Rel-12 LTE system, the eNB may perform CSI measurement or interference averaging in all SFs in which DL data is transmitted. However, when the UE performs CSI measurement from the SFs on several DL TX bursts in which TX power is changed, an erroneous measurement result may be obtained. As a result, the UE should perform CSI measurement per DL TX burst or per DL TX burst having the same TX power.

To this end, the eNB may inform the UE of SFs in the same TX burst or SFs using the same TX power through one of the following methods. In addition, next signaling may be transmitted through dedicated L1 signaling (e.g., a UE-specific search space) on the PCell or the LAA SCell or common L1 signaling on the PCell or the LAA SCell.

In the embodiments of the present disclosure, common L1 signaling may mean DCI formats transmitted through the PDCCH configured in a cell-specific search space among DCI formats for transmitting downlink control information. In addition, dedicated L1 signaling may mean DCI formats transmitted through the PDCCH configured in a UE-specific search space among DCI formats for transmitting downlink control information.

4.2.1 DL TX Burst Information Transmission Method #0

The eNB may inform the UE that the TX burst continues even in a next SF through common L1 signaling in the LAA SCell or the PCell. For example, when the eNB informs the UE of corresponding signaling with 1 bit, if the TX burst continues even in the next SF, "1" or "0" may be signaled.

FIG. 28 is a view illustrating methods of transmitting DL Tx burst information.

In FIG. 28, a subframe index may follow the subframe configuration of a Pcell. That is, the upper parts of FIGS. 28(a) and (b) mean the subframe configuration of the Pcell and the lower parts thereof mean the subframe configuration of an SCell.

As shown in FIG. 28(a), the UE may regard as an SF in which "1" is signaled to an SF in which "0" is signaled as the same TX burst. When a first SF in which "1" is signaled is SF # N, if the next SF (SF # N+K+1) of the SF (SF # N+K) in which "1" is signaled is not found (due to channel errors), the UE may regard only SF # N to SF # N+K as the same TX burst.

4.2.2 DL TX Burst Information Transmission Method #1

The eNB may inform the UE that the TX burst continues from a previous SF through common L1 signaling in the LAA SCell (or PCell).

The eNB may inform the UE of whether the DL TX burst continues using 1 bit in the DCI format. For example, when the TX burst continues from the previous SF, the eNB may set the corresponding bit "1" or "0" and perform transmission. The UE may regard an SF in which "0" is signaled to an SF located before an SF in which next "0" is signaled as the same TX burst.

As shown in FIG. 28(b), when a first SF in which "0" is signaled is SF # N, if no SF (SF # N+3) is found before an SF in which next "0" is signaled, the UE may regard only SF # N to SF # N+2 as the same TX burst.

4.2.3 DL TX Burst Information Transmission Method #2

The eNB may inform the UE that CRS/CSI-RS transmit power is the same even in a next SF through common L1 signaling of the LAA SCell or PCell.

Upon assuming that the eNB informs the UE of corresponding signaling using 1 bit, if CRS/CSI-RS transmit power is the same even in a next SF, "1" or "0" may be signaled. The UE may regard an SF in which "1" is signaled to an SF in which "0" is signaled as SFs which use the same CRS/CSI-RS transmit power. Upon assuming that a first SF in which "1" is signaled is SF # N, if the next SF (that is, SF # N+K+1) of the SF (that is, SF # N+K) in which "1" is signaled is not found (due to channel errors), the UE may regard only SF # N to SF # N+K as SFs which use the same CRS/CSI-RS transmit power.

4.2.4 DL TX burst information transmission method #3

The eNB may inform the UE that CRS/CSI-RS transmit power is the same even in a previous SF through common L1 signaling of the LAA SCell or PCell.

Upon assuming that the eNB informs the UE of corresponding signaling using 1 bit, the eNB may be configured to signal "1" or "0" when CRS/CSI-RS transmit power is the same even in the previous SF. The UE may regard an SF in which "0" is signaled to an SF located before an SF in which next "0" is signaled as SFs, to which the same CRS/CSI-RS transmit power is applied.

In addition, upon assuming that a first SF in which "0" is signaled is SF # N, if no SF (that is, SF # N+K) is found before the SF in which "0" is signaled, the UE may regard only SF # N to SF # N+K−1 as SFs, to which the same CRS/CSI-RS transmit power is applied, and decode the corresponding SFs.

4.2.5 DL TX Burst Information Transmission Method #4

The eNB may inform the UE that the remaining N SFs belong to the same TX burst or the same CRS/CSI-RS transmit power is applied through common L1 signaling of the LAA Scell or PCell. At this time, the maximum value of the N value may be set in advance or may be set by RRC signaling.

For example, if N=3, even in the same TX burst (or the same CRS/CSI-RS transmit power is applied) for at least the next five SFs, the eNB may set the N value to "3" and signal the N value to the UE.

When the UE receives the N value, it may be assumed that a maximum of N continuous SFs exists. If the UE does not find some of the N SFs, CSI measurement or interference averaging may be performed except for the corresponding SFs.

4.3 Transmission Method of End pSF Information and DRS SF Information

Hereinafter, methods of transmitting end partial SF information or DRS SF information without or with a PDSCH will be described as one embodiment of the present disclosure.

When the eNB transmits continuous DL TX bursts, in order to prevent resources of one or more SFs from being wasted between continuous DL TX bursts due to LBT, the first or last SF of the DL TX bursts may be configured to be smaller than one SF. That is, among the SFs configuring the DL TX bursts, a pSF transmitted in a state in which the first some OFDM symbols are empty may be defined as a start pSF (or partial start SF), a pSF transmitted in a state in which the last some OFDM symbols are empty may be defined as an end pSF (or partial end SF), and a whole SF without an empty OFDM symbol may be defined as a full SF.

The eNB may signal information indicating the type of each SF (e.g., whether each SF is a FSF or a pSF or whether each SF is the last SF on the TX burst) to the UE using the following state set. In addition, such information may be transmitted in a state of being combined with signaling indicating whether the corresponding SF is a DRS SF.

The following signaling methods may be transmitted to the UE through common L1 signaling of the PCell or the LAA SCell or dedicated L1 signaling of the PCell or the LAA SCell.

4.3.1 First Method

In the embodiments of the present disclosure, State set #1 indicating the end pSF may be set to {Full SF, Full end SF, Partial end SF length #1, . . . , Partial end SF length # N}.

At this time, the "Full SF" state indicates that the corresponding SF is not the last SF of the TX burst, the "Full end SF" state indicates that the corresponding SF is the last SF of the TX burst but is not a pSF, and the "Partial end SF length # n" may indicate the length of the end pSF.

At this time, the eNB may be configured such that information indicating that the length of the predefined end pSF is N and the lengths of all allowed end pSFs are informed through common L1 signaling.

Alternatively, in order to reduce information delivered through common L signaling, the eNB may be configured to set the length of N (<=M) end pSFs of the predefined M end pSFs and to inform the UE of only the length of one of N end pSF through common L1 signaling.

At this time, the length of the end pSFs informed through common L1 signaling and the location of the last OFDM symbol of the EPDCCH may be determined by rules agreed upon in advance. For example, among the last OFDM symbol locations of the predetermined EPDCCH, it may be agreed upon that an OFDM symbol having a shorter length than the end pSF informed through common L1 signaling and a nearest location is the last OFDM symbol of the EPDCCH.

4.3.1.1 Method #1 of Additionally Indicating DRS SF

The eNB may further add one or more states or one bit in order to indicate a DRS SF in the above-described embodiments.

For example, the eNB may add two states "DRS with PDSCH SF" and "DRS without PDSCH SF" to the above-state sets, in order to indicate the DRS SF.

4.3.1.2 Method #2 of Additionally Indicating DRS SF

The eNB may inform the UE of a DRS SF without an additional state or an additional bit indicating the DRS SF in the above-described embodiments.

As a first method, if the length of the DRS SF with or without a PDSCH is 12 OFDM symbols, the eNB may inform the UE of a DRS (without PDSCH) SF without an additional state, by always including the corresponding length in state set #1.

For example, if a PSS and/or an SSS is found with respect to an SF signaled in a state in which an end pSF includes 12 OFDM symbols, the UE may determine that the corresponding SF is a DRS (without PDSCH) SF. Characteristically, in the case of SF index #0/#5, since it may be assumed that the PSS/SSS always exists, the UE may determine that the SF is a DRS (without PDSCH) SF when the SF is an end pSF including 12 OFDM symbols, without detecting the PSS/SSS.

As a second method, it is possible to inform the UE of whether an SF is a DRS SF or not through a combination with the method described in Chapter 4.1.1.

For example, the eNB may inform the UE that the SF is a DRS (without PDSCH) SF when the SF is not an MBSFN SF and is an end pSF. Specifically, if a PSS and/or SSS is found with respect to an SF scheduled in a state of being not an MBSFN SF and being an end pSF, the UE may determine that the corresponding SF is a DRS (without PDSCH) SF.

Characteristically, in the case of SF index #0/#5, since it may be assumed that the PSS/SSS always exists if the SF is not the MBSFN SF, the UE may determine that the SF is a DRS (without PDSCH) SF when the SF is an end pSF, without detecting the PSS/SSS.

4.3.2 Second Method

In the embodiments of the present disclosure, State set #2 indicating an end pSF may be set to {Full SF, Partial end SF length #1, . . . , Partial end SF length # N}.

This is different from the method of Chapter 4.3.1 in that the "Full end SF" state is not defined in the state set, because, among SFs signaled in a "Full SF" state, if a next SF is not detected, the UE may indirectly determine that the corresponding SF is a "Full end SF".

4.3.2.1 Method #3 of Additionally Indicating DRS SF

The eNB may add one or more state or one bit in order to further indicate a DRS SF. For example, when the state is added, the eNB may add two states "DRS with PDSCH SF" and "DRS without PDSCH SF" to State set #2, thereby informing the UE of a DRS SF.

4.3.2.2 Method #4 of Additionally Indicating DRS SF

The eNB may inform the UE of a DRS SF without an additional state or an additional bit. In this case, the eNB may equally apply the method described in Chapter 4.3.1.1 or 4.3.1.2 to State set #2.

4.3.3 Third Method

In the embodiments of the present disclosure, State set #3 indicating an end pSF may be defined as {Full SF, Partial end SF}.

The third method is different from the first method described in Chapter 4.3.1 in that the UE is not informed of the length of the end pSF. That is, by significantly reducing the number of states configuring the state set, the eNB can reduce the number of bits used in common L1 signaling.

For example, when a set indicating the length of the predefined end pSF is defined as {3,6,9,10,11,12}, in an SF set as a "Partial end SF", an RS (e.g., CRS) used for CSI measurement exists only in three OFDM symbols as a minimum value of a set of predefined end pSF lengths, and the length of the corresponding SF may be indicated in scheduling grant included in an (E)PDCCH.

At this time, the last OFDM symbol of the EPDCCH may be set to a third OFDM symbol (or a maximum value of the predetermined last OFDM symbols of the EPDCCH while being equal to or less than the third OFDM symbol).

As another example, even when the set of predefined end pSF lengths is {3,6,9,10,11,12}, the eNB may set a partial set (e.g., {9,10,11,12} of the end pSF lengths as an end pSF length through RRC signaling.

At this time, in an SF set as a "Partial end SF", an RS (e.g., CRS, CSI-RS) used for CSI measurement may exist only in nine OFDM symbols as a minimum value of a set of end pSF lengths defined by RRC signaling, and the length of the corresponding SF may be indicated in scheduling grant included in the (E)PDCCH. At this time, the last OFDM symbol of the EPDCCH may be set to a ninth OFDM symbol (or a maximum value of the predetermined last OFDM symbols of the EPDCCH while being equal to or less than the ninth OFDM symbol).

4.3.3.1 Method #5 of Additionally Indicating DRS SF

The eNB may add one or more states or one bit in order to indicate whether end pSFs are DRS SFSs or not.

For example, when the state is added, the eNB may add two states "DRS with PDSCH SF" and "DRS without PDSCH SF" to the methods of Chapter 4.3.3, thereby informing the UE that the corresponding SFs are DRS SFs.

4.3.3.2 Method #6 of Additionally Indicating DRS SF

The eNB may inform the UE of whether an end pSF is a DRS SF without an additional state or an additional bit.

As a first method, in SFs other than SF index #0/5, if a "Partial end SF" is indicated and a PSS and/or an SSS is found in the corresponding SF, the UE may determine that the corresponding SF is a DRS (without PDSCH) SF.

However, in an SF of SF index #0/5, a constraint may be set that only full SFs or SFs of a TTI (12 OFDM symbols) or more of the DRS (without PDSCH) SF are included. In this case, the UE may determine that the SF is a DRS (without PDSCH) SF without an additional state.

Alternatively, for all SFs, if there is a constraint that only full SFs or SFs of the TTI (12 OFDM symbols) or more of the DRS (without PDSCH) SF are included, the UE may determine that the SF is a DRS (without PDSCH) SF without an additional state.

4.3.3.3 Method #7 of Additionally Indicating DRS SF

If the method described in Chapter 4.1.1 is applied, the eNB may inform the UE of a DRS (without PDSCH) if the SF is not an MBSFN SF and is an end pSF. Specifically, when a PSS and/or an SSS is detected with respect to an SF signaled in a state of indicating that the SF is not an MBSFN SF and is an end pSF, it may be determined that the corresponding SF is a DRS (without PDSCH) SF.

In the case of SF index #0/#5, the UE may assume that a PSS/SSS always exists if the corresponding SF is not an MBSFN SF. Accordingly, the UE may determine that the corresponding SF is a DRS (without PDSCH) SF when the corresponding SF is an end pSF, without detecting the PSS/SSS.

4.3.4 Fourth Method

In the embodiments of the present disclosure, State set #4 indicating an end pSF may be defined as {RS pattern #1, . . . , RS pattern # N}.

The eNB may inform the UE of an SF structure by an RS pattern transmitted in a specific SF. For example, if a DM-RS pattern is indicated in the specific SF, as shown in FIG. 29, the structure of the corresponding SF may be represented by five states.

Figure 29:
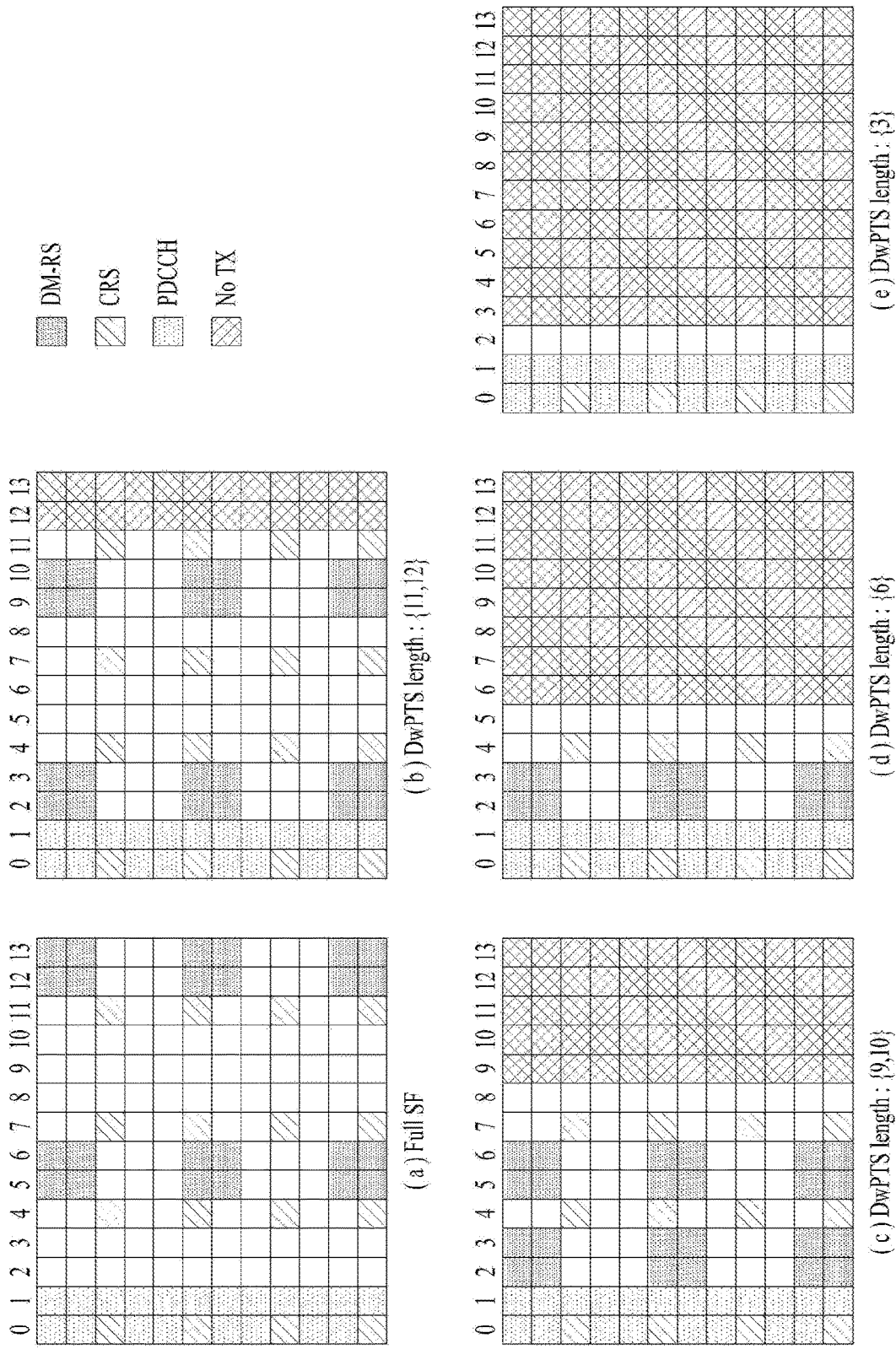
FIG. 29 is a view illustrating the structure of a subframe included in a Tx burst used in an LAA system based on an allocation pattern of a DM-RS.

FIG. 29 is a view illustrating the structure of a subframe included in a Tx burst used in an LAA system based on an allocation pattern of a DM-RS.

FIG. 29(a) shows a full SF, in which a DM-RS, a CRS, a PDCCH, etc. are allocated in the corresponding SF. At this time, the structure of the end pSF based on FIG. 29(a) according to the DM-RS pattern may be represented as shown in FIGS. 29(b) to 29(e).

In the DM-RS pattern shown in FIG. 29(b), the end pSF includes 11 to 13 OFDM symbols. In addition, in the DM-RS pattern shown in FIG. 29(c), the end pSF includes 7 to 10 OFDM symbols. In the DM-RS pattern shown in FIG. 29(d), the end pSF includes 5 to 6 OFDM symbols. In addition, in the DM-RS shown in FIG. 29(e), the end pSF includes four or fewer OFDM symbols.

If some DM-RS patterns are not used on the LAA SCell, the number of states configuring State set #4 may be reduced. For example, if the DM-RS patterns shown in FIGS. 29(d) and (e) are not allowed on the LAA SCell, the number of states configuring State set #4 may be reduced to three. Alternatively, FIGS. 29(b) and 29(d) are set as one state and the actual DM-RS pattern may be configured to be confirmed through presence/absence of the DM-RS or CRS located at a second slot.

As another example, the eNB may inform the UE of an SF structure based on a CRS pattern transmitted on CRS port 0/1.

Figure 30:
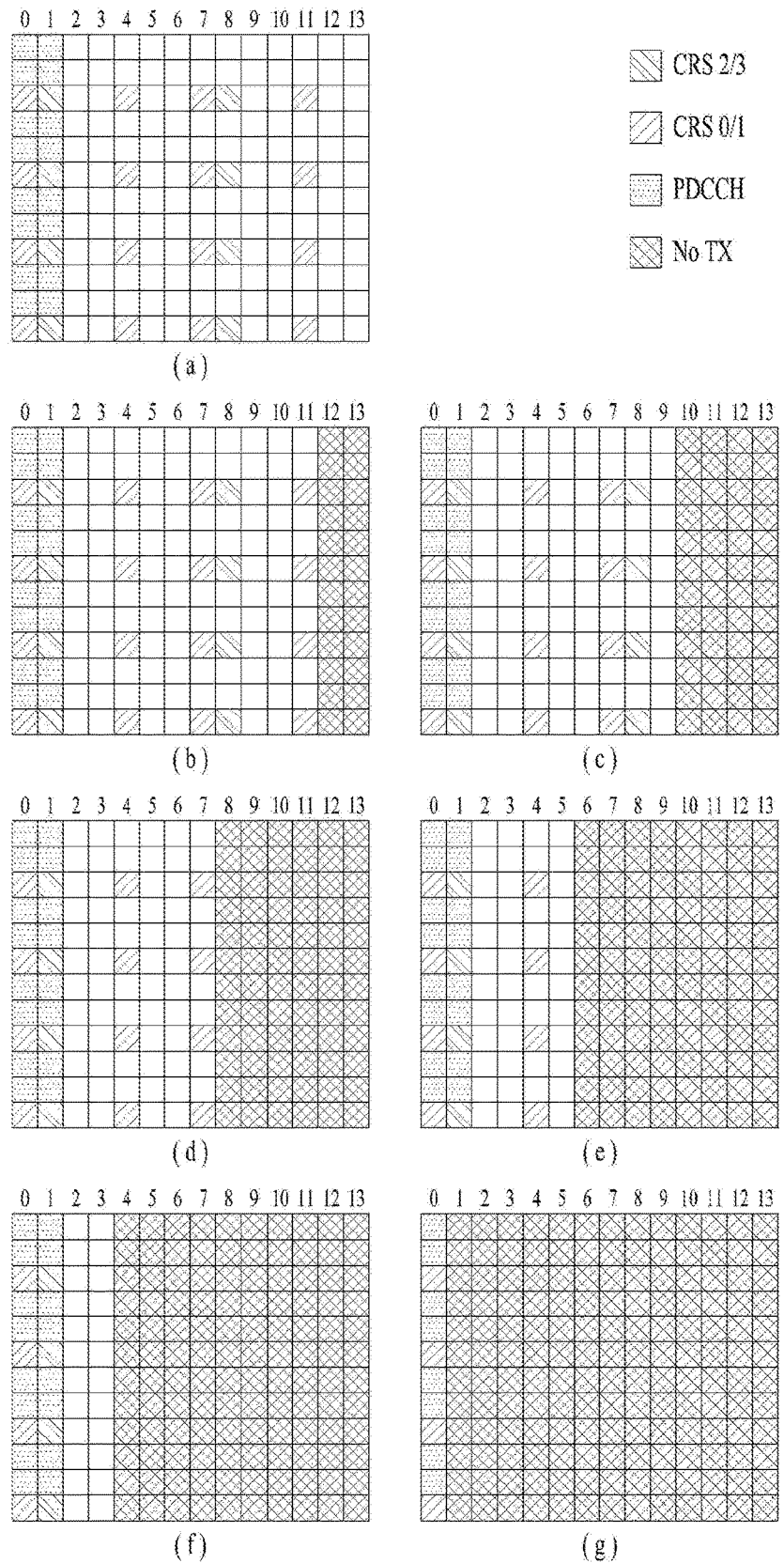
FIG. 30 is a view illustrating the structure of a subframe included in a Tx burst used in an LAA system based on an allocation pattern of a CRS.

FIG. 30 is a view illustrating the structure of a subframe included in a Tx burst used in an LAA system based on an allocation pattern of a CRS.

In the embodiments of the present disclosure, the eNB transmitting CRS port 0/1 means that, since the CRS is transmitted through logical antenna ports 0 to 3, CRS 0 or 1 is transmitted through antenna port 0 or 1.

The CRS pattern-based DL SF structure may be divided into five states as shown in FIG. 30.

FIG. 30(a) shows a full SF, which shows a state in which a CRS, a PDCCH, etc. are allocated in the corresponding SF. At this time, the structure the corresponding end pSF based on FIG. 30(a) according to the CRS pattern may be represented as shown in FIGS. 30(b) to 30(e). CRS port 0/1 is transmitted only in one OFDM symbol as shown in FIG. 30(e), CRS port 0/1 is transmitted only in 2 OFDM symbols as shown in FIG. 30(d), CRS port 0/1 is transmitted only in 3 OFDM symbols as shown in FIG. 30(c), CRS port 0/1 is transmitted in 4 OFDM symbols but indicates an end pSF as shown in FIG. 30(b), CRS port 0/1 is transmitted in 4 OFDM symbols and indicates a full SF as shown in FIG. 30(a).

At this time, if the CRS port 0/1 pattern shown in FIG. 30(b) is assumed, this may mean that the corresponding end pSF includes 12 to 13 OFDM symbols. In addition, if the CRS port 0/1 pattern shown in FIG. 30(c) is assumed, this may mean that the corresponding end pSF includes 8 to 11 OFDM symbols. In addition, if the CRS port 0/1 pattern shown in FIG. 30(d) is assumed, this may mean that the corresponding end pSF includes 5 to 7 OFDM symbols. In addition, if the CRS port 0/1 pattern shown in FIG. 30(e) is assumed, this may mean that the corresponding end pSF includes 4 or fewer OFDM symbols.

As another example, the eNB may inform the UE of an SF structure based on a CRS port 0/1/2/3 pattern. At this time, if the CRS port 0/1/2/3 pattern shown in FIG. 30(b) is assumed, this may mean that the corresponding end pSF includes 12 to 13 OFDM symbols. In addition, if the CRS port 0/1/2/3 pattern shown in FIG. 30(c) is assumed, this may mean that the corresponding end pSF includes 9 to 11 OFDM symbols. In addition, if the CRS port 0/1/2/3 pattern shown in FIG. 30(d) is assumed, this may mean that the corresponding end pSF includes 8 OFDM symbols. In addition, if the CRS port 0/1/2/3 pattern shown in FIG. 30(e) is assumed, this may mean that the corresponding end pSF includes 5 to 7 OFDM symbols. In addition, if the CRS port 0/1/2/3 pattern shown in FIG. 30(f) is assumed, this may mean that the corresponding end pSF includes 2 to 4 OFDM symbols. In addition, if the CRS port 0/1/2/3 pattern shown in FIG. 30(g) is assumed, this may mean that the corresponding end pSF includes one OFDM symbol. If the end pSF including some OFDM symbols on the LAA SCell is not allowed, the number of states configuring State set #3 may be reduced. For example, if only the end pSF including OFDM symbols on the system is allowed, the number of states configuring State set #4 may be reduced to 5 by excluding FIGS. 30(d) and (g) from FIG. 30.

Different interpretation may be performed per UE according to the same signaling. For example, a CRS-based TM UE is interpreted by a CRS pattern with respect to State set #4 (that is, see FIG. 30) and a DM-RS-based TM UE may be interpreted by a DM-RS pattern with respect to State set #4 (that is, see FIG. 29). Alternatively, interpretation of each UE may be configured through higher layer signaling.

4.3.4.1 Method #8 of Additionally Indicating DRS SF

The eNB may add one or more state or one bit in order to further indicate a DRS SF. For example, when the state is added, the eNB may add two states "DRS with PDSCH SF" and "DRS without PDSCH SF" to State set #4, thereby informing the UE of whether the corresponding end pSF is a DRS SF.

4.3.4.2 Method #9 of Additionally Indicating DRS SF

The eNB may inform the UE of a DRS SF without an additional state or an additional bit. In this case, the eNB may equally apply the method described in Chapter 4.3.1.1 or 4.3.1.2 to State set #4.

In the embodiments proposed in Chapters 4.3.1 to 4.3.4, methods of, at the eNB, informing the UE of which SF is an end SF on the TX burst are disclosed. This may be used to indicate SFs in the TX burst considered in Chapters 4.2.1 to 4.2.5 or SFs which use the same RS (e.g., CRS and/or CSI-RS) TX power. For example, the UE may assume that an SF found after the end SF to a next end SF are in the same TX burst.

4.4 Transmission Method of Rate Matching Pattern Information

Hereinafter, methods of, at an eNB, transmitting rate matching pattern information as one of information on the structure of a DL TX burst SF will be described.

In the embodiments of the present disclosure, signaling for, at the eNB, informing the UE of the rate matching pattern of a specific SF configured in an LAA SCell may be introduced. Such signaling may include some or all of the following information.

(1) CRS port configuration information, (2) the number of OFDM symbols in which the CRS is transmitted, (3) MBSFN configuration, (4) CSI-RS configuration, (5) ZP-CSI-RS configuration, (6) CSI-IM configuration, (7) DM-RS pattern, (8) PDSCH start symbol, (9) PDCCH region, (10) PDCCH start symbol, (11) EPDCCH start symbol, (12) EPDCCH end symbol, (13) inter-RS QCL information.

Although, even when the number of bits necessary to signal all or some of the information is K, the eNB may configure the corresponding signaling using P (<K) bits and set the meaning of each field (like a PQI field configuration) by higher layer signaling. The corresponding signaling may be transmitted through common L1 signaling on the PCell or the LAA SCell or dedicated L1 signaling (UE-specific search space) on the PCell or the LAA SCell.

4.5 Start pSF Information

Signaling indicating that a specific SF is a start pSF may be introduced into an LAA system. At this time, the corresponding signaling may be transmitted through common L1 signaling of the PCell or the LAA SCell or dedicated L1 signaling (UE-specific search space) of the PCell or the LAA SCell.

4.6 Subframe Length Indication Method

An end pSF transmitted in an LAA SCell may be transmitted based on the DwPTS structure of a legacy LTE system. However, unlike periodic transmission of a special SF such as a DwPTS in the TDD of the legacy LTE system, the special SF may be aperiodically transmitted in the LAA SCell.

If the UE receives the length information of the end pSF in the corresponding SF, a time for processing a series of operations such as control channel decoding, channel estimation, CSI measurement and data channel rate matching may be insufficient. In order to overcome such a problem, it is discussed that the eNB informs the UE of the length of the end pSF in an immediately previous SF rather than the corresponding SF.

For example, if SF # n is an end pSF, the eNB may inform the UE of information indicating that, in SF # n−1, a current SF is a full SF and a next SF is an end pSF and the length of the end pSF. In addition, the eNB may inform the UE of information indicating that the corresponding SF is an end pSF in SF # n and the length of the corresponding SF.

Hereinafter, methods of indicating the length of a subframe used in the SCell of the LAA system will be described in detail.

4.6.1 SF Length Indication Method #1

The length information of the current SF and the next SF may be represented by 6 bits. 3 bits of the SF length information may be used to indicate the length of the current SF and the remaining 3 bits may be used to indicate the length of the next SF. The SF length information may be configured as shown in Table 18 below.

TABLE 18

| bit | Current SF length | bit | Next SF length |
|-----|-------------------|-----|----------------|
| 000 | 3 OFDM symbol (OS) | 000 | 3 OS |
| 001 | 6 OS | 001 | 6 OS |
| 010 | 9 OS | 010 | 9 OS |
| 011 | 10 OS | 011 | 10 OS |
| 100 | 11 OS | 100 | 11 OS |

TABLE 18-continued

| bit | Current SF length | bit | Next SF length |
|---|---|---|---|
| 101 | 12 OS | 101 | 12 OS |
| 110 | 13 OS or reserved | 110 | 13 OS or reserved |
| 111 | Full SF | 111 | Full SF/0 OS or reserved |

The SF length information shown in Table 18 includes two fields and the first three bits may indicate the length of the current SF and the next three bits may indicate the length of the next SF. Respective 3 bits may indicate eight states, that is, the lengths of the current and next SFs.

If the length of the current SF is a full SF and the next SF length is 6 OFDM symbols (OSs), the SF length information may be signaled as '111001'. If the corresponding signaling is not limited to be transmitted in the end pSF and the immediately previous SF but is allowed to be transmitted in all SFs, a field indicating a full SF may be necessary in the field indicating the next SF length.

If the current SF is an end pSF, the eNB may be configured to explicitly signal that the next SF is a "0" OS or the eNB and/or the UE may be configured to ignore the length information of the next SF (or to transmit a reserved bit). In addition, if the current SF is a full SF and is an end SF (if indication is allowed), the eNB may be configured to explicitly signal that the next SF is a "0" OS. If a state indicating that the length of the next SF is a "0" OS is necessary in the SF length information, a separate state may be added to the field indicating the length of the next SF. However, if OFDM symbol sizes of {3,6,9,10,11,12,13} are all possible as the length of the pSF, as shown in Table 18, 3 bits may be insufficient to represent up to "0" OS. To this end, like the "xxx111" of Table 18, a full SF (or any state) and the "0" OS may be configured to be simultaneously indicated in one state. At this time, a rule may be determined such that "xxx111" is interpreted as a full SF if the current SF is a full SF and "xxx111" is interpreted as a "0" OS if the current SF is a pSF.

Table 18 is merely exemplary and the locations of the field indicating the current SF length and the field indicating the length of the next SF may be changed and 3 bits and the mapping relationship of each state may also be changed.

As another aspect of the present embodiment, information indicating that the next SF is an end SF may be further necessary to identify the DL TX burst. If the next SF is a pSF, information on the end SF is sufficient. However, if the next SF is a full SF and is an end SF, the state of the SF length information described in Table 18 may not be sufficient. In order to solve such a problem, if the DwPTS structure of 13 OFDM symbols is not introduced into the LAA system, the fields of the SF length information may be configured as shown in Table 19 below.

TABLE 19

| bit | Current SF length | bit | Next SF length |
|---|---|---|---|
| 000 | 3 OFDM symbol (OS) | 000 | 3 OS |
| 001 | 6 OS | 001 | 6 OS |
| 010 | 9 OS | 010 | 9 OS |
| 011 | 10 OS | 011 | 10 OS |
| 100 | 11 OS | 100 | 11 OS |
| 101 | 12 OS | 101 | 12 OS |
| 110 | Full SF | 110 | Full SF/0 OS or reserved |
| 111 | Reserved | 111 | Full SF & End SF |

Referring to Table 19, the UE, which has received SF length information set to "110111" in SF # n, may perceive that the corresponding SF (SF # n) is a full SF and the next SF (SF # n+1) is a full SF and is an end SF. In addition, the UE may perceive that the DL TX burst ends in the next SF (SF # n+1) and know that CRS/CSI-RS TX power may be changed after the next SF (SF # n+1) in a previous SF (that is, SF # n).

4.6.2 SF Length Indication Method #2

In Chapter 4.6.1, 6 bits are necessary to signal the SF length information. However, it may be efficient to minimize the number of bits in terms of system overhead. Table 20 below shows an example of representing 6-bit SF length information using 4 bits. Table 20 is merely exemplary and the number of bits and the mapping relationship of each state may also be changed.

TABLE 20

| bit | state |
|---|---|
| 0000 | Current: Full/Next: 3 OS |
| 0001 | Current: Full/Next: 6 OS |
| 0010 | Current: Full/Next: 9 OS |
| 0011 | Current: Full/Next: 10 OS |
| 0100 | Current: Full/Next: 11 OS |
| 0101 | Current: Full/Next: 12 OS |
| 0110 | Current: Full/Next: 13 OS or Reserved |
| 0111 | Current: Full/Next: Full or Reserved |
| 1000 | Current: 3 OS/Next: None |
| 1001 | Current: 6 OS/Next: None |
| 1010 | Current: 9 OS/Next: None |
| 1011 | Current: 10 OS/Next: None |
| 1100 | Current: 11 OS/Next: None |
| 1101 | Current: 12 OS/Next: None |
| 1110 | Current: 13 OS/Next: None or Reserved |
| 1111 | Current: Full/Next: None or Reserved |

Referring to Table 20, the SF length information may represent the length information of the current SF and/or the length information of the next SF using 4 bits. For example, the state indicated by "0000" which is 4-bit SF length information indicates that the current SF is a full SF and the length of the next SF is 3 OSs. In this manner, "0000" to "0110" indicate that the length of the current SF is a full SF and the length of the next SF is shorter than the length of one SF. That is, the current SF is a full SF, and the next SF is an end pSF and may indicate the length of the end pSF. "0111" may mean that the current SF is a full SF and the next SF is a full SF or may mean a reserved state. In addition, "1000" and "1110" respectively indicate that the current SF is an end pSF and the length of the end pSF and the next SF indicates a state which is not occupied by the eNB and/or UE. If the SF length information is set to "1111", this means that the current SF is a full SF and is an end SF and the next SF is not occupied or reserved. In Table 20, the reserved state means that a specific value is not set.

As another aspect of the present embodiment, a signal including the SF length information may be configured to be transmitted only in the end SF and an immediately previous SF of the end SF. In this case, it is indicated that the current SF is a full SF and the next SF is a full SF through "0111" indicated by the SF length information. Accordingly, the UE may perceive that the next SF is a full SF and is an end SF. In addition, the UE may perceive that the corresponding TX burst ends in the next SF and know that CRS/CSI-RS TX power may be changed after the next SF in an immediately previous SF.

As another aspect of the present disclosure, information indicating that the next SF is an end SF may be further necessary to identify the TX burst. If the next SF is a pSF, information on the end SF is sufficient. However, if the next SF is a full SF and is an end SF, the SF length information cannot be sufficiently indicated using Table 20. In order to solve this problem, if the DwPTS structure of 13 OFDM symbols is not introduced, the SF length information may be configured as shown in Table 21 below.

TABLE 21

| bit | state |
|---|---|
| 0000 | Current: Full/Next: 3 OS |
| 0001 | Current: Full/Next: 6 OS |
| 0010 | Current: Full/Next: 9 OS |
| 0011 | Current: Full/Next: 10 OS |
| 0100 | Current: Full/Next: 11 OS |
| 0101 | Current: Full/Next: 12 OS |
| 0110 | Current: Full/Next: Full or reserved |
| 0111 | Current: Full/Next: Full and End SF |
| 1000 | Current: 3 OS/Next: None |
| 1001 | Current: 6 OS/Next: None |
| 1010 | Current: 9 OS/Next: None |
| 1011 | Current: 10 OS/Next: None |
| 1100 | Current: 11 OS/Next: None |
| 1101 | Current: 12 OS/Next: None |
| 1110 | Current: Full/Next: None or Reserved |
| 1111 | Reserved |

Referring to Table 21, the UE, which has received SF length information set to "0111", may perceive that the corresponding SF is a full SF and the next SF is a full SF and is an end SF. In addition, the UE may perceive that the DL TX burst ends in the next SF and know that CRS/CSI-RS TX power may be changed after the next SF in an immediately previous SF.

4.6.3 SF Length Indication Method #3

In Chapter 4.6.3, the method of representing the SF length information using 4 bits was described. As another embodiment of the present disclosure, the SF length information may include a 1-bit flag and 3 bits as shown in Table 22 below.

For example, the 1-bit flag may indicate whether the current SF is an end pSF or an immediately previous SF of an end pSF. Alternatively, the 1-bit flag may be used to distinguish between the case where the current SF is a full SF and is not an end SF and the case where the current full is a full SF and is an end SF. Table 22 below is merely exemplary and the locations of the fields indicating the flag bit and the SF length may be changed and the size of 3 bits and the mapping relationship of each state may be changed according to embodiment.

In the methods described Chapters 4.6.1 to 4.6.3, information on the next SF received by the UE in SF # n and information on the current SF received in SF # n+1 may be different. In this case, the UE may be configured to trust only the next SF information indicated in SF # n, to trust only information on the current SF received in SF # n+1 or not to perform processing such as PDSCH demodulation and CSI measurement in the corresponding SF # n+1.

In the methods described in Chapters 4.6.1 to 4.6.3, the eNB may transmit information on the next SF as well as information on the current SF in SF # n. At this time, the state in which the current SF is a full SF may mean that, if the current SF is a start pSF, the current SF is not a full SF but is an SF including 7 OSs.

In Chapter 4.6.1, a combination of the current SF information and the next SF information received by the UE in SF # n may be inconsistent. For example, in the case of <pSF-full SF> or <full SF-full SF (if the corresponding signaling exists only when the next SF is an end pSF)>, the UE may be configured not to perform processing such as PDSCH demodulation and CSI measurement in SF # n+1.

Alternatively, a combination of the current SF information and the next SF information received by the UE in SF # n+1 may be inconsistent. For example, in the case of <pSF-non 0 OS>, <full SF-non 0 OS>, <full SF-0 OS (if the corresponding signaling exists only when the next SF is an end pSF)>, the UE may be configured to trust only the next SF information indicated in SF # n, to trust only information on the current SF received in SF # n+1 or not to perform processing such as PDSCH demodulation and CSI measurement in the corresponding SF # n+1.

As another aspect of the present embodiment, signaling including the SF length information may be configured to be transmitted only in the end SF and an immediately previous SF of the end SF. In this case, if it is indicated that the current SF is a full SF and the next SF is a full SF through the SF length information set to "0111", the UE may perceive that the next SF is a full SF and is an end SF. In addition, the UE may perceive that the corresponding TX burst ends in the next SF and know that CRS/CSI-RS TX power may be changed after the next SF in an immediately previous SF.

As another aspect of the present disclosure, information indicating that the next SF is an end SF may be further necessary to identify the TX burst. If the next SF is a pSF, information on the end SF is sufficient. However, if the next SF is a full SF and is an end SF, the SF length information

TABLE 22

| bit | flag | bit | state |
|---|---|---|---|
| 0 | Option 1) the current SF is a full SF and is not an end SF | 000 | Current: Full/Next: 3 OS |
| | | 001 | Current: Full/Next: 6 OS |
| | Option 2) the immediately previous SF of the end pSF (i.e., the current SF is the full SF and the other SF is end pSF) | 010 | Current: Full/Next: 9 OS |
| | | 011 | Current: Full/Next: 10 OS |
| | | 100 | Current: Full/Next: 11 OS |
| | | 101 | Current: Full/Next: 12 OS |
| | | 110 | Current: Full/Next: 13 OS or Reserved |
| | | 111 | Opt 1) Current: Full/Next: Full or Reserved |
| | | | Opt 2) Reserved |
| 1 | Option 1) end SF | 000 | Current: 3 OS/Next: None |
| | Option 2) end pSF | 001 | Current: 6 OS/Next: None |
| | | 010 | Current: 9 OS/Next: None |
| | | 011 | Current: 10 OS/Next: None |
| | | 100 | Current: 11 OS/Next: None |
| | | 101 | Current: 12 OS/Next: None |
| | | 110 | Current: 13 OS/Next: None or Reserved |
| | | 111 | Opt 1) Current: Full/Next: None or Reserved |
| | | | Opt 2) Reserved | cannot be sufficiently indicated using Table 20. In order to solve this problem, if the DwPTS structure of 13 OFDM symbols is not introduced, the SF length information may be configured as shown in Table 23 below.

TABLE 23

| bit | flag | bit | state |
|---|---|---|---|
| 0 | the current SF is a full SF and is not an end SF | 000 | Current: Full/Next: 3 OS |
| | | 001 | Current: Full/Next: 6 OS |
| | | 010 | Current: Full/Next: 9 OS |
| | | 011 | Current: Full/Next: 10 OS |
| | | 100 | Current: Full/Next: 11 OS |
| | | 101 | Current: Full/Next: 12 OS |
| | | 110 | Current: Full/Next: Full and End SF |
| | | 111 | Current: Full/Next: Full or Reserved |
| 1 | end SF | 000 | Current: 3 OS/Next: None |
| | | 001 | Current: 6 OS/Next: None |
| | | 010 | Current: 9 OS/Next: None |
| | | 011 | Current: 10 OS/Next: None |
| | | 100 | Current: 11 OS/Next: None |
| | | 101 | Current: 12 OS/Next: None |
| | | 110 | Current: Full/Next: None or Reserved |
| | | 111 | Reserved |

Referring to Table 23, the UE, which has received SF length information set to "0110", may perceive that the corresponding SF (SF # n) is a full SF and the next SF (SF # n+1) is a full SF and is an end SF. In addition, the UE may perceive that the DL TX burst ends in the next SF (SF # n+1) and know that CRS/CSI-RS TX power may be changed after the next SF in an immediately previous SF.

4.6.4 SF Length Indication Method #4

The eNB may transmit signaling on the end SF length only in the end SF (e.g., SF # n+1) and the previous SF (e.g., SF # n).

In this case, the UE may operate as follows.

(1) Case where the UE receives a signal including the SF length information in SF # n and SF # n+1 (e.g., detection of the correct CRC value in the signaling of each SF): The UE may regard both signals received in SF # n and SF # n+1 as indicating the length information of SF # n+1 and regard SF # n+1 as an end SF.

That is, when the UE receives the signal including the SF length information in SF # n and SF # n+1, the UE may regard the signals received in SF # n and SF # n+1 as indicating the same OFDM symbol configuration in SF # n+1.

(2) Case where the signal including the SF length information is received only in SF # n: The UE may assume, in SF # n+1, the length information obtained in SF # n and may perform processing or may not perform processing in SF # n+1.

In the embodiments of the present disclosure, processing may mean a process of, at the UE, decoding the SF and detecting information and/or data included in the SF.

In this method, when the SF length information value received in SF # n+1 and the length information value received in SF # n are different, the UE may trust only the length information of the next SF received in SF # n or to trust only the length information of the current SF received in SF # n+1. In addition, the UE may be configured not to perform processing such as PDSCH demodulation and CSI measurement in the corresponding SF # n+1.

4.6.5 SF Length Indication Method #5

The eNB may signal information on the length of the corresponding SF in each SF or the previous SF of each SF.

In this case, if the combination of the length information of the continuous SFs is inconsistent (for example, <pSF-pSF>), the UE may not perform processing with respect to an SF corresponding to previous information, an SF corresponding to next information or both SFs.

4.6.6 SF Length Indication Method #6

Inconsistency of signaling including the SF length information of the continuous SFs may be determined along with a combination of the other signaling. For example, the UE may receive signaling on a <partial-full> combination while signaling two continuous SFs belonging to the same transmission burst or a combination determined that two continuous SFs belong to the same transmission burst while transmit power based on different reference signals (RSs) is applied. In this case, the UE does not perform processing with respect to an SF corresponding to previous information, an SF corresponding to next information or both SFs.

4.6.7 SF Length Indication Method #7

In the above-described methods, if an end pSF will be transmitted in SF # n, the eNB may inform the UE of information indicating that the current SF is a full SF and the next SF is an end pSF and the length of the end pSF, in SF # n−1. In addition, eNB may inform the UE of information indicating that the corresponding SF is an end pSF and the length thereof in SF # n.

If the UE does not receive signaling including the information on the current SF and the length information of the next SF in SF # n−1 due to DRX, measurement gap or channel error, the UE attempt to receive common signaling indicating the length of the current SF transmitted in SF # n.

If the UE does not successfully receive the corresponding common signaling and detects a CRS in a first OFDM symbol in the corresponding SF, the UE may regard the corresponding SF as a full SF.

Alternatively, the UE may not receive common signaling indicating the length of the current SF but may successfully receive dedicated scheduling DCI transmitted through the PCell or the LAA SCell. In this case, the UE, which has received the dedicated scheduling DCI, may perform reception on the assumption that the scheduled PDSCH is a full SF.

However, since the actually transmitted PDSCH is transmitted through the end pSF, if the UE stores a TB transmitted through the corresponding PDSCH in a buffer without change, buffer corruption may occur.

As a method of solving this problem, the eNB informs the UE of whether the current SF is a pSF in dedicated scheduling DCI. For example, the eNB may include an additional 1 bit in the dedicated scheduling DCI to inform the UE of whether the current is a pSF.

In addition, the eNB may inform the UE that the corresponding SF is a pSF through the length of the pSF or the DM-RS pattern. If the UE does not receive a signal including information on the current SF and information on the next SF in SF # n−1, does not receive a signal including information on the current SF in SF # n and/or perceives that the corresponding SF is a pSF through the dedicated scheduling DCI in SF # n, the UE may not perform processing such as reception of the scheduled PDSCH and CSI measurement. Alternatively, the UE may discard the scheduled PDSCH or may not store the scheduled PDSCH in a buffer. In addition, the UE may not transmit HARQ-ACK to the corresponding PDSCH or may transmit NACK information.

If the UE does not receive a signal including information on the current SF and information on the next SF in SF # n−1 and/or does not receive a common signal (e.g., DCI) indicating the length of the current SF transmitted in SF # n, a problem may occur in CSI measurement in addition to buffer corruption. In order to solve such problems, the following options are applicable to the LAA system.

(1) Option 1

If the UE does not receive the signal including the SF length information including information on the current SF and information on the next SF in SF # n−1, the UE may be configured to exclude the next SF from unconditional CSI measurement or may be configured not to regard the next SF as a valid CSI reference resource.

(2) Option 2

If the UE may perceive that the corresponding SF is a pSF through blind detection (BD) of CRS/DM-RS/CSI-RS, the UE may be configured to exclude the next SF from unconditional CSI measurement or may be configured not to regard the next SF as a valid CSI reference resource.

Alternatively, if the UE may perceive that the corresponding SF is a pSF through blind detection (BD) of CRS/DM-RS/CSI-RS, the UE may perform CSI measurement in the corresponding SF.

(3) Option 3

If the UE does not receive the signal including information on the current SF and information on the next SF (e.g., SF length information) in SF # n−1 and does not successfully detect the signal including the SF length information even in SF # n, the UE may not perform CSI measurement in the corresponding SF. In other words, if the UE receives information indicating that the corresponding SF is a full SF in SF # n, the UE may perform CSI measurement with respect to the corresponding SF.

4.6.8 Method of Transmitting SF Length Information

The below-described embodiments relate to methods of transmitting SF length information indicating the SF length of the LAA SCell. The description of Chapter 1 to 4.6.7 is applicable to the present embodiment.

Figure 31:
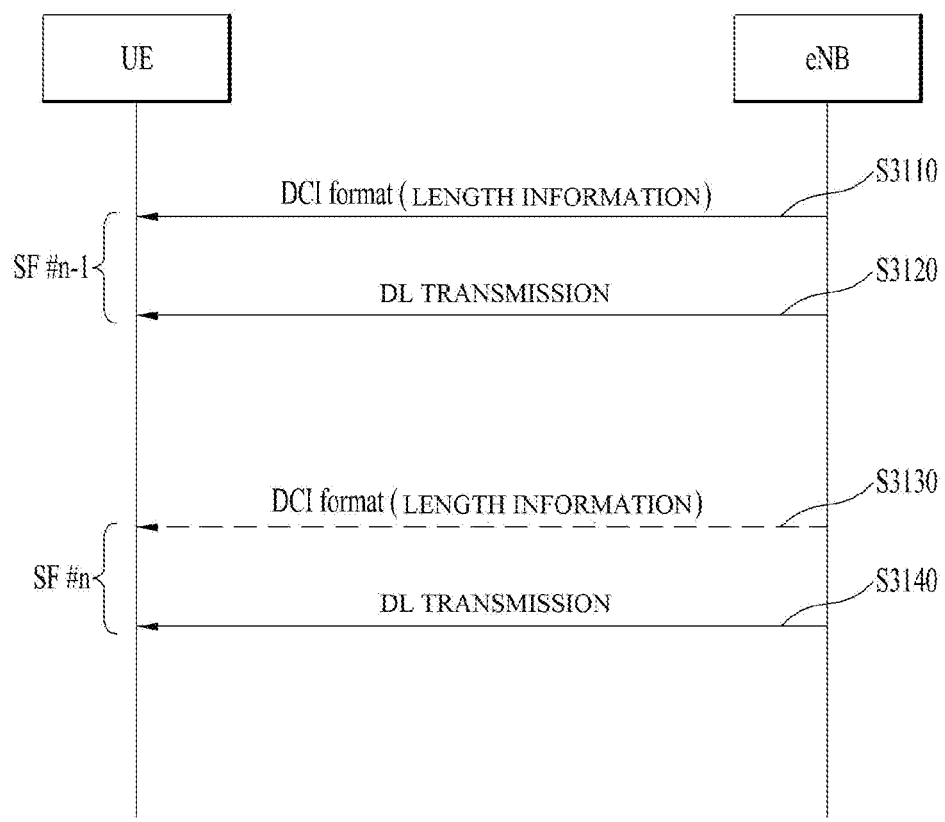
FIG. 31 is a view illustrating a method of transmitting SF length information in an LAA SCell.

FIG. 31 is a view illustrating a method of transmitting SF length information in an LAA SCell.

Referring to FIG. 31, the eNB may transmit a control signal including first SF length information indicating the length of a current SF (SF # n−1) and/or the length of a next SF (SF # n) to the UE in SF # n−1 (S3110).

The UE may know the length of the current SF or the length of the next SF based on the first SF length information in SF # n−1. In addition, the UE may determine whether the current SF or the next SF is an end SF based on the first SF length information. In addition, the UE may determine whether the current SF or the next SF is a pSF based on the first SF length information.

The eNB may transmit a downlink physical channel and/or a downlink physical signal to the UE in SF # n−1 based on the first SF length information included in the control signal transmitted in SF # n−1. Of course, the UE may know the number of OFDM symbols occupied in SF # n−1 which is the current SF, based on the first SF length information received in SF # n−1. Accordingly, the UE may receive and decode the downlink physical channel and/or the downlink physical signal based on the first SF length information (S3120).

The eNB may transmit a control signal including second SF length information indicating the length of the current SF (SF # n) and/or the length of the next SF (SF # n+1) to the UE in SF # n (S3130).

The UE may know the length of the current SF or the length of the next SF based on the second SF length information in SF # n. In addition, the UE may determine whether the current SF or the next SF is an end SF based on the second SF length information. In addition, the UE may determine whether the current SF or the next SF is a pSF based on the second SF length information.

The eNB may transmit a downlink physical channel and/or a downlink physical signal to the UE in SF # n based on the second SF length information included in the control signal transmitted in SF # n. Of course, the UE may know the number of OFDM symbols occupied in SF # n which is the current SF, based on the first SF length information received in SF # n. Accordingly, the UE may receive and decode the downlink physical channel and/or the downlink physical signal based on the SF length information (S3140).

In FIG. 31, as the SF length information, one of the SF length information described in Tables 18 to 23 above may be used. Of course, the number of bits configuring the SF length information or the mapping state may be changed according to system requirements.

In FIG. 31, in steps S3110 and S3130, DCI may be transmitted through a common control channel or a specific control channel. For example, DCI including first or second SF length information may be transmitted to the UE through a PDCCH. At this time, the first or second SF length information may be referred to as a subframe configuration field.

In FIG. 31, the first or second SF length information may be transmitted in order to indicate that the current or next SF is an end SF. If SF # n−1 is an end SF in FIG. 31, steps S3130 and S3140 may not be performed. If SF # n is an end SF, the first and second SF length information may be transmitted in SF # n−1 and SF # n.

The UE may assume that the OFDM symbol configuration of SF # n is equally indicated with respect to the SF length information transmitted in SF # n−1 and SF # n. In addition, SF # n−1 or SF # n may be a full SF or a pSF.

If the UE fails to receive and/or decode the DCI signal in SF # n−1 and SF # n or fails to receive the SF length information, the UE may not use SF # n for CSI measurement.

In the embodiments of the present disclosure, the end SF means the last SF of the SFs configuring the DL TX burst configured such that the eNB transmits a DL channel and/or a DL signal to the UE. In addition, the current SF and the next SF mean relative SFs in temporal order.

4.7 Method of Indicating DRS Length

Hereinafter, a method of indicating an SF length in a DRS SF will be described. For convenience of description, the following cases will be described.

4.7.1 Case #1

In Case #1, a DRS is a DRS SF transmitted in an SF other than SF #0 or SF #5. At this time, assume that a PDSCH is not transmitted in the DRS SF. That is, the corresponding DRS SF may be an SF which uses a scrambling sequence which does not follow an SF index.

4.7.1.1 Alt.1-1

If only the DRS may be transmitted in the corresponding SF without multiplexing the PDSCH, signaling indicating the length of the corresponding SF may not be necessary. Alternatively, in the corresponding DRS SF, common L1 signaling may not be transmitted.

4.7.1.2 Alt.1-2

The UE may assume that the DRS SF is always an SF including 12 OFDM symbols. That is, if an allocated periodic CSI-RS/IM exists in the last 2 OFDM symbols of the corresponding SF, CSI measurement may not be performed on the assumption that the corresponding CSI-RS/IM does not exist.

4.7.1.3 Alt.1-3

The UE may assume that the DRS SF is always a full SF including 14 OFDM symbols. That is, if an allocated periodic CSI-RS/IM exists in the last 2 OFDM symbols of the corresponding SF, CSI measurement may be performed on the assumption that the corresponding CSI-RS/IM exists.

4.7.1.4 Alt.1-4

The eNB may inform the UE of whether the DRS SF is a pSF or a full SF. For example, an additional 1 bit indicating whether a channel (CSI-RS/CSI-IM, etc.) configured to be transmitted in the last 2 OFDM symbols is not present (or is present) is sent through common control signaling, thereby signaling whether the corresponding DRS SF is a pSF or a full SF.

In other words, the corresponding signal may be configured to be transmitted only when the DRS SF is a pSF, only when the DRS SF is a full SF, or when the DRS SF is a pSF and a full SF.

4.7.1.5 Alt.1-5

The methods described in Chapters 4.6.1 to 4.6.7 may be used. For example, the number of OFDM symbols capable of enabling the UE to estimate whether the corresponding channels are transmitted in the current SF may be signaled. For example, the UE may be configured not to expect a channel transmitted in OFDM symbol 13/14 when 12 or fewer OFDM symbols or 13 or fewer OFDM symbols are signaled.

4.7.1.6 Alt.1-6

In the methods of Alt.1-4 and Alt.1-5, the UE may perform CSI measurement/RRM measurement/cell detection/channel estimation on the assumption that a DRS (without PDSCH) SF transmitted in an SF other than SF #0/#5 is a full SF. If the UE perceives that the corresponding SF is a pSF through the common control signal and a periodic CSI-RS/IM is allocated in the last 2 OFDM symbols, the UE may regard the corresponding CSI-RS/IM as being not transmitted and may not perform CSI measurement.

Alternatively, the UE may perform CSI measurement/RRM measurement/cell detection/channel estimation on the assumption of a pSF. At this time, when the UE perceives that the corresponding SF is a full SF through the common control signal, the UE which was allocated the periodic CSI-RS/IM in the last two OFDM symbols may regard the corresponding CSI-RS/IM as existing and perform CSI measurement.

4.7.1.7 Alt.1-7

The UE may be configured not to expect a CSI-RS/IM configured for CSI measurement in the DRS SF.

4.7.2 Case #2

In Case #2, assume that SF #0/#5 is a DRS SF. Alternatively if a DRS and a PDSCH may be multiplexed even in an SF other than SF #0/#5, it is assumed that the DRS is transmitted in the DRS SF.

4.7.2.1 Full SF Including PDSCH

Information indicating that the current SF in which the DRS is transmitted is a full SF may be signaled to the UE. For example, the eNB may be configured to signal information indicating that the current SF is a full SF regardless of whether the next SF is an end pSF. In this case, the methods described in Chapters 4.6.1 to 4.6.3 are applicable.

For example, the information on the next SF may indicate information on the actual next SF length and the eNB may be configured to transmit a reserved state except the case where the next SF is a pSF. Alternatively, regardless of the information indicating that the current SF is a full SF, the reserved field defined in Chapters 4.6.1 to 4.6.3 or separate signaling indicating a full SF in which a DRS and a PDSCH are multiplexed may be transmitted to the UE.

If the next SF is an end pSF, the methods described in Chapters 4.6.1 to 4.6.5 are applied to inform the UE of the lengths of the current SF and the next SF or to inform the UE of only the length of the next SF.

If the next SF is a full SF or is not transmitted (that is, is not occupied), the eNB may operate as follows (Method A) to (Method C): (Method A) the eNB may not transmit signaling including SF length information in the corresponding SF, (Method B) the eNB may transmit the reserved field defined in Chapters 4.6.1 to 4.6.3 to the UE, or (Method C) the eNB may transmit a separate signal indicating that the corresponding SF is a DRS SF to the UE.

4.7.2.2 pSF Including 12 or More OFDM Symbols Including PDSCH

In the case of a pSF including 12 or more OFDM symbols including a PDSCH, the eNB may signal SF length information using the methods proposed in Chapters 4.6.1 to 4.6.3.

4.7.2.3 SF in which Only DRS is Transmitted without PDSCH

For DRS LBT for an SF in which only a DRS is transmitted without a PDSCH, the previous SF is an end pSF or is not transmitted (is not occupied). That is, since information indicating that the corresponding SF is an end pSF may not be transmitted in the previous SF, if information indicating that the corresponding SF is an end pSF is transmitted, the UE may not perform processing with respect to the corresponding SF. Accordingly, signaling other than signaling indicating the end pSF may be necessary.

Alt.2-1: If (Method A) is used and signaling the length is not transmitted even in Case #2, it is not determined whether the corresponding SF is a full SF or a pSF. In order to solve this problem, the eNB may be configured to transmit the reserved field defined in Chapters 4.6.1 to 4.6.3 or may be configured to transmit 1-bit signaling indicating a DRS SF.

Alt.2-2: If (Method B) is used and signaling indicating the length is not transmitted even in Case #2, the reserved field defined in Chapters 4.6.1 to 4.6.3, which is not used in the (Method B), may be transmitted or separate signaling indicating a DRS pSF may be transmitted.

Alt.2-3: If (Method C) is used and signaling indicating the length is not transmitted even in Case #2, the reserved field defined in Chapters 4.6.1 to 4.6.3 may be transmitted or separate signaling indicating a DRS pSF may be transmitted.

Alt.2-4: The eNB may transmit the reserved field defined in Chapters 4.6.1 to 4.6.3, or separate signaling indicating an SF in which only the DRS is transmitted. Using this information, the UE may assume that a CSI-RS or CSI-IM does not exist in OSs after the OS in which the DRS is transmitted.

Alt.2-5: The UE may assume that the corresponding SF is always an SF including 12 OFDM symbols. That is, even when an allocated periodic CSI-RS/IM exists in the last 2 OFDM symbols of the corresponding SF, the UE may not perform CSI measurement on the assumption that the corresponding CSI-RS/IM does not exist. At this time, in the case of (Method A), since the full SF in which the PDSCH is multiplexed is not identified, this may be solved by the method of Alt.2-1.

Alt.2-6: The UE may assume that the corresponding SF is a full SF which always includes 14 OFDM symbols. That is, when an allocated periodic CSI-RS/IM exists in the last 2 OFDM symbols of the corresponding SF, the UE may perform CSI measurement on the assumption that the corresponding CSI-RS/IM exists.

Alt.2-7: The eNB may inform the UE of whether the corresponding SF is a pSF or a full SF. That is, whether the corresponding SF is a pSF or a full SF may be signaled through additional 1-bit common control signaling indicating whether a channel (e.g., CSI-RS/CSI-IM, etc.) configured to be transmitted in the last 2 OFDM symbols is not present (or is present).

In other words, the corresponding signaling may be configured to be transmitted only when the corresponding SF is a pSF, only when the corresponding SF is a full SF, or when the corresponding SF is a pSF and a full SF.

Alt.2-8: The eNB may be configured to inform the UE of the length information (that is, 12 OFDM symbols) of the current SF using the methods proposed in Chapters 4.6.1 to 4.6.5. In other words, the UE, which has perceived that the DRS has been transmitted in the corresponding SF (e.g., through PSS/SSS blind detection), may be configured to perform CSI measurement in the corresponding SF, regardless of whether the information indicating that the corresponding SF is an end pSF is transmitted in the previous SF (even when the information indicating that the corresponding SF is an end pSF is not received in the previous SF) or the corresponding SF may be set as a valid SF only with respect to the UE which is allocated a CSI-RS transmitted in 12 OFDM symbols even when the corresponding SF is a pSF. At this time, the allocated CSI-RS may not be transmitted in the corresponding SF and may be transmitted only in 12 OFDM symbols excluding the last 2 OFDM symbols.

In addition, the UE may assume that the SF length information is transmitted at least in the corresponding SF through common DCI if an SF in which a DRS (or PSS/SSS) is transmitted is a pSF.

In the methods described in Alt.2-7 and Alt.2-8, the UE performs CSI measurement/RRM measurement/cell detection/channel estimation on the assumption of a full SF (or a partial SF) in a DRS (without PDSCH) SF transmitted in an SF other than SF #0/#5 and, upon perceiving that the corresponding SF is a pSF through the common control signaling, the UE, which is allocated a periodic CSI-RS/IM in the last 2 OFDM symbols, may regard the corresponding CSI-RS/IM as being not transmitted and may not perform CSI measurement.

As an aspect of the present embodiment, with respect to the methods of indicating the DRS length described in Chapter 4.7, it may be assumed that a CSI-RS/IM allocated for CSI measurement is not transmitted in the last 2 OFDM symbols in a first SF in which a PSS/SSS is found in an SF or a DMTC in which a DRS is transmitted. At this time, if a PDSCH is transmitted in the corresponding SF, although the CSI-RS/IM is not transmitted in the last 2 OFDM symbols, the PDSCH is subjected to rate matching with respect to the RE allocated for the CSI-RS/IM, thereby eliminating ambiguity (which may occur due to the UE-specific DMTC).

Characteristically, it may be assumed that a periodic CSI-RS/IM allocated to the last 2 OFDM symbols is transmitted only to the UE, which has received the PDSCH in the SF in which the DRS is transmitted and has perceived that the corresponding SF is a full SF. In other words, it may be assumed that the CSI-RS/IM allocated for CSI measurement is not transmitted only to the UE, which has not received the PDSCH in the SF in which the DRS is transmitted. As another method, in the case of the SF other than SF #0/5, the UE may always assume that the periodic CSI-RS is not transmitted in the last 2 OFDM symbols regardless of whether the DRS is transmitted in the corresponding SF.

4.8 Method of Defining DRS SF and TX Burst

Due to the characteristics of the LAA SCell operating in an unlicensed band, LBT should be performed even for DRS transmission. In order to increase the transmission probability of the DRS used for RRM measurement, cell detection, etc., even when LBT for DRS transmission fails, DRS transmission may be allowed to start at various points (e.g., every SF boundary) in the configured DMTC.

For example, in the DMTC configured from SF #0 to SF #6, the eNB may fail with respect to the LBT for DRS transmission immediately before SF #0 and attempt transmission of the DRS in SF #1. At this time, sequence generation of an SSS/CRS/CSI-RS for a DRS transmitted in SF #1 may not follow SF #1 but may follow SF #0 in order to reduce measurement complexity of a neighboring cell. That is, sequence generation of an SSS/CRS/CSI-RS for a DRS transmitted in SFs #0 to #4 follows SF #0 and sequence generation of an SSS/CRS/CSI-RS for a DRS transmitted in SFs #5 to #9 follows SF #5. In addition, in SFs other than SF #0 or SF #5, multiplexing of the DRS and the (E)PDCCH/PDCCH may not be allowed.

Figure 32:
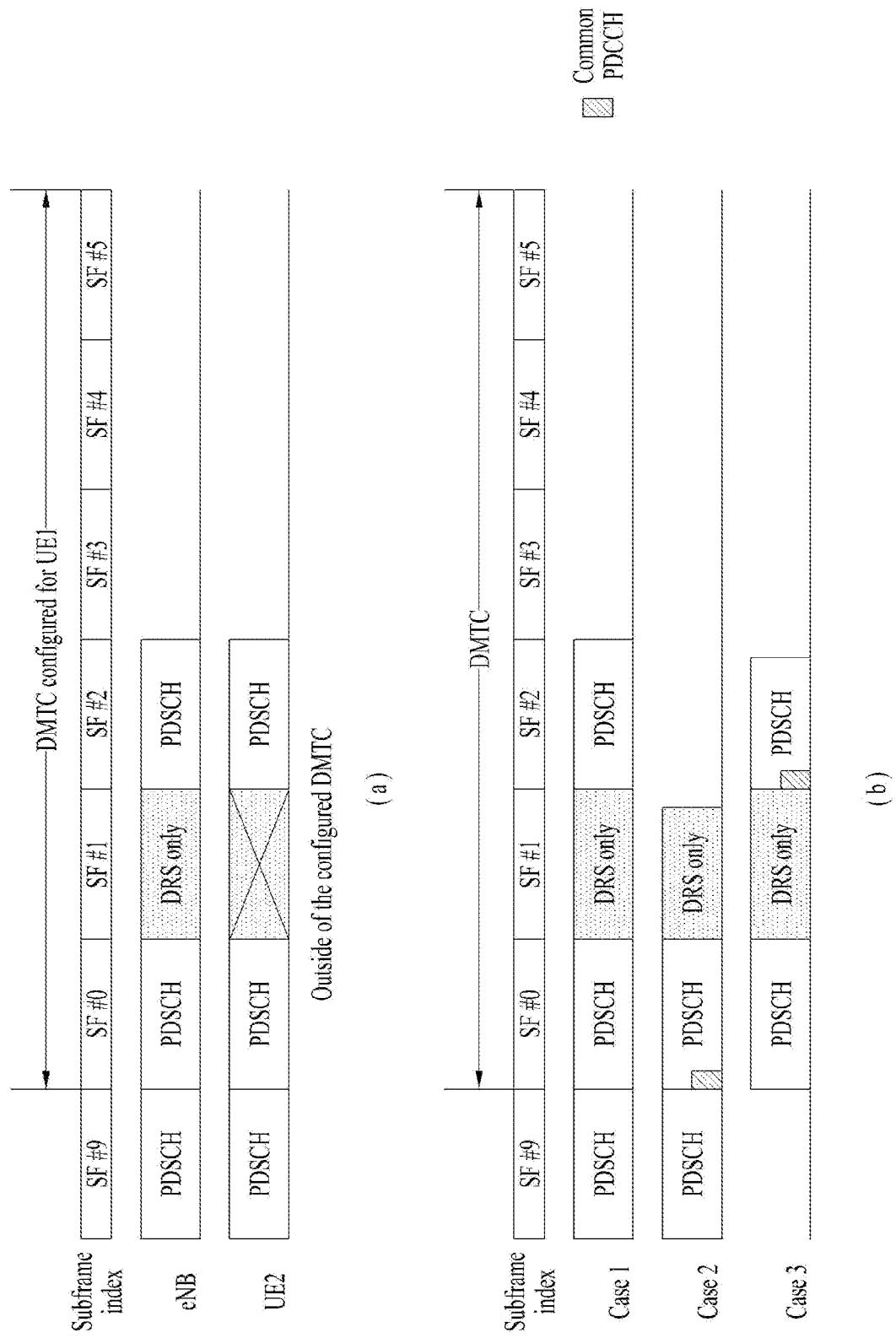
FIG. 32 is a view illustrating a method of configuring a TX burst in a DMTC period.

In consideration of the power of the reference signal such as a CRS/CSI-RS changed per TX burst, the UE may identify the TX burst in the DMTC period for at least CSI measurement. FIG. 32 is a view illustrating a method of configuring a TX burst in a DMTC period. Referring to FIG. 32(a), a DMTC period configured in UE1 includes SF #0 to SF #5. The eNB may transmit a PDSCH in SF #9 to SF #2 and may transmit only a DRS in SF #1. UE2 may receive a PDSCH in SFs #9, #0 and #2. FIG. 32(b) is a view illustrating Case 1 to Case 3 of configuring the TX burst. At this time, a common PDCCH may be referred to as a common control signal or common control signaling.

As shown in FIG. 32(a), in the DMTC period configured for UE1, when the eNB transmits a DRS (without PDSCH) SF in SF #1, sequence generation of a CRS and a CSI-RS for the DRS of SF #1 may follow SF #0. Since the corresponding SF is outside the configured DMTC period, UE2 may not successfully detect whether transmission is performed in SF #1 in which a scrambling sequence does not follow an SF #1 index (or a slot index) or a CRS transmitted in a first symbol. In this case, since UE2 may not know the fact that SF #0 and SF #2 belong to the same burst, the same TX burst perceived by the eNB (and UE1) and UE2 may be different.

In the DMTC period as well as outside the DMTC configured for UE1, the TX burst may not be identified due to the DRS (with PDSCH) SF. As shown in FIG. 32(b), in Case 1, the UE for which the DMTC period is configured may perceive SF #9 to SF #2 as one TX burst. In contrast, in Case 2, since SF #1 is an end pSF, common control signal information indicating that the next SF is a pSF may be signaled in SF #0.

However, since the PDCCH may not be multiplexed in the DRS (without PDSCH) SF, a common control signal indicating that the corresponding SF is an end pSF may not be transmitted in SF #1. That is, the UE, which has received signaling indicating that the next SF is an end pSF in SF #0 but has not received information on the current SF in SF #1, may not successfully receive the corresponding SF #1. Like Case 3, if the end pSF is transmitted in SF #2, information on the next SF needs to be transmitted in SF #1 in advance. However, if the PDCCH may not be multiplexed in the DRS (without PDSCH) SF, the information on the next SF may not be transmitted. At this time, the UE, which has received information indicating that the current SF is an end pSF only in SF #2, may not receive the corresponding SF.

As described above, when a DRS (without PDSCH) SF is configured in SFs other than SF #0/#5, the structure of the TX burst transmitted by the eNB and the structure of the TX burst actually perceived or identified by the UE may differ between UEs. In order to solve such a problem, a DRS (without PDSCH) SF may be configured to be regarded as one independent TX burst. In other words, the UE may regard an SF, which uses a scrambling sequence which does not follow an SF index, as separate TX burst. To this end, TX bursts may be continuously transmitted in time. In Case 1 of FIG. 32 (b), the UE may assume that a total of three TX bursts including TX burst #1 composed of SF #9 and SF #0, TX burst #2 composed of SF #1 and TX burst #3 composed of only SF #2 is transmitted.

At this time, if the UE performs CSI channel and interference measurements only in an SF perceived as the same TX burst, the UE may perform CSI and/or interference measurement with respect to each of the three TX bursts. In FIG. 32(a), UE2 may assume that a total of two TX bursts including TX burst #1 composed of SF #9 and SF #0 and TX burst #2 composed of SF #2 is transmitted. Even at this time, like case 1 of FIG. 32(b), even if there is a transmission to the DRS only SF after SF #0, SF #0 is assumed to be the last SF and an indicator corresponding thereto may be transmitted to the UE in SF #0 and/or SF #9 or the previous SF thereof.

In FIG. 32(b), like Case 1 and Case 2, even when the eNB transmits continuous SFs, due to an intervening DRS (without PDSCH) SF, the UEs may perceive several TX bursts. To this end, additional signaling for identifying each TX burst may be transmitted.

For example, in Case 1 of FIG. 32(b), even when an indicator indicating that SF #0 is followed by an end SF may be transmitted and the corresponding indicator is received by the UE, the UE should assume that a next SF may exist. In addition, upon indicating the number of DL SFs remaining in a certain TX burst, the number of SFs before the DRS (without PDSCH) SF may be configured to be indicated. For example, the number of DL SFs remaining in SF #9 may be 1 (or 2 including SF #9) and the number of DL SFs remaining in SF #10 may be 0 (or 1 including SF #10).

As another method of solving a problem that the structure of the TX burst transmitted by the eNB and the structure of the TX burst actually perceived or identified by the UE may differ between UEs, the DRS (without PDSCH) SF may be always transmitted through only a single TX burst. That is, as shown in FIGS. 32(a) and 32(b), the DRS SF is not allowed to be transmitted in the beginning, middle or end of the TX burst or may be allowed to be always transmitted in one SF without previous/next transmission.

If transmission in the beginning, middle or end of the TX burst is not limited as shown in FIGS. 32(a) and 32(b) in consideration of flexibility of the eNB, problems of Cases 2 and 3 of FIG. 32(b) may be solved.

4.8.1 Method of Solving Problem of Case 2

Even when the next SF is a DRS (without PDSCH) SF, common control signaling indicating the length of the next SF may not be transmitted. Alternatively, information indicating that the next SF is a DRS SF may be explicitly signaled and the UE, which has received the corresponding signaling, may not expect the common control signaling carrying information on the length of the current SF in the next DRS (without PDSCH) SF.

4.8.2 Method of Solving Problem of Case 3

After the DRS (without PDSCH) SF, transmission of the end pSF may not be allowed. Alternatively, presence/absence of the end pSF transmitted after the DRS (without PDSCH) SF may be signaled in an SF before the DRS (without PDSCH) SF in advance.

4.9 Method of Signaling Combination of Different Information

The eNB may transmit information signaled only in the end SF, such as the above-described SF length information, and information transmitted in every SF, such as RS power information and/or transmission burst sequence information, through the same control channel (e.g., a physical channel such as a PDCCH or a PHICH). In this case, an identifier of information transmitted through the corresponding control channel may also be transmitted in the information field of each control channel. Accordingly, the UE may determine whether information transmitted through a specific control channel is SF length information or the other information through the identifier. In this case, the UE may regard the SF in which information indicating whether the SF is an end pSF is received as belonging to the same transmission burst as the previous SF and apply the same RS transmit power.

Hereinafter, detailed methods of signaling a combination of different information will be described.

The eNB may combine the following information and transmit common L1 signaling in the PCell or the LAA SCell in order to transmit information on the structure of the DL transmission burst and the power of the reference signal. Combinations of the different information may be represented by [Comb # N].

[Comb #1] whether the SF is an MBSFN SF+whether the SF is a DRS SF

[Comb #2] whether the SF is an MBSFN SF+whether the SF is an end pSF

[Comb #3] whether the SF is an MBSFN SF+whether the SF belongs to the same TX burst or whether the SF is an SF which uses the same RS TX power

[Comb #4] whether the SF is a DRS SF+whether the SF is an end pSF

[Comb #5] whether the SF is a DRS SF+whether the SF belongs to the same TX burst or whether the SF is an SF which uses the same RS TX power

[Comb #6] whether the SF is an end pSF+whether the SF belongs to the same TX burst or whether the SF is an SF which uses the same RS TX power

[Comb #7] whether the SF is an MBSFN SF+whether the SF is a DRS SF+whether the SF is an end pSF

[Comb #8] whether the SF is an MBSFN SF+whether the SF is a DRS SF+whether the SF belongs to the same TX burst or whether the SF is an SF which uses the same RS TX power

[Comb #9] whether the SF is an MBSFN SF+whether the SF is an end pSF+whether the SF belongs to the same TX burst or whether the SF is an SF which uses the same RS TX power

[Comb #10] whether the SF is a DRS SF+whether the SF is an end pSF+whether the SF belongs to the same TX burst or whether the SF is an SF which uses the same RS TX power

[Comb #11] whether the SF is an MBSFN SF+whether the SF is a DRS SF+whether the SF is an end pSF+whether the SF belongs to the same TX burst or whether the SF is an SF which uses the same RS TX power

[Comb #12] [Comb #1] to [Comb #11]+Rate matching pattern information

[Comb #13] [Comb #1] to [Comb #11]+Start partial SF information

[Comb #14] [Comb #1] to [Comb #11]+Rate matching pattern information+Start partial SF information

[Comb #15] [Comb #1] to [Comb #14]+Length information ([Length method #1] to [Length method #5]) and/or DRS information ([DRS-Length method #1])

In the combinations [Comb #1] to [Comb #15], whether a specific SF is an MBSFN SF may be transmitted to the UE through the methods of Chapter 4.1.1 and 4.1.2.

In addition, information indicating whether a specific subframe is a DRS SF may use additional 1-bit information or may use the method described in Chapters 4.3.1 to 4.3.3 upon being combined with whether the SF is an end pSF.

In addition, the methods proposed in Chapters 4.3.1. to 4.3.3 are applicable to whether the SF is an end pSF.

In addition, information indicating whether the SF belongs to the same TX burst or whether the SF is an SF which uses the same RS TX power may use the methods described in Chapters 4.2.1 to 4.2.5.

In addition, the rate matching pattern information may use the method proposed in Chapter 4.4 (PQI method #1).

In addition, information indicating whether the SF is a start pSF may use the method proposed in Chapter 4.5.

At this time, the signaling transmitted by the eNB is not limited to common L signaling and dedicated L1 signaling (UE-specific search space) on the PCell or the LAA SCell may be used.

Alternatively, some information may be transmitted through common L1 signaling on the PCell or the LAA SCell and the remaining information may be transmitted through dedicated L1 signaling (UE-specific search space) on the PCell or the LAA SCell.

4.9.1 Signaling Method Using PCFICH

An existing PCFICH is transmitted through QPSK-modulated 1 symbol. That is, if control information is signaled through a PCFICH, a maximum of four pieces of state information (or 2 bits) may be represented.

At this time, signaling of some of the above-described combinations [Comb #1] to [Comb #11] may be transmitted using a PCFICH. Detailed methods are as follows.

As a first method, the eNB may combine the method described in Chapter 4.3.2 and the method described in Chapter 4.1.1 and transmit SF length information through a PCFICH. That is, 2 bits (that is, four pieces of state information) transmitted through the PCFICH may be transmitted in a state of being mapped to four states including "full SF+MBSFN", "full SF+No MBSFN", "Partial end SF+MBSFN" and "Partial end SF+No MBSFN".

As a second method, the eNB may combine the method described in Chapter 4.3.2.2 and the method described in Chapter 4.1.1 and transmit SF length information. For example, the eNB may transmit "Full SF" and "Partial end SF" in a state of being mapped to two states or four states using 2 bits transmitted through the PCFICH.

As a third method, the eNB may combine the method described in Chapter 4.3.4 and the method described in Chapter 4.1.1 and transmit SF length information. For example, the eNB may combine information indicating whether the current SF is an MBSFN SF and SF length information (or an SF length range, a DM-RS pattern, or a CRS pattern) and transmit the combination in a state of being mapped to four states (that is, 2 bits).

4.9.2 Signaling Method Using PHICH

The eNB may use only a PHICH of one OFDM symbol in order to minimize the PHICH duration on the LAA SCell. One PHICH group has a maximum of eight Walsh-Hadamard (WH) code and I/Q phase combinations, and the eNB may send BPSK-modulated information in each combination. At this time, in the LAA system, signaling of some of the above-described combinations [Comb #1] to [Comb #11] may be configured as a PHICH. Detailed embodiments are as follows.

As a first method, the eNB may combine the method described in Chapter 4.3.2 and the method described in Chapter 4.1.2 and transmit a DL TX burst structure to the UE. For example, in Chapter 4.3.2, if N=3, since four states are included in state set #2, 2 bits are necessary and, in Chapter 4.1.2, additional 1 bit is necessary. Accordingly, in order for the eNB to signal the structure of the DL TX burst, 3-bit control information may be necessary.

The eNB may transmit BPSK-modulated information through three specific WH code and I/Q phase combinations (predetermined) in one PHICH group as the 3-bit control information. Alternatively, the eNB may be configured to divide 3 bits into two PHICH groups, to transmit 2-bit information necessary for the methods described in Chapter 4.3.2 in PHICH group #1 and to transmit 1-bit information necessary for the method described in Chapter 4.1.2 in PHICH group #2.

Alternatively, the eNB may be configured to divide 3 bits into three PHICH groups, to use one (e.g., code 0 and I phase, the combinations may differ between PHICH groups) of the specific WH code and I/Q phase combinations in each PHICH group, to perform BPSK modulation with respect to the information, and to transmit the modulated information.

4.9.3 Signaling Method Using Combination of PCFICH and PHICH

Signaling of some of the above-described combinations [Comb #1] to [Comb #11] may be configured by combining a PCFICH and a PHICH. Detailed embodiments are as follows.

As a first method, the eNB may combine the method described in Chapter 4.3.2 and the method described in Chapter 4.1.2 and transmit DL TX burst structure information to the UE. For example, in Chapter 4.3.2, if N=3, since four states are included in state set #2, 2 bits are necessary for representation and an additional 1 bit is necessary for the method described in Chapter 4.1.2. At this time, the eNB may transmit 1 bit for the method described in Chapter 4.1.2 through the PCFICH and transmit 2 bits for the method described in Chapter 4.3.2 through the PHICH.

4.10 HARQ Based Contention Window Adjustment Method

Hereinafter, a method of determining whether HARQ-ACK is valid in an LAA system for adjusting a contention window size (CWS) based on HARQ-ACK will be described.

If a TDD PCell and an LAA SCell are subjected to carrier aggregation (CA), the UE may be configured to transmit HARQ-ACK through TDD channel selection. Such a UE may be configured to feed back only the number of ACKs to be reported at a corresponding point of time (by using a constellation point changed according to the number of ACKs) upon positive SR transmission.

For example, if the TDD PCell and the LAA SCell are subjected to CA, if the UE simultaneously transmits the HARQ-ACK information of four (M=4) SFs in SF # n, the UE may multiplex and transmit the HARQ-ACK information of a maximum of eight SFs with the positive SR. When the number of ACKs expected by the eNB is K, if K ACKs are reported, all allocated TBs may be counted as ACKs but, if L (>0) ACKs (L is less than K) are reported, which TBs are actually successful may be ambiguous. At this time, eNB may regard valid ACK/NACK as being not present with respect to all TBs allocated to the LAA SCell. Alternatively, the eNB may be regard valid NACK as being present with respect to all TBs allocated to the LAA SCell.

Using such a method, the eNB may adjust the contention window size using HARQ-ACK information received from the UE.

4.11 Signaling Method for Control Channel Region of pSF

In order to prevent resources of one or more SFs from being wasted between continuous DL TX bursts due to LBT in transmission of continuous DL TX bursts, the first or last SF of the DL TX bursts may be configured to be smaller than one SF. In the embodiments of the present disclosure, among subframes configuring the DL TX bursts, a pSF transmitted in a state the first some OFDM symbols are empty may be defined as a start pSF (or a partial start SF), a pSF transmitted in a state of the last some OFDM symbols are empty may be defined as an end pSF (or a partial end SF), and a whole SF may be defined as a full SF.

4.11.1 Signaling Method Using EPDCCH

When the length of the start pSF is one slot (e.g., 7 OFDM symbols) and an EPDCCH is transmitted, an EPDCCH start point and PDSCH start point setting will be described.

If an EPDCCH start symbol configured by higher layer signaling is "P", in the case of the start pSF, the UE may assume that the EPDCCH starts at a P+N (N=7 or a predetermined specific value) OFDM symbol. For example, the UE configured by RRC signaling such that the EPDCCH starts at OFDM symbols #1 may assume that the EPDCCH starts at OFDM symbol #8 in the start pSF.

Alternatively, existing RRC signaling may be regarded as being invalid and, in the start pSF, the rule that the EPDCCH always starts at a specific OFDM symbol (e.g., SF #9) may be determined.

If information on a PDSCH start symbol is carried in the EPDCCH through PQI, the corresponding value may differ between the full SF and the start pSF. For example, in the case of the full SF, when the PDSCH start symbol is set to OFDM symbol # k, the UE may regard the actual PDSCH start symbol as an OFDM symbol # k+a (a=7 or a predetermined specific value) in the case of the start pSF.

Alternatively, in the case of the pSF, the UE may regard the actual PDSCH start symbol as a predetermined specific OFDM symbol (e.g., OFDM symbol #8).

4.11.2 PDSCH Start Symbol Configuration Method

In an existing LTE system, when self scheduling is performed through the EPDCCH, the PDSCH start symbol is configured to be equal to the EPDCCH start symbol configured through higher layer signaling. The methods described in Chapter 4.10.1 are applicable to the method of configuring the PDSCH start symbol.

4.12 SF Length Information Transmission Method for Start pSF

In the methods described in Chapters 4.6.1 to 4.6.3, when the eNB transmits information on the next SF (SF # n+1) as well as the current SF (SF # n) in SF # n, the current SF may be a start pSF. In this case, the eNB may be configured to transmit a full SF, a reserved state or an undefined state as information on the current SF.

4.13 DSR SF Related Information Transmission Method

Information as to whether a DRS is transmitted in a specific SF and/or information as to whether the corresponding DRS SF is a pSF or a full SF may be transmitted through common control signaling. For a specific SF in which the UE does not successfully decode common control signaling or an SF in which common control signaling is not received, the DRS may be regarded as being not being transmitted. However, the UE may attempt DRS SF detection regardless of whether common control signaling is transmitted.

The above-described common control signaling may be DCI transmitted in the common search space on the LAA SCell or a PDCCH DCI transmitted with a specific RNTI in a UE-specific search space.

The examples of the above-described methods may be included as one of the implementation methods of the present disclosure and thus may be regarded as the proposed methods. In addition, the proposed methods may be independently implemented or some of the proposed methods may be combined (or merged). The rule may be determined such that the eNB informs the UE of whether the proposed methods are applied through a predefined signal (e.g., a physical layer signal or a higher layer signal).

5. Apparatuses

Figure 33:
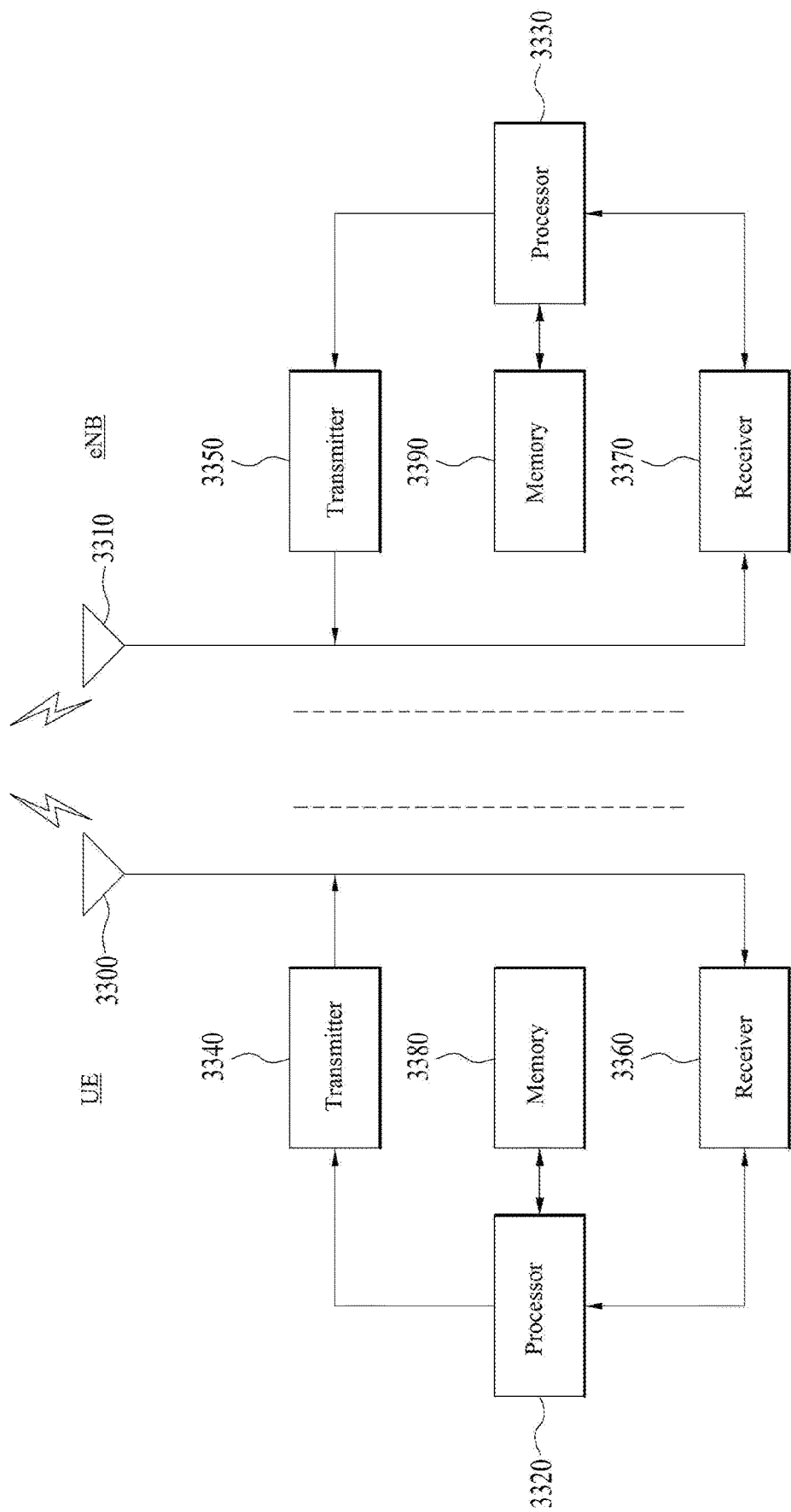
FIG. 33 is a view illustrating means that can be implement the methods described with reference to FIGS. 1 to 32.

Apparatuses illustrated in FIG. 33 are means that can implement the methods described before with reference to FIGS. 1 to 32.

A UE may act as a transmission end on a UL and as a reception end on a DL. An eNB may act as a reception end on a UL and as a transmission end on a DL.

That is, each of the UE and the eNB may include a transmitter (Tx) 3340 or 3350 and a receiver (Rx) 3360 or 3370, for controlling transmission and reception of information, data, and/or messages, and an antenna 3300 or 3310 for transmitting and receiving information, data, and/or messages.

Each of the UE and the eNB may further include a processor 3320 or 3330 for implementing the afore-described embodiments of the present disclosure and a memory 3380 or 3390 for temporarily or permanently storing operations of the processor 3320 or 3330.

The embodiments of the present disclosure may be performed using the components and functions of the UE and the base station. For example, the processor of the UE may be configured to control the receiver to receive a signal including first SF length information indicating a length of one or more of a current SF and a next SF in a subframe number n−1 (SF # n−1) and to control the receiver to receive one or more of a downlink physical channel and a downlink signal in SF # n−1 based on the first SF length information. At this time, the first SF length information may indicate that the current SF or the next SF is an end SF of a downlink transmission burst of the unlicensed band. In addition, the processor of the UE may be configured to control the receiver to receive a signal including second SF length information indicating a length of one or more of a current SF and a next SF in a subframe number n (SF # n) and to receive one or more of a downlink physical channel and a downlink signal in SF # n based on the second SF length information.

The processor of the eNB may be configured to control the transmitter to transmit a signal including first SF length information indicating a length of one or more of a current SF and a next SF in a subframe number n−1 (SF # n−1) and to transmit one or more of a downlink physical channel and a downlink signal in SF # n−1 based on the first SF length information. At this time, the first SF length information indicates that the current SF or the next SF is an end SF of a downlink transmission burst of the unlicensed band. The processor of the eNB may be configured to control the transmitter to transmit a signal including second SF length information indicating a length of one or more of a current SF and a next SF in a subframe number n (SF # n) and to transmit one or more of a downlink physical channel and a downlink signal in SF # n based on the second SF length information.

The first or second SF length information may indicate that the current SF or the next SF is an end SF and is a partial SF. In addition, the first or second SF length information may indicate that the current SF is a full SF and is an end SF. In addition, the first or second SF length information may include the lengths of the current SF and the end SF represented by the number of OFDM symbols.

The Tx and Rx of the UE and the eNB may perform a packet modulation/demodulation function for data transmission, a high-speed packet channel coding function, OFDM packet scheduling, TDD packet scheduling, and/or channelization. Each of the UE and the eNB of FIG. 33 may further include a low-power radio frequency (RF)/intermediate frequency (IF) module.

Meanwhile, the UE may be any of a personal digital assistant (PDA), a cellular phone, a personal communication service (PCS) phone, a Global System for Mobile (GSM) phone, a wideband code division multiple access (WCDMA) phone, a mobile broadband system (MeNB) phone, a hand-held PC, a laptop PC, a smart phone, a multi mode-multi band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 3380 or 3390 and executed by the processor 3320 or 3330. The memory is located at the interior or exterior of the processor and may transmit and receive data to and from the processor via various known means.

Those skilled in the art will appreciate that the present disclosure may be carried out in other specific ways than those set forth herein without departing from the idea and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

The invention claimed is:

1. A method for receiving a downlink transmission by a user equipment (UE) in a wireless access system supporting an unlicensed band, the method comprising:
   receiving, from a base station (BS), downlink control information (DCI) including a length indicator of 4 bits in a current subframe (SF),
   wherein the length indicator indicates a combination of the number of orthogonal frequency division multiplexing (OFDM) symbols scheduled for reception of the downlink transmission in each of the current SF and a next SF, and
   receiving, from the BS, the downlink transmission based on the scheduled OFDM symbols.

2. The method of claim 1, wherein one of the current SF and the next SF is an end SF of a downlink transmission burst.

3. The method of claim 1, wherein the current SF is a partial SF and an end SF of a downlink transmission burst.

4. The method of claim 3, wherein the scheduled OFDM symbols are located at front part of the current SF.

5. The method of claim 1, wherein the current SF is a full SF and an end SF of a downlink transmission burst.

6. The method of claim 1,
   wherein the current SF is a full SF, and
   wherein the next SF is a partial SF and an end SF of a downlink transmission burst.

7. The method of claim 1, wherein the scheduled OFDM symbols are consecutive.

8. A User Equipment (UE) for receiving a downlink transmission in a wireless access system supporting an unlicensed band, the UE comprising:
   at least one transceiver;
   at least one processor; and
   at least one computer memory operably connectable to the at least one processor and storing instructions that, when executed, cause the at least one processor to perform operations comprising:
   receiving, from a base station (BS), downlink control information (DCI) including a length indicator of 4 bits in a current subframe (SF),
   wherein the length indicator indicates a combination of the number of orthogonal frequency division multiplexing (OFDM) symbols scheduled for reception of the downlink transmission in each of the current SF and a next SF, and
   receiving, from the BS, the downlink transmission based on the scheduled OFDM symbols.

9. The UE of claim 8, wherein one of the current SF and the next SF is an end SF of a downlink transmission burst.

10. The UE of claim 8, wherein the current SF is a partial SF and an end SF of a downlink transmission burst.

11. The UE of claim 10, wherein the scheduled OFDM symbols are located at front part of the current SF.

12. The UE of claim 8, wherein the current SF is a full SF and an end SF of a downlink transmission burst.

13. The UE of claim 8,
wherein the current SF is a full SF, and
wherein the next SF is a partial SF and an end SF of a downlink transmission burst.

14. The UE of claim 8, wherein the scheduled OFDM symbols are consecutive.

* * * * *